US011182821B2

(12) United States Patent
Wolinsky et al.

(10) Patent No.: US 11,182,821 B2
(45) Date of Patent: Nov. 23, 2021

(54) SYSTEM AND METHOD OF SAVING DEAL OFFERS TO BE APPLIED AT A POINT-OF-SALE (POS) OF A RETAIL STORE

(71) Applicant: EXXCELON CORPORATION, Fairfield, CT (US)

(72) Inventors: Jonathan Wolinsky, Fairfield, CT (US); Robert I. Wolinsky, Fairfield, CT (US); Steven W. Wolinsky, Woodbridge, CT (US)

(73) Assignee: Exxcelon Corporation, Fairfield, CT (US)

( * ) Notice: Subject to any disclaimer, the term of this patent is extended or adjusted under 35 U.S.C. 154(b) by 257 days.

(21) Appl. No.: 14/444,773

(22) Filed: Jul. 28, 2014

(65) Prior Publication Data

US 2015/0112790 A1 Apr. 23, 2015

Related U.S. Application Data

(60) Provisional application No. 61/859,122, filed on Jul. 26, 2013.

(51) Int. Cl.
  *G06Q 30/02* (2012.01)
  *G06Q 20/20* (2012.01)
  *G06Q 20/32* (2012.01)

(52) U.S. Cl.
  CPC ......... *G06Q 30/0238* (2013.01); *G06Q 20/20* (2013.01); *G06Q 20/208* (2013.01);
  (Continued)

(58) Field of Classification Search
  None
  See application file for complete search history.

(56) References Cited

U.S. PATENT DOCUMENTS

| 2008/0133366 A1* | 6/2008 | Evans | G06Q 30/02 705/14.26 |
| 2011/0015987 A1* | 1/2011 | Chakraborty | G06Q 30/02 705/14.39 |

(Continued)

FOREIGN PATENT DOCUMENTS

WO   WO-2013188409 A1 *  12/2013   ......... G06Q 30/0201

OTHER PUBLICATIONS

Thomas H. Davenport, Leandro DalleMule, and John Lucker, Know What Your Customers Want Before They Do, Dec. 2011, Harvard Business Review (Year: 2011).*

*Primary Examiner* — Rashida R Shorter

(74) *Attorney, Agent, or Firm* — Foley & Lardner LLP

(57) ABSTRACT

A system and method of saving deal offers to be applied at a point-of-sale (POS) of a retail store may include receiving, by a mobile device via a communications network, multiple advertisements inclusive of selectable deal offers of products being sold at the retail store for a user to select. Responsive to a user selecting to view an advertisement of a product on the mobile device, the deal offer of the product to be presented to the POS to be applied to a cost of the product may be automatically stored. Responsive to a check out request at the mobile device, data inclusive of the deal offer to be presented to the POS to apply the deal offer to the cost of the product to which the deal offer is associated may be generated.

12 Claims, 65 Drawing Sheets

(52) U.S. Cl.
CPC ......... *G06Q 20/32* (2013.01); *G06Q 20/3274* (2013.01); *G06Q 30/0268* (2013.01)

(56) References Cited

U.S. PATENT DOCUMENTS

2012/0215611 A1* 8/2012 Korson .............. G06Q 30/0222
　　　　　　　　　　　　　　　　　　　　　705/14.23
2014/0006165 A1* 1/2014 Grigg ................ G06Q 30/0207
　　　　　　　　　　　　　　　　　　　　　705/14.64

* cited by examiner

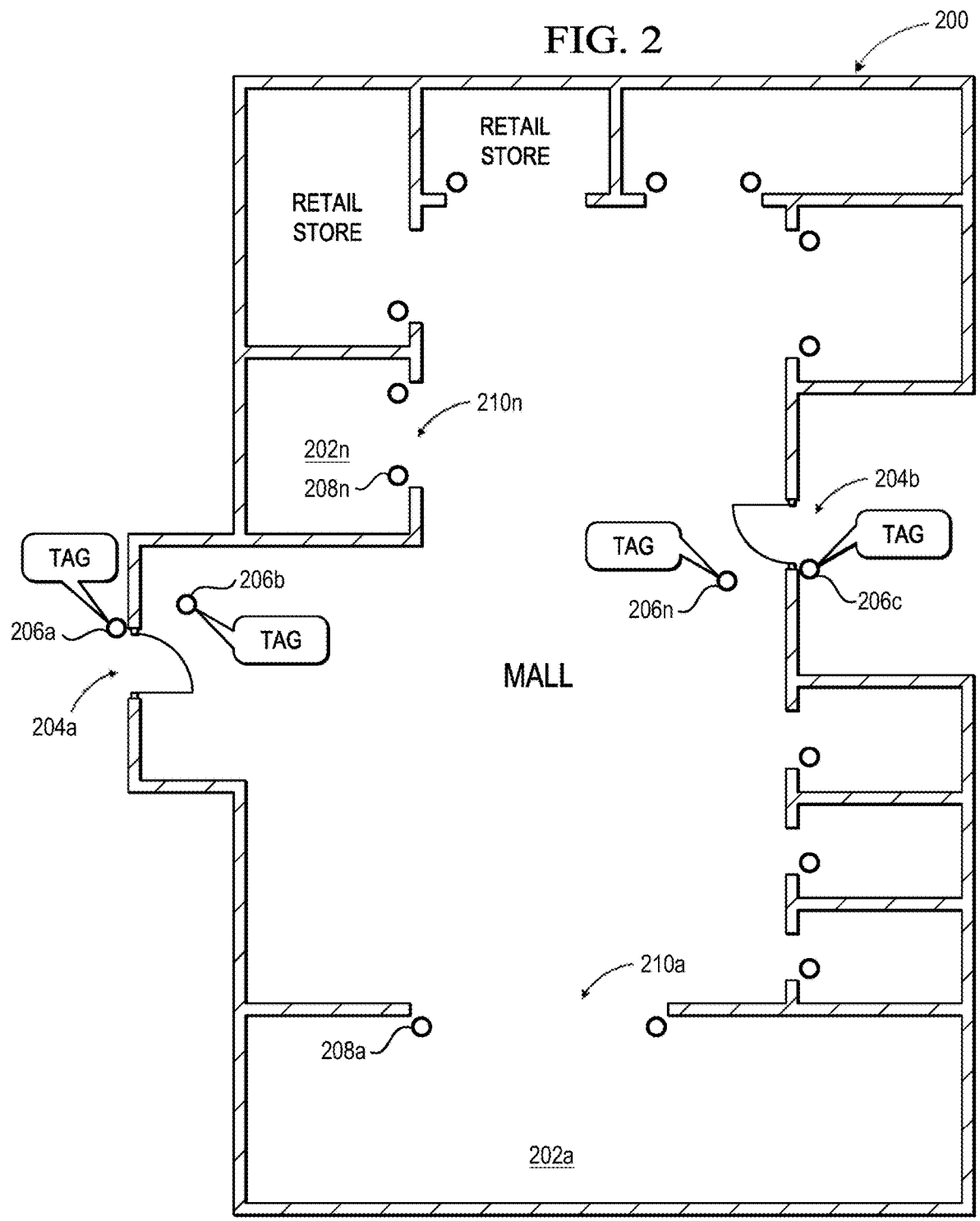

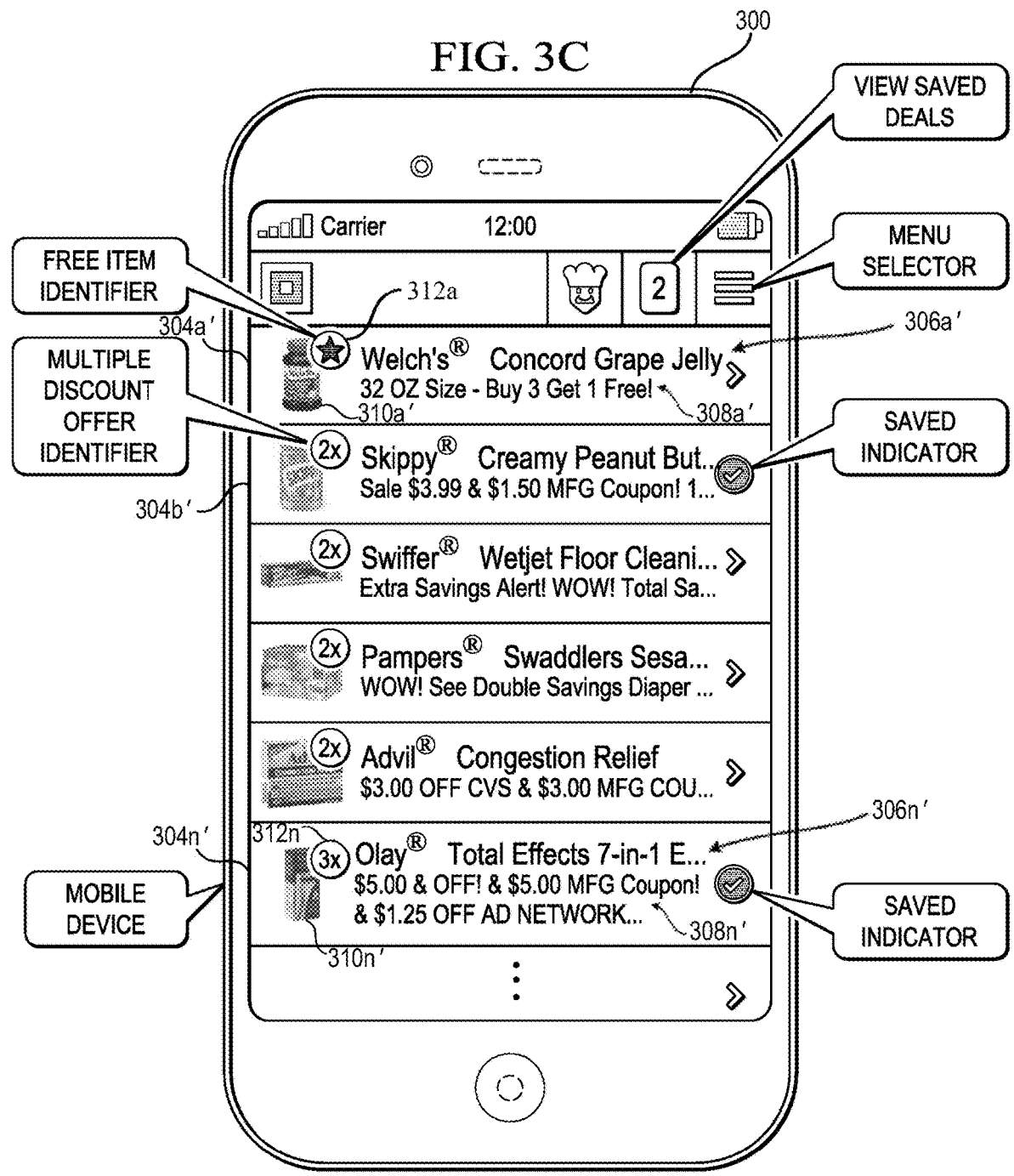

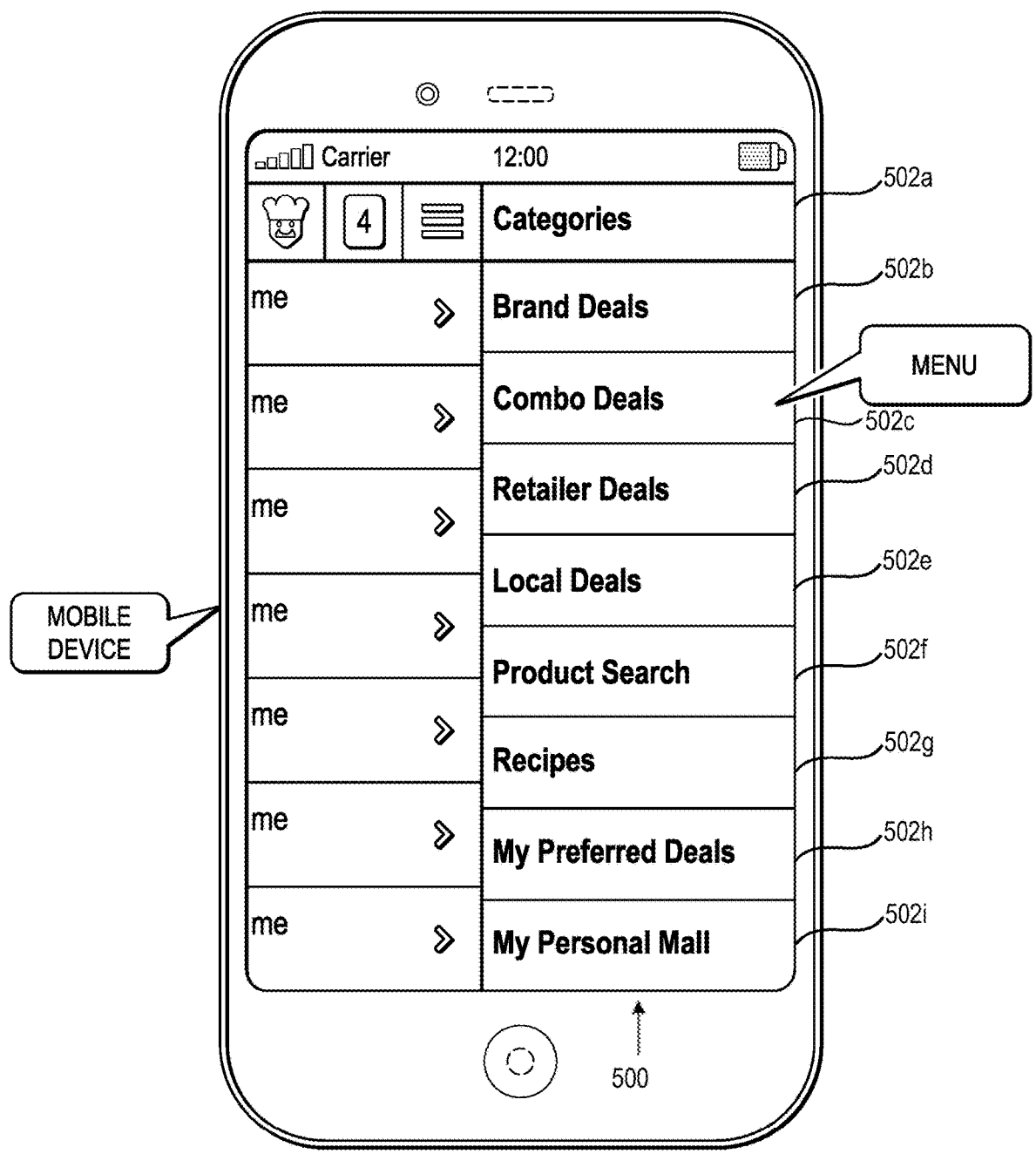

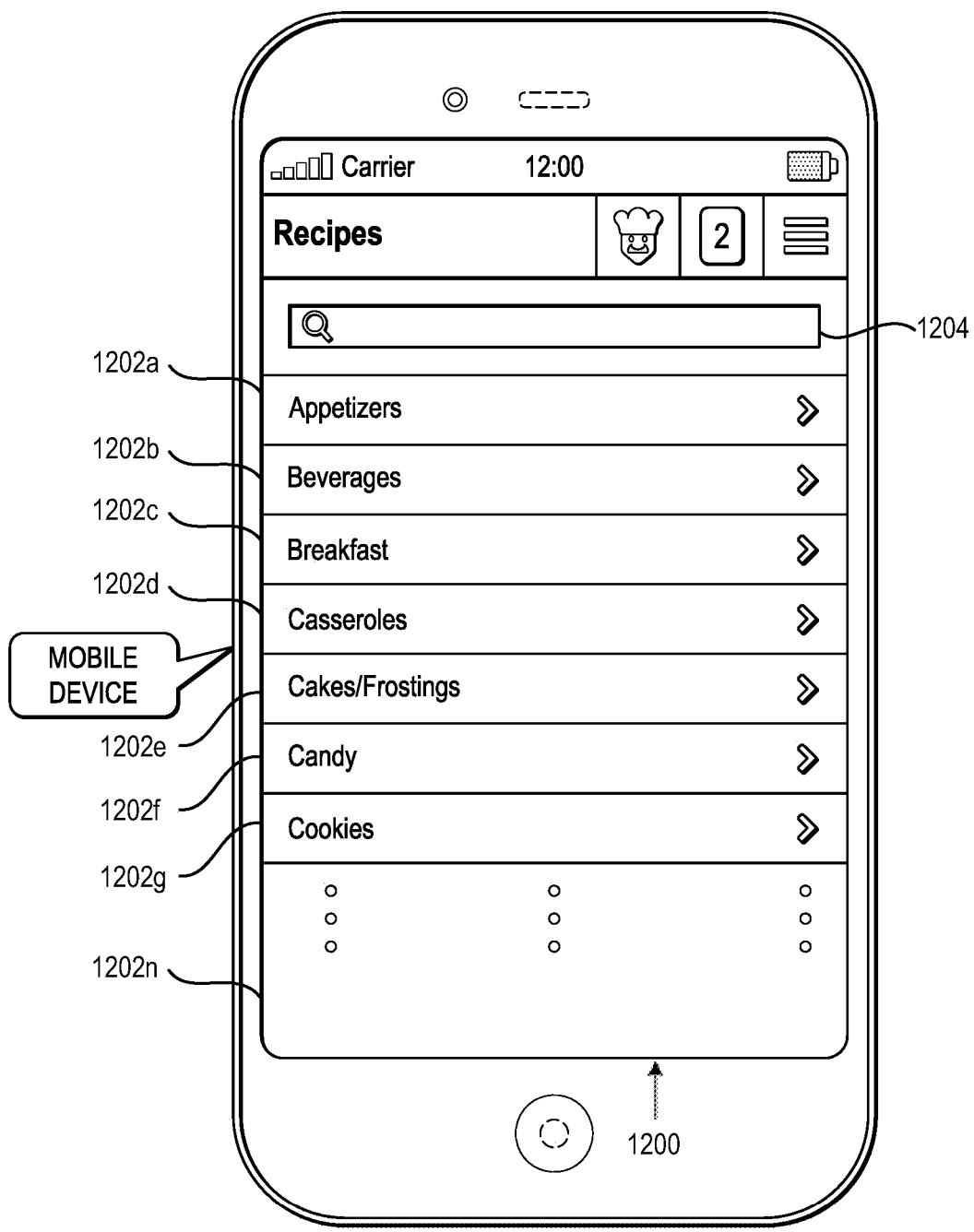

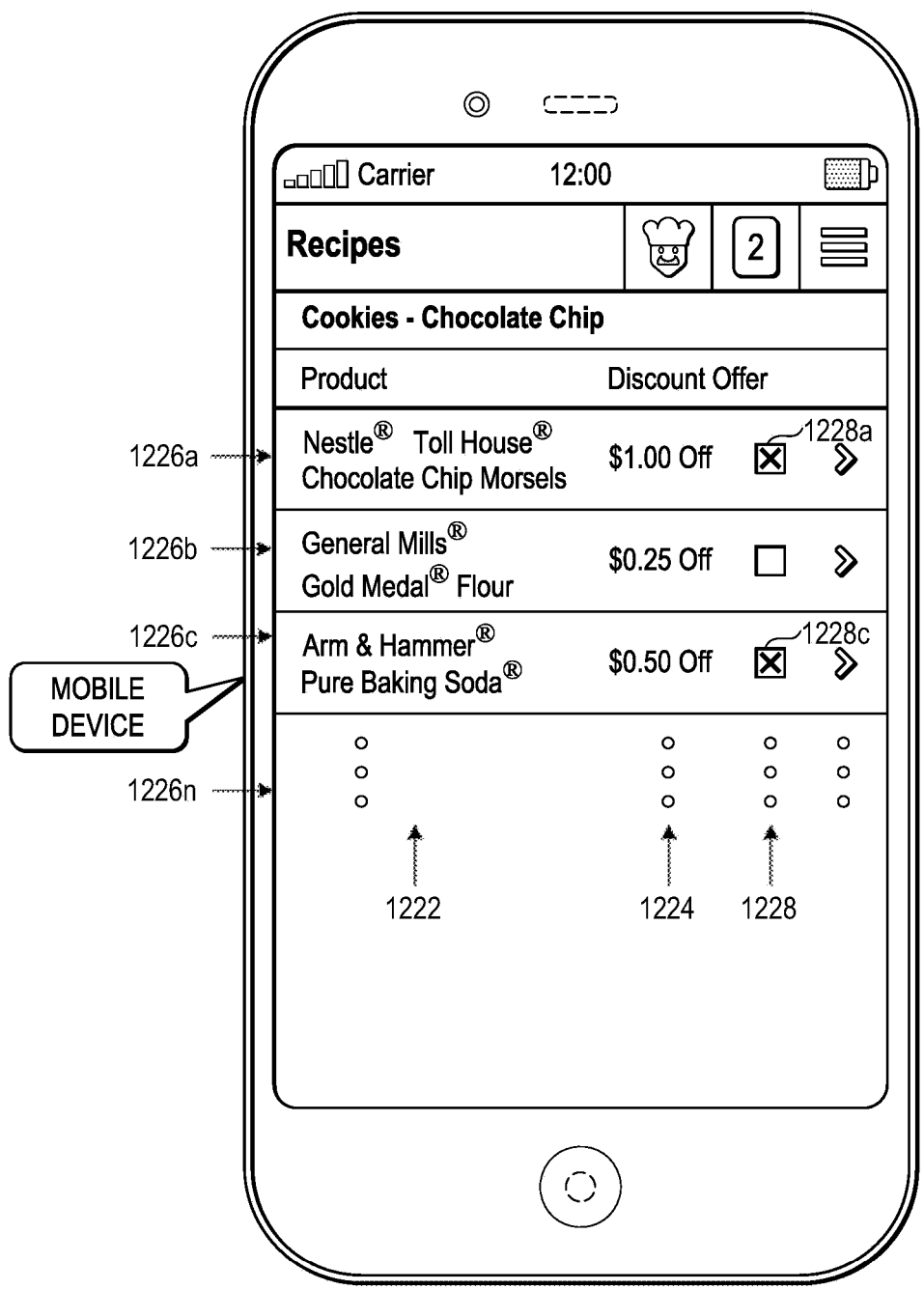

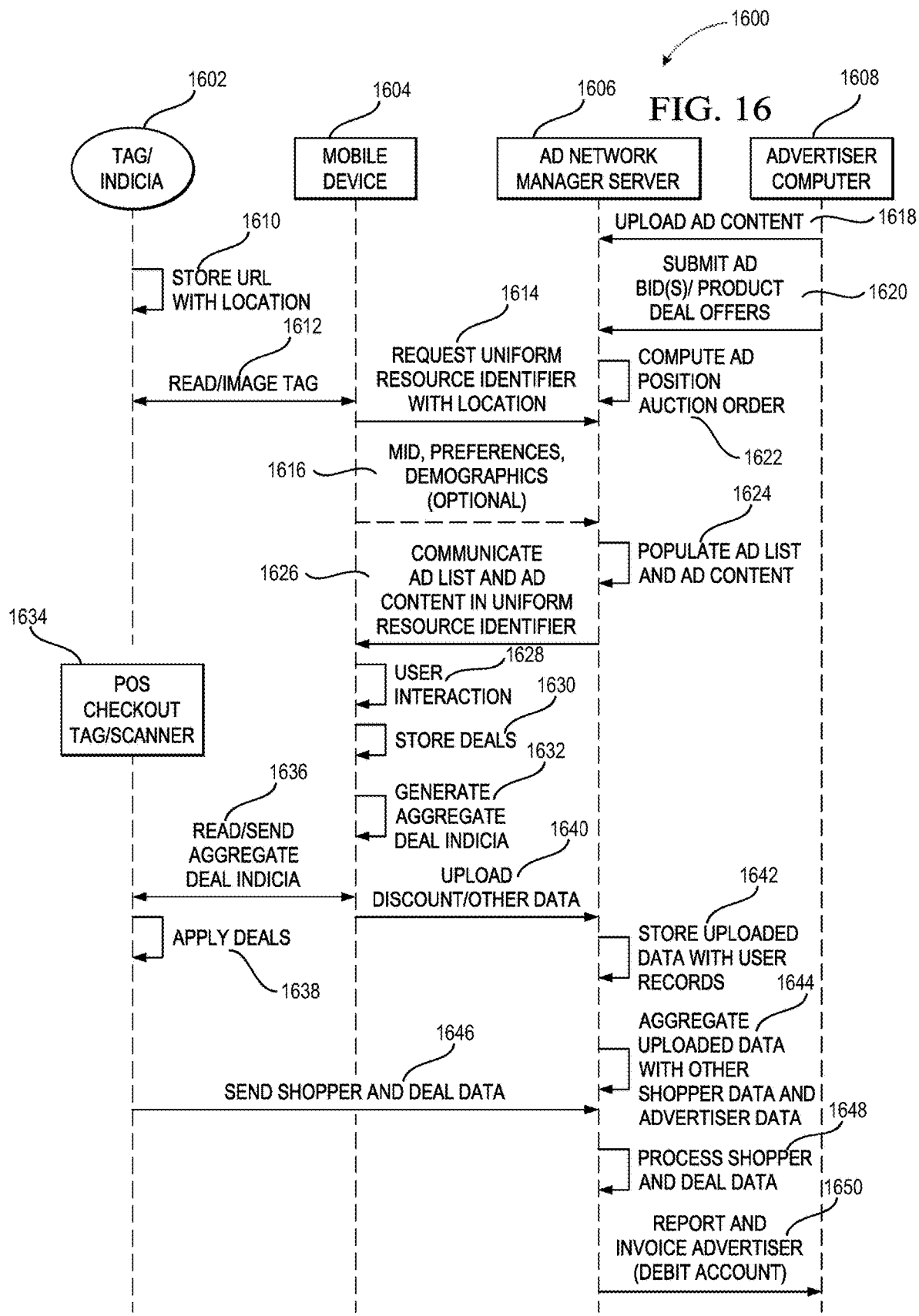

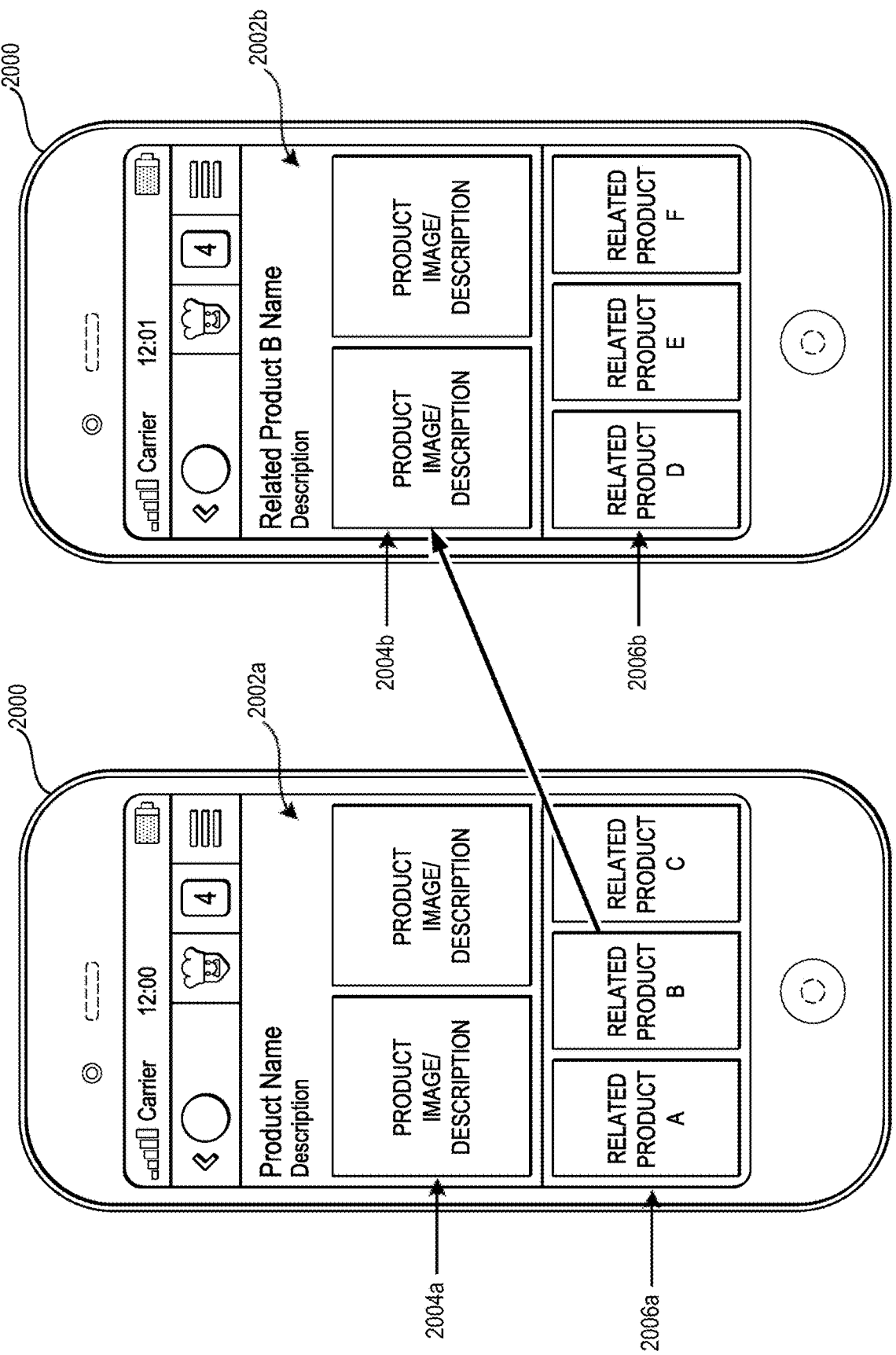

FIG. 30

| New Ad | Save | Cancel | | 3000 |

| General | Display | Offer | Targets | Bids |

Campaign: [Campaign 1 ▼] ← 3002

Product: Name: Advil® Congestion Relief
UPC: 1668415251 ← 3004

Ad Name: [Sample Ad] ← 3006

Ad Type: [DealStream ▼] ← 3008

Headline: [Advil® Congestion Relief] ← 3010

Description: [20 Coated Tablets] ← 3012

New Product Intro: ☐ ← 3014

Status: [Enabled ▼] ← 3016

FIG. 39

| Dashboard | Listings ▼ | Catalog ▼ | Extensions ▼ | Sales ▼ | Reporting ▼ | Settings ▼ | | Help | Logout |

Dashboard

◎ Dashboard  _3900_

▦ Overview  _3902_

Redemptions (today): $127.36
Store Locations: 23
Products: 246
Sales: 41
Campaigns: 12
Ads: 35

▦ Statistics  _3906_    [This Month ▶]

—○— Redemptions
—◇— Taps 600
400
200

Tues. Thurs. Sat. Mon. Wed.
Jul 2  Jul 4  Jul 6  Jul 8  Jul 10

◇ Recent Coupon Redemptions  _3904_

| Store | Coupon ID | Date | Amount | Action |

No Results

▦ News & Information  _3908_

Getting started with AdSpotter
What is place-based mobile media?
How to maximize your DealStream Conversion rate

FIG. 40

| Ad Name | Ad Type | Campaign | Product | Description | Offer | Taps | Impr. | TTR | Avg. CPT | Avg. Pos. |
|---|---|---|---|---|---|---|---|---|---|---|
| Ad 1 | DealStream | Campaign 1 | Advil® Congestion Relief UPC: 1668415251 | 20 Coated tablets | 25.00% Off | 82 | 263 | 0.31% | $0.12 | 3.2 |
| Ad 2 | DealStream & HyperPOP | Campaign 1 | Tree Ripe® Orange Juice UPC: 8461452232 | 50-oz. cont. Any Variety | $1.50 Off | 66 | 312 | 0.21% | $0.07 | 5.4 |
| Ad 3 | DealStream | Campaign 2 | Coors Light® 30-Pack UPC: 7845600124 | 30-Pack | $3.00 Off | 145 | 307 | 0.47% | $0.13 | 2.9 |
| Ad 4 | DealStream | Campaign 3 | Centrum® Chewables UPC: 0045356889 | 365-Count | Buy 1 Get 1 50% Off | 105 | 288 | 0.36% | $0.09 | 4.4 |
| Ad 5 | DealStream | Campaign 3 | Centrum® Chewables UPC: 0045356889 | 365-Count | $2.00 Off | 80 | 274 | 0.29% | $0.08 | 4.7 |
| Ad 6 | HyperPOP | Campaign 4 | Colgate® Total Toothpaste UPC: 0548789225 | Advanced Whitening - 7.6... | Buy Get 1 Free | 218 | 537 | 0.41% | $0.15 | - |

ADVERTISEMENT PERFORMANCE — 4002

SYSTEM AND METHOD OF SAVING DEAL OFFERS TO BE APPLIED AT A POINT-OF-SALE (POS) OF A RETAIL STORE

RELATED APPLICATION

This application claims the benefit, under 35 USC § 119(e), of the filing of U.S. Provisional Patent Application Ser. No. 61/859,122, entitled "SYSTEM AND METHOD FOR DELIVERING RETAIL AUDIENCES BY INFLUENCING ADVERTISEMENT POSITION ON A LIST GENERATED BY A MULTI-PLAYER AGGREGATE AUCTION PLATFORM," filed Jul. 26, 2013, which is incorporated herein by reference in its entirety.

BACKGROUND OF THE INVENTION

In recent years, an alternative mobile advertising system has emerged for brand advertisers as an adjunct to the online display or publisher-based advertising industry. These systems have the ability to (theoretically) target a viewer with push-based advertising to content sites (websites) and into in-app publishing opportunities, and provide various Internet-style audience measurements. Most of this display advertising falls within the RTB and programmatic buying environment.

According to Raymond James Research "Digital Advertising: The New Wave," March 2014, "The key advantages of real-time and programmatic buying include: 1) Liquidity—optimizes pricing, benefiting both publishers and advertisers. 2) Automation—RTB allows marketers to streamline the process by using a technology platform to purchase impressions in an automated way, typically on an exchange. 3) Impression-by-impression targeting: RTB enables buyers to bid on an impression-by-impression basis, targeting those users it believes will be most receptive to the advertising . . . . According to IDC, worldwide RTB-based display ad spending will grow from $4.5 billion in 2013 to $20.8 billion in 2017, a 36% CAGR. According to eMarketer, only 17% of display-based online advertising will be non-programmatic by 2017 vs. 47% in 2013. Additionally, MAGNA GLOBAL estimates that U.S. programmatic ad spending will increase from $3.3 billion in 2013 (25% of total U.S. display ad spend) to more than $7 billion by 2017 (51% of total display)."

Brand advertisers are starting to gravitate to this form of display advertising because it offers greater levels of measurability over traditional analog media formats. However, RTB mobile is entirely push-based advertising, which is generally considered low value because most viewers consider such content-inserted ads annoying and seek to avoid them, and it suffers an approximately 40% fraud rate due to inadvertent clicks, fake publisher sites, and malware-type click-bots. A large industry of digital RTB specialists has cropped-up (i.e.: demand side platforms (DSPs), supply side platforms (SSPs), data management platforms (DMPs), audience management platforms (AMPs), etc. . . . ) to both distribute ads and analyze viewer conversion attribution. While the influence of real-time bidding and programmatic audience buying is of tremendous significance, like traditional Internet search, the RTB display format fails to deliver timely and relevant information to interested parties engaged in the act of shopping in a retail store and, therefore, provides little value to CPG (consumer package goods) (FMCG (fast moving consumer goods) promotion-marketers.

Raymond James further summarizes the state of affairs of mobile advertising. "RTB exchanges are beginning to gain traction in mobile advertising. Given the improvements in mobile targeting as well as advertiser and agency focus on ad buying efficiencies, we have seen the launch of several mobile ad exchanges . . . . With RTB and programmatic buying, advertisers can now, more than ever, deliver the right advertisement, at the right place, at the right time, to the right person, for the right price . . . . We estimate total U.S. online as media spending to reach 40% of total media spend and 28% of total ad spend by 2017 . . . the next wave of innovation will revolve around advertisers targeting consumers while in the act of shopping."

Promotion-marketers perceive media valuation (or audience value) as a hierarchy with the highest value media having three very important characteristics: (1) the ability for precise timing of message delivery in connection with a purchase decision, (2) the ability to advertise or promote goods in relationship with other goods of interest to the audience, and (3) the ability for the audience to act upon an advertisement. The only environment that portrays these media characteristics is that of a brick-and-mortar retail location, thereby making retail-based audiences extremely valuable. However, both traditional RTB and search-based auction media are neither capable of providing this valuable audience criteria nor capable of delivering brick-and-mortar retail-based audiences.

Promotion messaging in a retail environment has traditionally been performed using print advertisements located in the path that shoppers travel and on shelf-edges in front of or near merchandise. In the physical retail environment, both retailers and marketers work together to inform and promote customer awareness of both parties' relevant, logical-related and contextual product offerings during a shopping trip. For example, if the primary offered item is grape jelly, the relevant logical-related product offerings may be a store brand peanut butter and white bread, while the contextual offer may be an alternative jam product. Much of this relevant, logical-related and contextual-related marketing (or product adjacency marketing) occurs with printed signs or moving products adjacently or in relative proximity to each other, all of which are very difficult and costly to accomplish in a retail store setting, and, therefore, rarely executed. However, with the hope of growing incremental sales the aforementioned product selling relationships are of immense value to both retailers and multi-product/category marketers.

In addition to RTB advertising, native "shopping" applications or retailer apps have been developed to assist consumers. The consumer may view the app-based messaging during a shopping trip or while they are outside the store. These mobile device-based advertisements may include a thumbnail image, information about a certain product and/or various purchase incentives, such as product discounts, coupons, and social networking offers. In most cases, the intention of mobile device-based communication has been to expand the traditional Internet ecommerce envelope from which consumers may see and interact with a retailer or brand marketer's commercial messaging or to encourage consumers to purchase featured items while shopping at the store or on the next shopping trip.

Unfortunately, for shoppers engaged in the physical act of shopping, mobile device network communications are Internet Protocol (IP)-based just like any traditional computer network, devoid of time and space. Thus, the traditional paradigms of mobile device shopping apps fail to deliver timely and relevant information to interested parties engaged in shopping in a retail store. Mobile apps do offer the benefit of accessing shopping-related information while on the go, but fall short of the necessary precise time, physical space requirement, and product adjacency selling that permits the delivery of perfectly timed promotional advertisements and offers about specific and related goods available in the store that a shopper may act upon while shopping. Therefore, retailers and promotion-marketers seeking to provide a precise, location-specific commercial message to shoppers using mobile devices about specific and related goods available to the shopper while shopping cannot do so. Such weak app utility relegates shopping and coupon apps to little more than weekly circulars in an electronic format.

Recognizing these deficiencies, there have been attempts to use geo-fencing and other location identification technology in concert with smartphones, however, the utility of these apps has been generally subject to the fact that the average app loses 90% of all its users within three months. To date there is no retailer specific shopping or retailer proprietary app with greater than 1% usage. Mobile shopping apps have not fulfilled the promise of mobile technology's most important contribution: the ability to deliver high-value, location-based audiences in a timely and predictable fashion. NCH Research, CPG Coupons: U.S. Market Analysis, 2013 Review sums the situation up with the following facts: "In total, digital remains less than 1% of all (CPG) coupons distributed." While (paper) FSI accounts for 90.1% of all 305 billion (CPG) coupons distributed.

With traditional analog media, generating an audience has always been a cost and utility question. In search-based advertising, keyword auction answers both the cost and utility question by combining the "cost" to buy audience with improving user utility (ranked results). In display (digital) advertising, higher bidding (cost) buys more impressions (audience). In the case of shopping applications, whether retailer-specific or third party apps, there exists no audience buying mechanism; hence, user utility (adoption or usage) is consequently very low. Such apps do not fall within the basic tenets of media.

As a result of the both RTB and mobile shopping apps inability to deliver retail audiences, the big brand advertising and promotion spenders, CPGs and FMCGs, are sitting trapped in the "shotgun" analog universe with promotion budgets running 1-5× multiples of traditional advertising spend. The promotion-marketing industry remains incredibly inefficient with a huge amount of money looking for a modern, efficient (digital) solution. Various estimates place promotion-marketing at approximately $200 billion in the U.S. Clearly, a more advanced, consumer, retailer, and advertiser centric ad technology solution and user interface is needed to assist and influence shoppers on their in-store purchasing decisions and to efficiently deliver and measure valuable retail audiences to advertisers on a modern, pay-for-performance basis.

SUMMARY OF THE INVENTION

One embodiment of a method of saving deal offers to be applied at a point-of-sale (POS) of a retail store may include receiving, by a mobile device via a communications network, multiple advertisements inclusive of selectable deal offers of products being sold at the retail store for a user to select. Responsive to a user selecting to view an advertisement of a product on the mobile device, the deal offer of the product to be presented to the POS to be applied to a cost of the product may be automatically stored. Responsive to a check out request at the mobile device, data inclusive of the deal offer to be presented to the POS to apply the deal offer to the cost of the product to which the deal offer is associated may be generated.

One embodiment of a system for saving deals to be applied at a point-of-sale (POS) of a retail store may include a memory configured to store data and a processing unit in communication with said memory. The processing unit may be configured to receive, via a communications network, multiple advertisements inclusive of selectable deal offers of products being sold at the retail store for a user to select. Responsive to a user selecting to view an advertisement of a product on the mobile device, the processing unit may automatically store the deal offer of the product to be presented to the POS to be applied to a cost of the product in the memory. Responsive to a check out request, the processing unit may generate data inclusive of the deal offer to be presented to the POS to apply the deal offer to the cost of the product to which the deal offer is associated.

BRIEF DESCRIPTION OF THE FIGURES

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 is a plan-view illustration of a retail environment, in this case a mall, inclusive of multiple retail stores throughout the retail environment;

FIG. 3C is a screen shot of a mobile device that is displaying an illustrative webpage displaying a non-keyword search results ranked list of advertisements;

FIG. 5 is a screen shot inclusive of an illustrative menu that is displayed in response to a shopper selecting a menu selector;

FIG. 12A is a screenshot of an illustrative listing of categories for recipes;

FIG. 12D is a screenshot of a particular recipe for chocolate chip cookies;

FIG. 16 is an illustration of an interactive flow diagram that shows communications and operations of each of the devices for use in generating and delivering product deal offers to shoppers in a retail environment;

FIG. 20A is an illustration of an illustrative mobile device displaying a product view of a product advertisement that was either selected from a list of product deal offers or responsive to the mobile device accessing an indicia of a tag associated with a particular product;

FIG. 20B is an illustration of the mobile device of FIG. 20A after selection of a related product advertisement;

FIGS. 28-34 are screenshots of illustrative user interface pages that enable advertisers to initiate new ad campaigns, search for products that are available through the system to limit the amount of time needed to initiate an ad campaign, upload data of a product, submit deal offers (e.g., coupon, discount, purchase incentive) or deals, submit advertising performance bids, submit target locations of tags (e.g., retail store), and so forth;

FIG. 39 is a screen shot of an illustrative dashboard that may be used by any of an advertiser, retailer, and/or ad distribution network provider;

FIG. 40 is a report showing a variety of different information provided by the ad distribution network;

DETAILED DESCRIPTION OF THE INVENTION

Figure 1A:
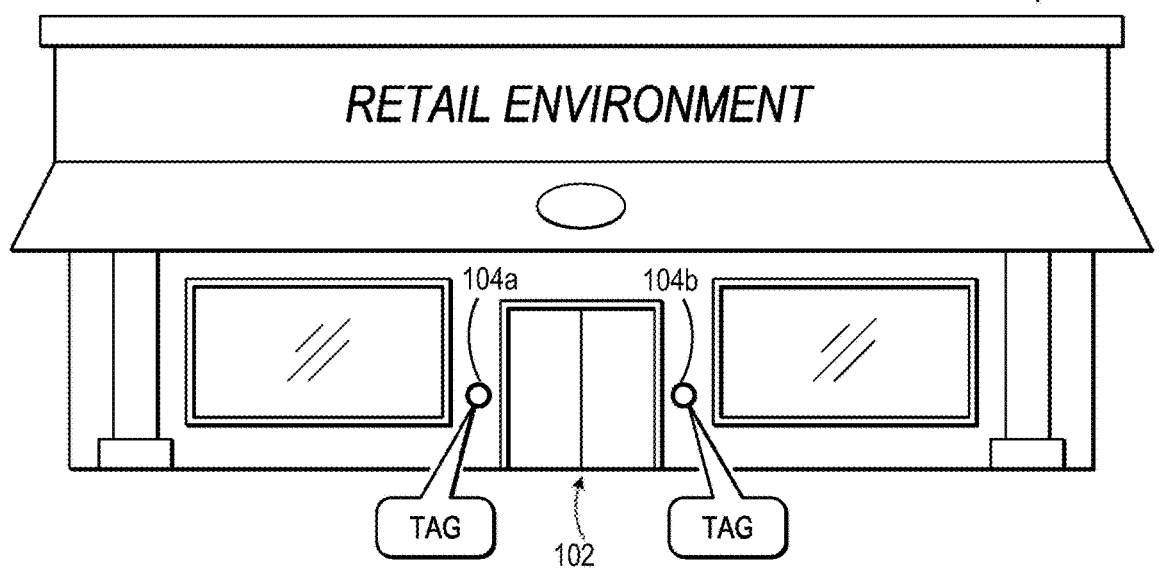
FIG. 1A is an illustration of an illustrative retail environment in which the principles for the present invention may be utilized.

The principles of the present invention addresses and resolves a condition that affects a particular set of advertisers, mainly CPGs and FMCGs marketers and manufacturers, that distribute their products through third party operated retail outlets. These advertisers traditionally promote the sale of their goods through "shotgun" analog or paper coupon offerings distributed weekly to homes, which usually constitute a purchase incentive in the form of a discount or similar offering. Such coupon promotion-marketing invariably results in three forms of advertising inefficiency and waste: (1) not knowing the actual quantity of consumer-recipients may result in overpaying for audience delivery, (2) not knowing the precise demography of consumer-recipients may result in presenting incentive advertisements to the wrong individuals, and (3) not knowing consumer-recipients' purchase history may lead to incentivizing the wrong party, potentially individuals that already purchase the promoted product. All very expensive attributes associated with analog media. According to NCH research, as of year-ending 2013, paper coupon distribution remains at 99% of all coupons distributed for CPG marketers. While most mobile solutions purport to innovate a method and system for merchants (retailers) to communicate promotion incentives to customers about goods available in their retail outlets using geolocation and similar mobile technologies, the present invention provides a method and system for CPG and FMCG-type advertisers to directly plan and buy precisely targeted in-store shopper and on-line audience delivery or otherwise directly communicate their promotion and incentive offers to actual buyers of their goods.

One embodiment establishes a system and method to improve the efficiency of mobile advertising and its ability to connect shoppers with products and services using an RTB computer network. This system is configured to deliver to CPG and FMCG marketers an ad technology platform that efficiently and precisely targets their message and conversion offer or trial at the point-of-sale, while always delivering predictable audience scale and audience programmatic-buy at the lowest possible open market price.

The system as described provides three features to its users: (1) Marketers—organize and deliver significant efficiencies into advertising and promotion-marketing budgets by providing a fraud-free ad technology platform that helps them join the ranks of performance marketers with tools that reach customers and drive action. As performance marketers, brand advertisers will be able to eliminate waste associated with traditional, shotgun advertising formats and the huge fraud associated with conventional RTB systems and reallocate marketing budgets towards more competitive pricing and shopper savings, (2) Retailers—organize and deliver mobile tools for brick-and-mortar retailing that both promote store branded goods and encourage shoppers to "shop-the-store"; by providing a mobile shopper communication platform that allows retailers to leverage the intrinsic media value of their large shopper audience flows and reach into their retail locations to extract new value and heretofore unattainable incremental revenue growth, and (3) Shoppers—improve the lives of people by connecting shoppers with the greatest amount of purchase savings available in their local market.

The system may include three components: (1) an exchange—a scored auction environment, whereby bidders use a game theory-based, mass-audience delivery solution engine to "dial-in" desired audience delivery; (2) a demand-side platform (DSP) for audience planning, buying, and campaign management; provides third-party DSPs and self-service customers access to the exchange; and (3) a modified supply-side, mass-audience delivery platform (SSP-MAD) with an advanced, web-app mobile interface for shoppers. Collectively, the platform helps promotion-marketers and retailers join the ranks of performance marketers with tools that reach customers and drive action.

The exchange is specifically engineered and configured to move CPG and FMCG advertising and promotion spend into mobile platforms. The exchange's auction is multi-party additive, and accepts multi-variable and disparate deal offers that allows bidders using game theory mathematics to bid additively (e.g., marketer performance bid and product deal offer+ad network product deal offer+retailer product deal offer) in order to facilitate a predictable number of targeted shopper bargain-winners and generate high consumer utility and constant usage. The auction informs the bidding process with a bargain-value score. Advertisements with a higher combined audience bid and bargain-value score results in a higher ad ranking generated by the auction's advertisement-positioning engine and more shopper views. In a practical sense, bid-based bargain-targeting permits the system to allocate shopper winnings in such fashion as determined by quantitative analytics and game theory analysis, using machine learning, to maximize customer (user) initiated interactions with the system sufficient to make audience delivery predictable, large in scale, and pull-based (high value). The auction, in essence, permits advertiser bidders to "dial-in" a predictable and predictable audience delivery, which could be of significant scale, if desired. A very efficient mobile advertising market has been fashioned for promotion-marketing where none has existed hereinbefore.

The exchange's auction may be a real-time bidding auction that provides for a system and method to influence an advertisement's position within a non-keyword search results list or other display generated by an advertisement-positioning engine. More particularly, the principles of the present invention relate to a system and method to enable a promotion-marketer (advertiser) (i) to bid for a ranked position in a standalone results list and/or (ii) to define a relationship of its product advertisement to product advertisements of other advertisers in a non-keyword search results list by selecting a bid relationship term (e.g., UPC code, product category, product name, physical location of store, inventory of store, time of day, etc.) relevant to other advertisements on a logical-related or contextual relevant basis so as to influence the results list generated by an advertisement positioning engine, (iii) to create a means for advertisers to bid for specific (physical location) retail-based audience delivery in an online auction environment and generate media revenues thereto, and (iv) to create an auction-ranked listing based on the bids and scoring of the advertisers' (e.g., in-store promotion brand marketer) submitted promotions. In one embodiment, when a shopper taps an NFC-enabled mobile device to an NFC tag, a connection is initiated to a Uniform Resource Identifier (URI) endpoint indicated by the tag, where the advertisement position engine generates a ranked results list for display with an advertiser's advertisement position influenced by the particular physical location and inventory of the retail store, and any additional relative positions ranked by one or more product relationship-based parameters defined by the advertiser. Non-NFC implementations for "tapping in" may be utilized in accordance with the principles of the present invention, as well, as further described herein.

With regard to FIG. 1A, an illustration of an illustrative retail environment 100 in which the principles for the present invention may be utilized is shown. The retail environment 100 may be a grocery store, clothing store, or any other retail store or environment (e.g., stadium, outdoor mall, street on which retail stores exist, etc.) is shown. Outside of an entryway 102 of the retail environment 100, two tags 104a and 104b (collectively 104) that may be utilized by a user of a mobile device capable of executing a mobile browser or application are provided. The number and location of tags may vary. The tags 104 may include indicia that, when interpreted by the mobile device, may cause the mobile device to connect to a particular URI endpoint or upload particular parameters to a server that, in response, causes advertisements and other information to be downloaded to the mobile device of the shopper. The indicia may include a URI with embedded information representative of a geographical location (e.g., physical address, department, aisle, zip code) and/or non-geographical location (e.g., retailer name, retail store number, etc.) at which the tag is located. As a result of the tags being positioned in a fixed manner, these tags define a place-based mobile media content distribution network. Such content distribution is different from, and counter-intuitive to, other forms of place-based media in two ways: (1) the direction of the media flow in this example, called "pull-media," which is of particular value for advertisers because pull-media is of comparatively greater value than traditional "push-media," which is typically found in traditional place-based and location-based media sites as well as conventional website advertising, and (2) the viewer is exposed to place-based media content by using a hand held mobile device, and, as such, receives content in a completely different manner than is possible for conventional place-based media that generally presents content for a given time period (e.g., weekly) in a static, printed manner (e.g., same for all shoppers).

The tags 104, in one embodiment, may include a near field communications (NFC) tag that, in response to a shopper placing the mobile device to the tag, communicates an indicia stored in the NFC tag to the mobile device either actively or passively, as understood in the art. Alternative indicia delivery technologies, such as RFID, Bluetooth or WiFi beaconing, QR codes, and so forth that provide for "pull" content may be utilized. That is, if a mobile device is not configured with NFC, Bluetooth, or WiFi capabilities, an image of an indicia, such as a QR code, bar code, or any other indicia, may be displayed on the tags and the shopper may capture an image of the indicia for use by an application or direct a browser to a URI endpoint from the indicia being executed on the mobile device. Although a mobile app may be utilized by the mobile device, the use of a website that "feels" like an app via a browser may be more readily accepted by users of mobile devices because of convenience and less intrusiveness, as has become a general feeling by users of mobile apps. Such use of a browser may be inherently provided on mobile devices through the use of an NFC protocol and Bluetooth beacon and WiFi protocols. That is, an NFC enabled mobile device may receive a URI from a tag and automatically launch a browser on the mobile device to open the network address or web page in the URI that was read from the tag.

Figure 1B:
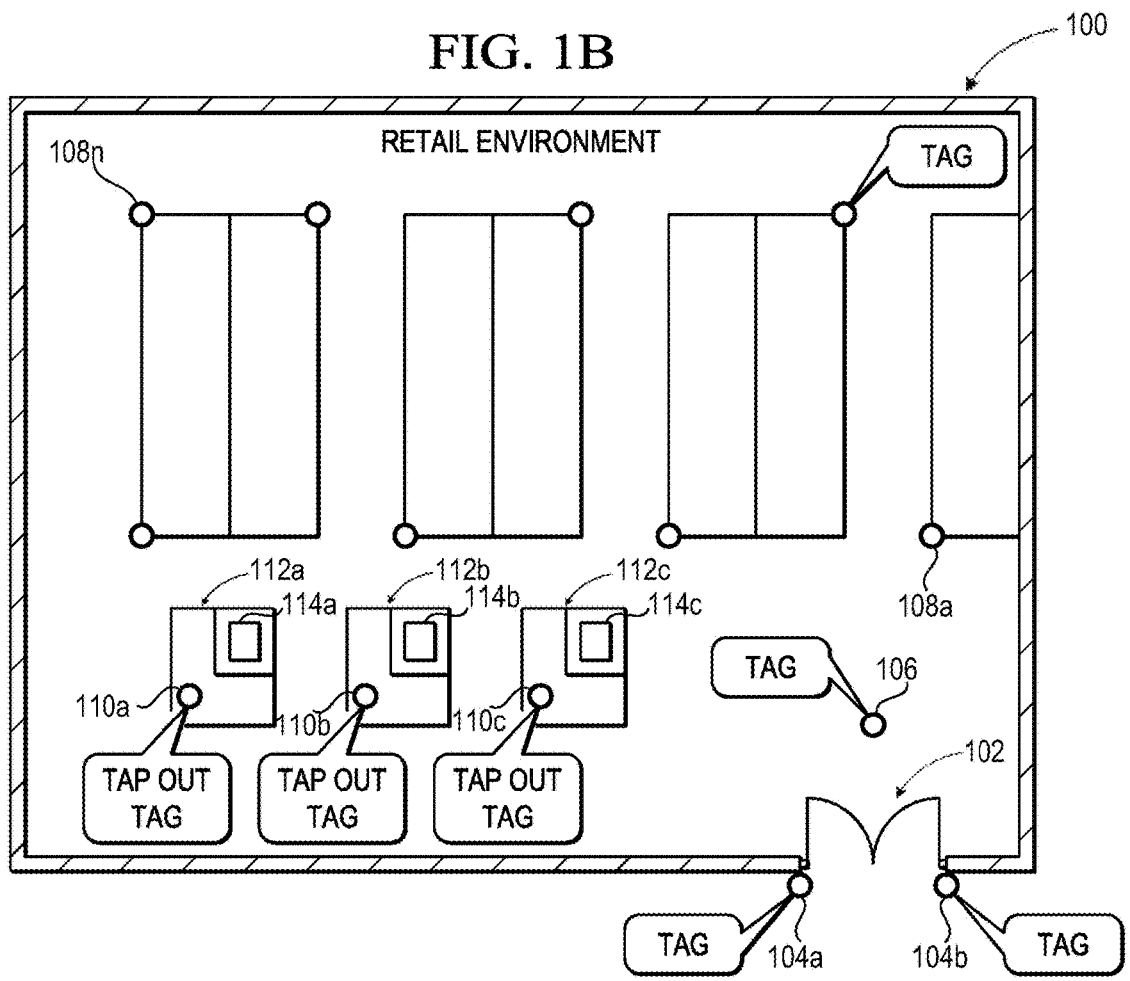
FIG. 1B is a plan-view illustration of a retail environment of FIG. 1A.

With regard to FIG. 1B, an illustration of the retail environment 100 of FIG. 1A is shown as a plan view. As shown, the tags 104 outside the doors of the retail environment are shown in addition to having a tag 106 just inside the door of the retail environment 100 is also available to shoppers as they enter the doors of the retail environment 100. These tags 104 and 106, if accessed or utilized by shoppers with mobile devices, may cause the mobile devices to access a mobile web page that, in response to an indicia stored by the tag (e.g. NFC tags storing a URI in a memory, image of a QR code, etc.), may include product advertisements for deals that are currently available within the retail environment 100 that are provided by manufacturers, retailers, distributors, marketers, ad agencies, and/or ad distribution network manager of products that are being sold within the retail environment 100. In one embodiment, the advertisements and other content may be displayed on a webpage in an interactive list (see FIGS. 3B-3D) with selectable items in the list. The list may be a ranked list of advertisements for which ranking is based on an auction that advertisers may participate in to influence their advertisements' position on the list, expecting that higher prominence on the list relative to other advertisements will likely improve the chances that shoppers entering the retail environment 100 will see their advertisement and purchase their products. The tags 104 and 106 near the entryway 102 may be considered entryway tags that have indicia associated with a URI endpoint (or main listing within an app) that list advertisements for products throughout the entire retail environment 100. Shoppers may "tap-in" to these tags using a mobile device upon entering the retail environment 100, thereby operating a customer initiated interaction with the ad distribution network causing a ranked list resulting from an ad auction, as further described herein, to be downloaded to the mobile device in order to inform shoppers of deals currently available for products in the retail environment 100.

In an addition to the tags 104 and 106 positioned at the entryway 102 of the retail environment 100, other tags 108a-108n (collectively 108) may be positioned throughout the retail environment 100 that are associated with isles, categories, departments, or otherwise within the retail environment 100. Each of these tags 108 may also include indicia that are associated with URI endpoints that deliver ranked lists of product advertisements within those particular isles, departments, or otherwise in a same or similar manner as the advertisements that are associated with the tags at the entryway 102 of the retail environment 100.

As further shown, "tap-out" tags 110a-110c may be positioned at checkout counters 112a-112c of the retail environment 100. When "tapped" by the shopper using the mobile device, the mobile device may be caused to perform checkout procedures for the shopper. The checkout procedures may include tallying or collecting all coupons, discounts, incentives, etc. (i.e., the deals as further described herein) that the shopper has accumulated via the selectable items in the interactive, rank-based product advertisement list and producing information that a checkout terminal or point-of-sale (POS) 114a-114c can use to apply deals for the products purchased by the shopper, as further described herein (see FIGS. 22 and 23). The POS 114a-114c may be operated by a cashier or shopper, as understood in the art.

For the purpose of this description, a "coupon" is a voucher that is offered by a manufacturer and compliant with governmental coupon laws. A "discount" is any money savings offer to a shopper for a discount of a product available for purchase, where a discount may include a coupon along with other money savings offered by the manufacturer, retailer, ad distribution service provider, or otherwise. An "incentive" is any product offer used to incentivize a shopper to purchase goods, where the incentive may or may not include a product discount (e.g., "purchase three products, receive an entry into a sweepstakes"). A "sweepstakes" is a contest in which a prize is awarded.

Each coupon, discount, incentive, sweepstakes transaction or any combination thereof is a "deal." In one embodiment, a deal may be considered a ratio of discount versus retail price (e.g., manufacturer suggested retail price (MSRP)). As provided herein, however, deals may take forms other than discounts, such as an incentive offer that does not provide for a discount. Each of these coupon, discount, incentive offer, sweepstakes transaction, or deal may be uniquely identified and established at "tap-in" by a shopper or by other means as described below. That is, a unique code may be applied to each deal and each item (e.g., coupon) that forms the deal that is generated and distributed to shopper. The unique code(s) may be created by using one or more of a manufacturer ID, product, UPC code, advertiser retail environment, retailer store, physical location at which a tag used for "tap-in" is positioned (e.g., entryway), date and time, mobile ID, user ID, etc. to provide for traceability of coupons and to comply with governmental rules to the extent necessary.

The principles of the present invention provide for a user or shopper to access deals in alternative manners than "tapping" the tags 104, 106, and 108 in the retail environment 100. Rather than using physical tags, the principles of the present invention provide for a mobile app to be used and enable a user to tap a soft-button or otherwise activate the mobile app to initiate a request to provide an ordered list of bidded deals at the retail environment at which the user is or intends to shop. Prior to initiating the request, the user may select a particular retail environment via the mobile app or other user interface. Additionally and/or alternatively, a website or other user interface may enable a user to request an auction-ranked list of deals for a selected retail environment. The auction-ranked list of deals may be selectable and stored in association with the user (e.g., user account as identified by or associated with a shopper loyalty card, phone number, bank card, or other unique identifier that may be accessed before, during, or after a shopping trip by the user and ad network to provide the selected deals to the user.

With regard to FIG. 2, an illustration of a retail environment 200, in this case a mall, inclusive of multiple retail stores 202a-202n (collectively 202) throughout the retail environment 200 is shown. Entryways 204a and 204b (collectively 204) on each side of the retail environment 200 may include tags 206a-206n (collectively 206) positioned outside and inside of the entryways 204 through which shoppers entering the retail environment 200 may access. Those tags 206 may include indicia that are associated with a webpage that is configured to present advertisements of products being sold in the retail stores throughout the retail environment 200. Advertisements to be displayed on the webpage associated with each of the tags 206 at the entryways 204 to the retail environment 200 may be the result of bidding for higher relative position to other advertisements, thereby allowing all the people who enter the retail environment 200 to see each retailer's or product manufacturer's advertisements based on auction ranking. As also shown, each of the retail stores 202 within the retail environment 200 may also have tags 208a-208n positioned at entryways 210a-210n of their respective retail stores 202. The tags 208 at the entryways 210 of the retail stores 202 may include indicia associated with URI endpoints that deliver auction-ranked advertisements (i.e., advertisements of products that are being sold in each of the respective retail stores 202, as opposed to advertisements for products being sold in any of the stores in the retail environment 200) for those particular retail stores 202.

In addition to tags being placed on fixed locations at a retail store to operate as place-based mobile media initiation points, tags may be affixed to shopping carts (not shown), such as attached to handles of shopping carts, that enable a shopper to "tap-in" or scan an indicia printed thereon. These shopping cart affixed tags may provide for the same or different content to be generated and distributed to a mobile device of a shopper as those that are fixedly positioned at the same retail store or environment. As an example, the shopping cart affixed tags may provide for "browsing shopping" deals when a shopper "taps into" the tag on the shopping cart since it may be assumed that the shopper is planning on purchasing a full basket load of products. If the tags are affixed to hand-carry shopping baskets, then "high-speed shopping" deals may be presented to the shopper when a shopper "taps into" the tag on the basket since the shopper does not intend to purchase heavy goods.

Additionally, the system may be configured to monitor product and service consumption and usage behavior of individual shoppers in determining deals to provide to the respective shoppers. For example, if a shopper "taps in" at a retail store once per month, then the system may provide deals that might be more attractive to the shopper in an attempt to encourage the shopper to "tap-in" each time the shopper enters the retail store (assuming the retail store is one, such as a grocery store, that the shopper would be expected to visit more than once per month). Also, if the shopper "taps-in" at an entryway of the store, but not anywhere else, the system may make certain deal offers to the shopper that may encourage more "tap-ins" throughout the retail store. These deal offerings are driven by one or more parties that are able to make a deal offering for a product, but those deal offerings may be dynamically and automatically adjusted by the system based on parameters and rules established by one or more of the parties, as further described herein. As an example, the manufacturer may incorporate into its bid submission for a coupon to be dynamically altered within a range of $0.50 and $3.00, and the system, in determining that the shopper is a frequent user of the system and an historical purchaser of the product of the manufacturer, may offer a lesser coupon value to that person than a shopper who is a less frequent user and a low or no purchaser of the product of the manufacturer as the less frequent user and low or no purchaser may need additional motivation to try the product. At a certain point, the system may consider that a particular shopper will not purchase the product at any price and, therefore, cease advertising that product advertisement to that shopper. By being able to target and vary deals being offered to select audiences, promotional advertising spend may be more efficiently applied to grow a loyal customer base for a marketer. The various deals that are to be presented may be determined by the URI or other data that is stored in the tags, and the system may post an associated non-search results listing to that site (or via a mobile app or otherwise).

Figure 3A:
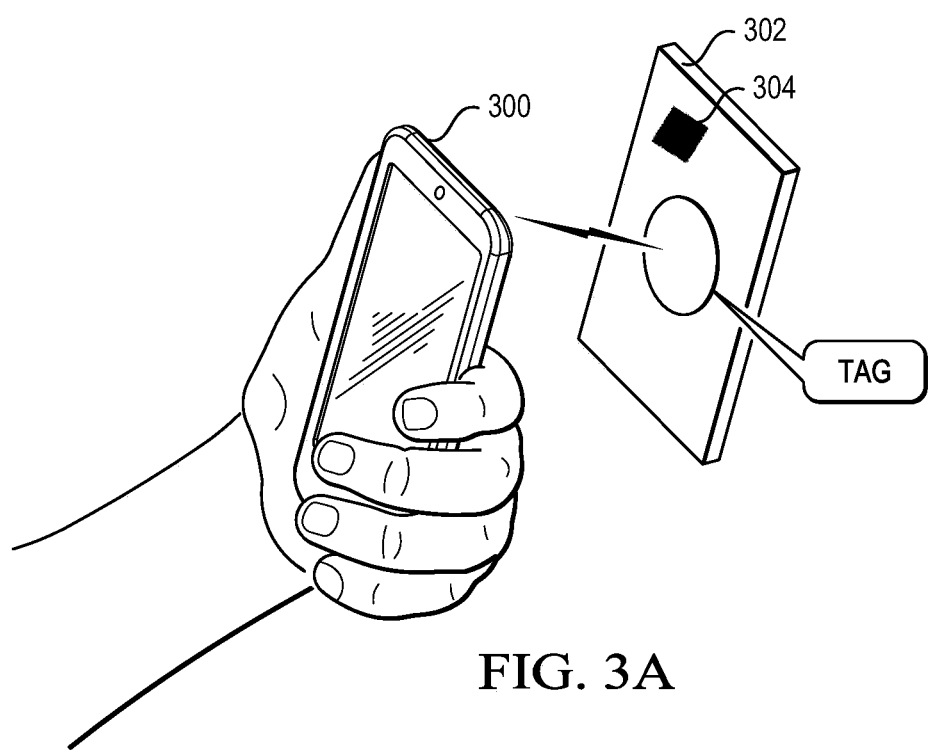
FIG. 3A is an illustration of a mobile device that is NFC enabled being placed next to a tag that is NFC enabled that stores an indicia, such as a uniform resource identifier.

With regard to FIG. 3A, an illustration of a mobile device 300 that is NFC enabled being placed next to a tag 302 that is NFC enabled that stores an indicia, such as a URI, is shown. If either the mobile device 300 or the tag 302 is not NFC enabled, then an indicia 304, such as a QR code, may be displayed on the tag to be read by the mobile device using a camera on the mobile device, as understood in the art. The QR code may be an indicia that includes the same or similar information as would an NFC tag. That is, the QR code may represent a URI that causes the mobile device to have its browser download a webpage associated with the URI. Alternative mobile technology capable to cause a mobile device to have its browser download a webpage or open a native app that subsequently opens a browser download or reading technologies and protocols may be utilized for QR codes or other indicia than for NFC tags, in accordance with the principles of the present invention.

Figure 3B:
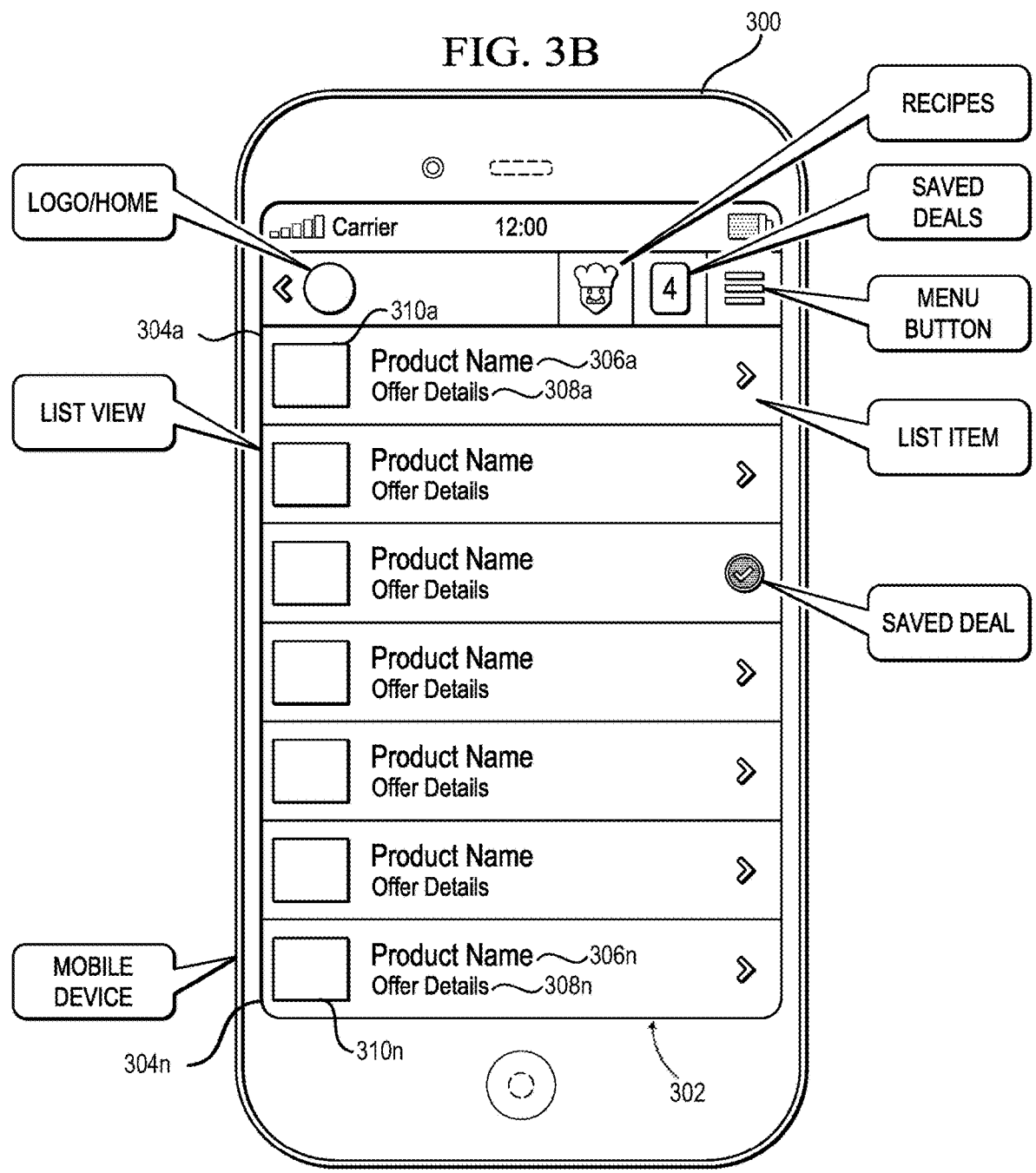
FIG. 3B is an illustration of a mobile device displaying an illustrative webpage configured with a list of advertisements of products available for purchase or use within a retail environment or place-based mobile media.

With regard to FIG. 3B, an illustration of the mobile device 300 displaying a web application 302 configured as a ranked list of advertisements 304a-304n (collectively 304) is shown. Each of the advertisements 304 may display a product name 306a-306n, deal offer details 308a-308n, images of the product 310a-310n, and so forth, that is locally available for purchase, generally, by the mobile device user in the retail location. As understood in the art, the ranked list of advertisements 304 is scrollable, such that the shopper may slide the list up and down to display additional list items (not shown). Other premium ad display configurations, such as highlighted or flashing ads, may be utilized. In one embodiment, a "sticky" ad (i.e., an ad that remains in a viewable position on the screen even if scrolled or altered) (see FIG. 3D) may be posted to the user interface, such as at the bottom or top of the ranked list 304, by the advertiser paying a premium price or bidding a higher amount for a premium listing. In one embodiment, an ad may be displayed with a special background or other highlighted manner, thereby causing the shopper to pay special notice to the highlighted advertisement. The listing 304' provides advertisements of products available for purchase or use at the particular retail store is or will be shopping. As further understood in the art, the list 304 may be interactive, thereby enabling a shopper to "tap" or select list items 304a-304n in order to request additional information of the selected item displayed in another view, such as a template page relative to browser position in a single-page web browser application, or an additional webpage download.

With regard to FIG. 3C, a listing of advertisement 304a'-304n' (collectively 304') with more specific information of products available for purchase in a grocery store is shown. The listing 304' provides advertisements of products available for purchase or use at the particular retail store is or will be shopping.

In response to the shopper selecting a listing from a list of ranked advertisements to cause a product view (see FIGS. 4A and 4B) to be displayed, that product deal offer may be automatically saved to a "deal basket" rather than having the shopper to select a graphical user element to save the product deal offer, thereby simplifying a shopper's experience with the user interface and creating "frictionless" interaction with the shopper so as to improve system usage over a long term basis. In an alternative embodiment, any product deal offer that is displayed for a viewer, either on the auction-ranked list or product view, may automatically be saved to a "deal basket." As previously described, the ranked listing 304' shows product names 306', deal offer with brief details 308n', and product images 310'. As an example, Welch's® Grape Jelly 306a is being offered to shoppers in a 32-ounce container size on a "buy three, get one free!" deal 308a as understood in the art of incentive coupons and sales. In one embodiment, both a product manufacturer and a retailer may offer a deal on the same product, as further described herein. Such deals are often available to shoppers as a product coupon from the manufacturer and a price discount or sale from the retailer, but printed in different publications (e.g., weekly circular, Sunday paper, printed in-store promotion materials on or off shelf), and available to shoppers in different locations (e.g., in-home or in-store).

Traditionally, manufacturers and retailers promote goods using coupons, discounts, or incentives in different periodicals. In order for shoppers to take advantage of these multiple source discounts or incentives, the shopper has to collect the manufacturers' product coupons and retailers' sales, deals, and/or product incentive offers. In accordance with the principles of the present invention, rather than having the shopper find and collate the multiple discounts for the same item from different discount sources (e.g., retailer circulars, newspaper ads, local coupon books, etc.), the mobile device's display may simply show a multiple or aggregate deal offer identifier 312a-312n (collectively 312) in association with each of the product advertisements 304a'-304n' in the list that have multiple or additive deal offers being offered, which may include non-paid ad listings.

In the six illustrative advertisements with multiple or aggregate deal offers, shown with "2×" and "3×" identifiers 312, the offered incentive 308b' of Skippy® Peanut Butter 304b' is "sale $3.99 and $1.50 MFG coupon!," while in the Olay Total Effects advertisement 304n', the offered deal 308n' is $11.25, which is composed of a $5 discount or coupon from the manufacture, including a $5 price reduction from the retailer, and a $1.25 discount from the ad network service provider. The ad network service provider that distributes ads to shoppers in response to shoppers' mobile devices reading the indicia from the tags may offer an additional deal for the product to the shoppers for a variety of reasons, such as incentivizing both an advertiser and shopper to participate on the ad distribution or delivery network or intensifying greater level and more predictable shopper system usage by increasing shopper savings. In an alternative embodiment, rather than showing a breakdown of the deal (e.g., discounts), a single deal that is an aggregate of the deals being offered by each of the multiple parties may be listed without specifying which parties are providing what amount of deal offering. By not providing a specific party that is providing a specific deal offer, the advertisement delivery network provider may add deals to products without the shoppers (or ad participants) knowing how the deal was created. Various options for implementing the aggregate deal are further described herein.

As further described herein, the aggregate deals may be formed by bid submissions being (i) in parallel, where none of the participating parties know of deals being submitted for a product by the other parties, or (ii) in series, where a first deal submission party (e.g., manufacturer) may not know of successive deals being submitted on the same product for the same retail environment by other parties (e.g., retailer and ad distribution network provider). In such a series aggregate auction system, the last party to submit a deal for a product may, in fact, have a larger influence of the ranking of the advertisement for the product because the last party can add a better deal to the product to cause the advertisement to be ranked higher. And, if the system is configured to enable the ad distribution network provider to submit a single or additive product deal offer, whereby such additional offer affects the ranking of the product advertisement, the ad distribution network provider may continue to increase the final deal component to push the ranking higher. It should be understood that alternative combinations may be used to allow for other aggregate parties to receive feedback of the ranking to allow the other parties to real-time adjust the ranking, including an automated or "programmatic" system that allows for adjustment of bid and deal submissions (e.g., dynamic coupon adjustment) that causes an advertisement to increase in ranking. Such programmatic deal offer creation may enable an advertiser and contributing parties, if any, to purchase a desired viewership or audience of shoppers.

As previously described, factors other than bids and deals may affect ranking of an ad. Such other factors may include ad view-to-purchase ratio, measured ad interactions ratio, shopper profile and demography, shopper preferences, and/or other factors. The view-to-purchase ratio describes a ratio of times that a product ad is viewed, but the product is not purchased during that shopping trip. An ad interaction ratio is a ratio of a number of interactions with a particular advertisement versus the number of displays of the ad. These and other factors may be utilized when ranking an ad, as further described herein.

In one embodiment, deals on products may be normalized so that the deals, which may come in many forms, may be compared on an "apples-to-apples" comparison basis. If, for example, the deals being offered by multiple-parties are all discounts, which may be inclusive of a coupon from the manufacturer, then a discount relative to a manufacturer's suggested retail price (MSRP), actual retail price as set by the retailer, or otherwise may used to produce a value index or ratio, thereby creating a normalized means by which deal value to actual shoppers can be determined. In other cases where discounts are not used, but rather incentive offers, such as "buy one, get one free," other value indices for the deals may be applied to these alternative deals. As another example, in the case where a sweepstakes entry is offered for purchasing multiple products, another value index may be applied. A predetermined value that correlates or balances disparate deals of similar value may be utilized in providing for a system that provides for best deals in combination with bids to be higher ranked than lesser deals. A points or other rating system for the disparate deals may be utilized in the ranking process.

In supporting disparate bid submissions for disparate deal types (e.g., percent discount, specific amount of discount, group product purchase discount, etc.), a normalization may be performed to create the apples-to-apples comparison for the real-time auction. The normalization may provide different weighting factors for each type of deal type and deal value for each deal type. Other normalization factors may be utilized so that each deal type and deal value or value index can result in a bid submission to the auction for selection of winning deals for each ad spot (e.g., auction-ranked list, adjacency ads, category list, recipe ingredients, and so on).

In the case of an additive bid submission with two or more bidders, the first bid submission type may define the type of bid type that is to be bid for an ad of a product. Thus, secondary bids on the same product may add to the index value of the bid. For example, if the first bid is a percentage bid, such as 20% discount, then additional percentages may be added from second bidders, such as 5%, for a total percentage bid on a product, such as 25% discount. As another example, if the first bid submission is a buy 3, get 1 free type of bid, then subsequent bid submissions by other parties may add to the discount, such as buy 3, get 2 free. Alternatively, the additive nature of the bids may be disparate (e.g., buy 3, get 1 free plus another $0.50 discount), and the real-time auction may determine an index value as compared to other additive bid submissions (e.g., a second bid submission for another product with a buy 1, get one free would be less value than buy 3, get 1 free plus another $0.25 discount). That is, a total value of an additive bid submission may be determined and normalized so as to compare to other additive bid submissions for other ads to the auction.

Figure 3D:
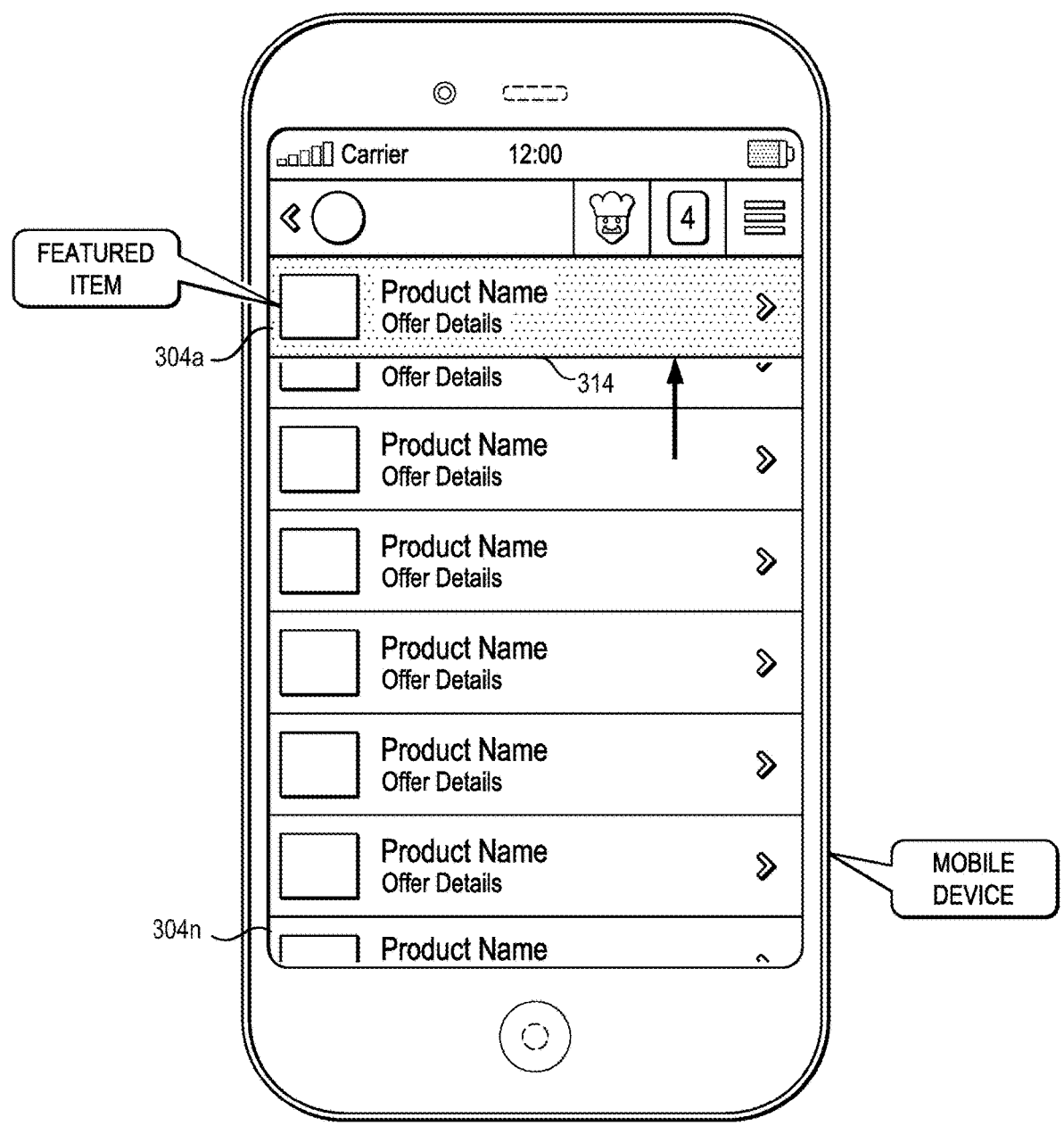
FIG. 3D is an illustration of an illustrative ranked listing of advertisements of products inclusive of a featured item that is fixedly positioned at the top of the listing.

With regard to FIG. 3D, an illustration of an illustrative ranked listing 304 of FIG. 3B of advertisements 304a-304n of products inclusive of a featured "sticky" advertisement 314 that is fixedly positioned at the top of the listing is shown. The featured "sticky" advertisement 314 may be colored or highlighted. The featured "sticky" advertisement 314 may be positioned in any location on the list 304 or may be shaped different from the other listings (e.g., oval).

Figure 4A:
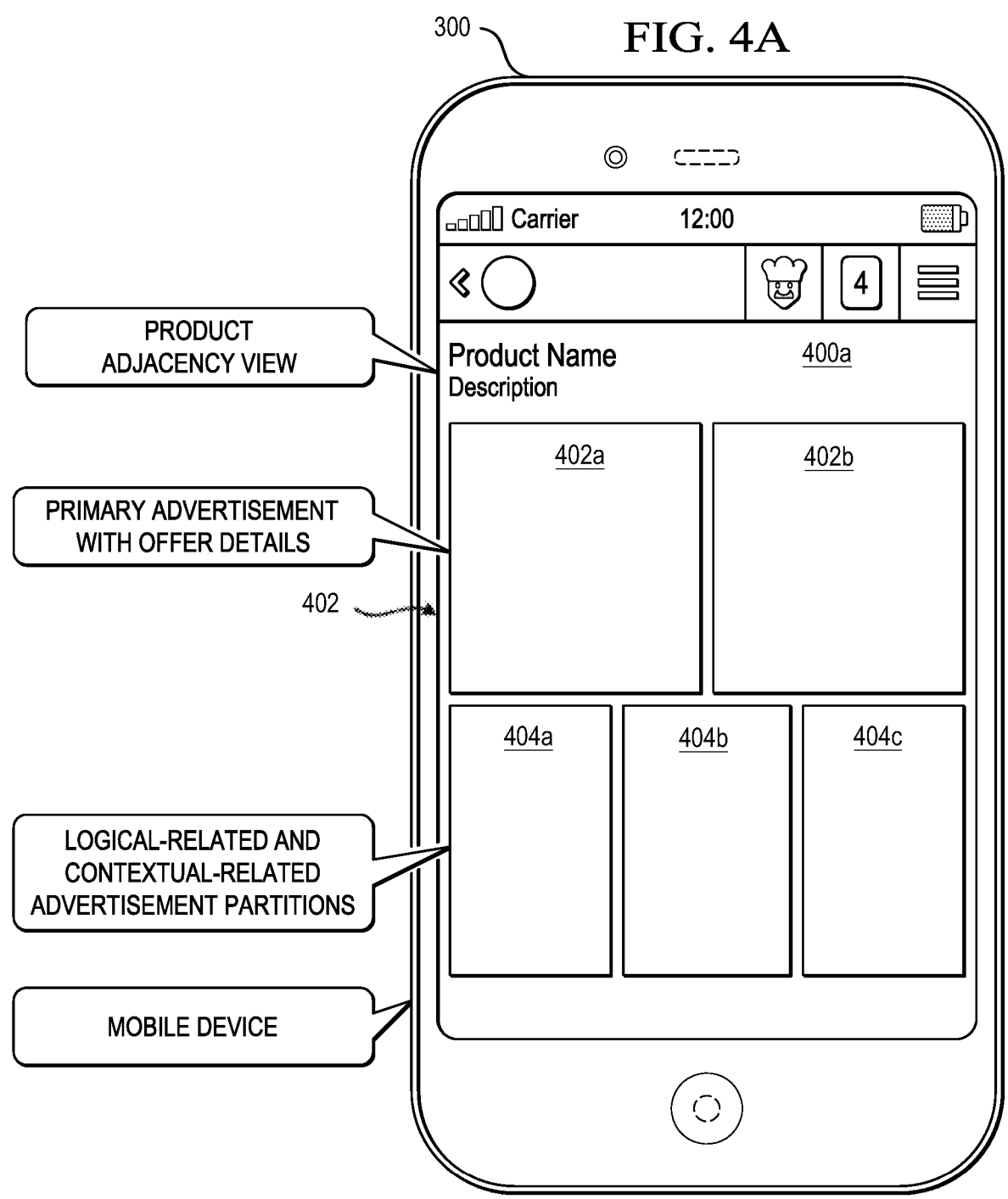
FIG. 4A is an illustration of an illustrative product view associated with an advertisement listed in FIG. 3B.

With regard to FIG. 4A, an item or a product view 400a is shown on the mobile device 300 in response to a shopper tapping or selecting a particular product advertisement (e.g., 304a) from the interactive list 304 of FIG. 3B is shown. The product view 400a may be a partitioned user interface that includes a primary advertisement 402 inclusive of a product image area 402a and offered details of a product, which may include a product name, product description, and images in a deal offer area 402b. In addition to the primary advertisement 402, logical and/or contextual related advertisements 404a, 404b, and 404c (collectively 404) may be displayed beneath the primary advertisement 402. The related advertisements 404 or product adjacency advertisements may be displayed beneath the primary advertisement in multiple fields, such as rectangles, and be considered adjacency ads. A logically related advertisement may be an advertisement of a product that is logically related to the primary advertisement being displayed. For example, if the primary advertisement is for peanut butter, logically related products (non-category related items) that may be advertised in the related advertisement partitions may include jelly, bread, chips, soft drinks, paper plates, milk, etc. Contextually related (category related) advertisements for peanut butter may include jelly, marshmallow spread, and other spreads, such as alternative peanut butter products. In some cases, products may blur across both logical and contextual relationships.

A shopper may select one of the adjacency advertisements 404 and be presented with a product view 400a with a primary advertisement 402 of the product previously shown in the adjacency ad that was selected. This new iterative product view 400a may also display adjacency ads 404 beneath (or elsewhere) that are logically and/or contextually related to that product in the primary product advertisement 402. Such a hierarchical configuration may be substantially unlimited.

Each of the adjacent ads 404 may compete in an adjacency ad auction to be ranked high enough, in this case in the top three, to be displayed with a primary product advertisement 402 being displayed. The three winning adjacency advertisements 404 are considered "above the fold" with an unlimited number of adjacency ad listings "below the fold." As further herein described, competing for a high auction results list ranking in the adjacency ad auction may come in the form of bidding for audience delivery on a pay-per-view (PPV) or other cost-per-action (CPA) basis, where bidding may be inclusive of offering a (i) deals for shoppers by the manufacturer or advertiser, retailer, ad network manager, distributor, agency, etc. and (ii) the relevant logical and/or contextual related product bid "terms" (e.g., UPC code of a related product, product category, related product name, etc.) for relative (adjacency) product advertisement positioning. By providing such a substantially unlimited configuration, shopper audiences see additional and related product savings available in a retail location while advertisers, including a retailer advertiser, have more opportunity for their advertisements to be viewed by shoppers and, therefore, improve chances for the advertisers' product(s) to be purchased during a shopping trip. Heretofore, such advertisement adjacency opportunity in the retail store was limited to static displays of products or signage. Moreover, additional revenue may be generated due to additional ad space bidding, ad viewing, etc. for the ad network, retailer, and other participants, while shoppers are provided an opportunity to both save more money and shop more efficiently by being reminded of necessary and related products that may be included in the shopping trip.

By providing for adjacency ads relative to a primary ad, as shown in FIG. 4A, advertising strategies by a single or multiple companies (e.g., affiliated companies) may offer successive adjacency deals (two or more), whereby successive deals may include dependent or contingent deal on a second offer available only in the event the shopper takes home or purchases the primary deal. The contingent deal is not available in the event the primary deal offered is not purchased or acquired. The successive deals advertising strategy may incentivize a shopper to "shop the store" and purchase more products than he or she would otherwise.

Figure 4B:
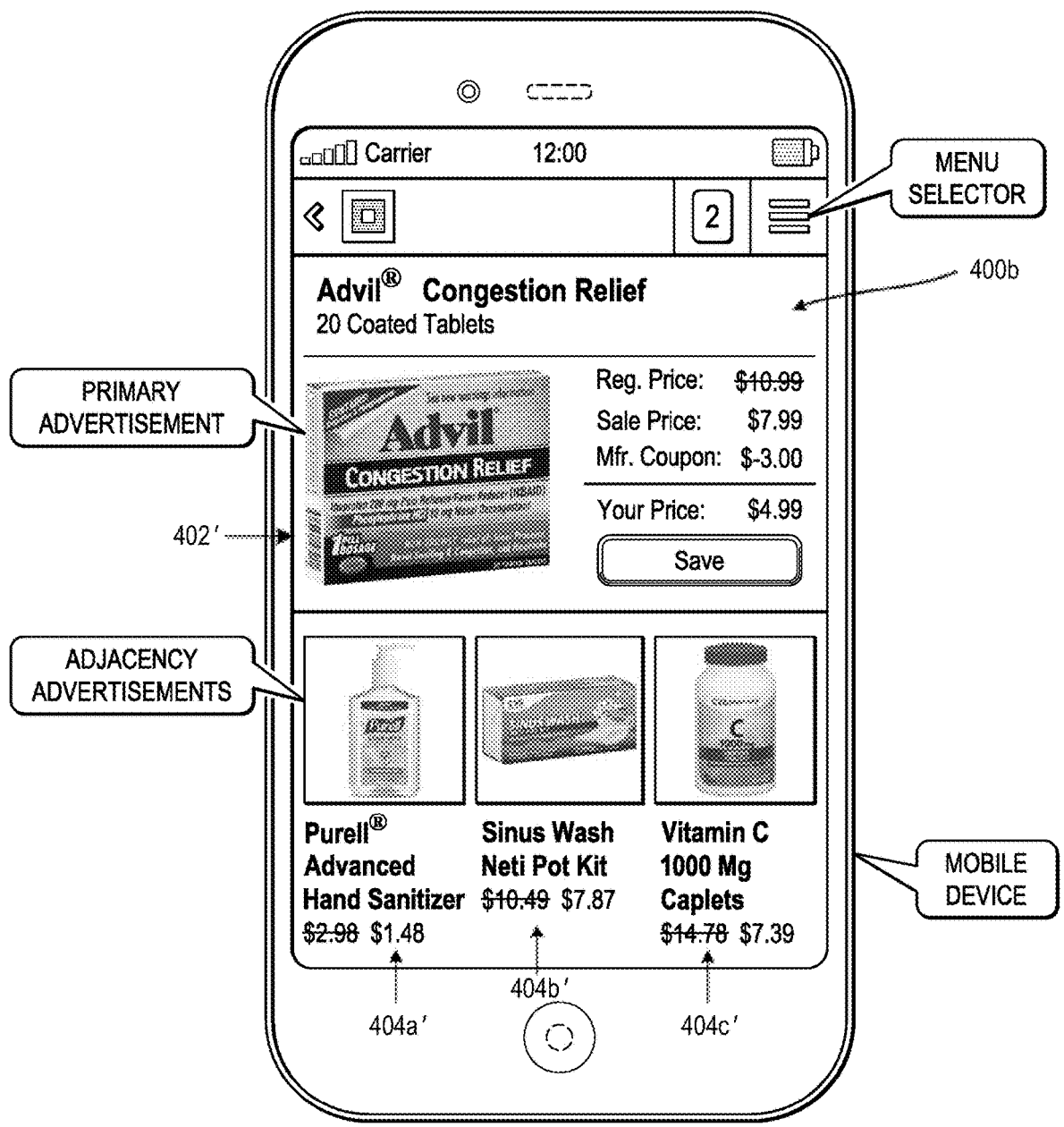
FIG. 4B is an illustration of a more detailed product view page.

With regard to FIG. 4B, an illustration of a more detailed product view page 400b is shown. The product view page 400b may show a primary advertisement 402', in this case Advil® Congestion Relief, and below the primary ad 402' may be adjacency product advertisements 404a', 404b' and 404c' (collectively, 404') contextual and/or logical related products, such as Purell® Advanced Hand Sanitizer, Sinus Wash Nettie Pot Kit, and Vitamin C.

The principles of the present invention provide for product adjacency ads 404' to be presented on a partitioned product page that shows a primary product advertisement 402' with logically and/or contextually related product advertisements 404' associated with that primary product advertisement 402'. These same product adjacency principles may be utilized on other forums and media, such as online networks, publisher websites, and shopping networks or incorporated into search engine results, and distributed over communications networks, such as the Internet.

Figure 4C:
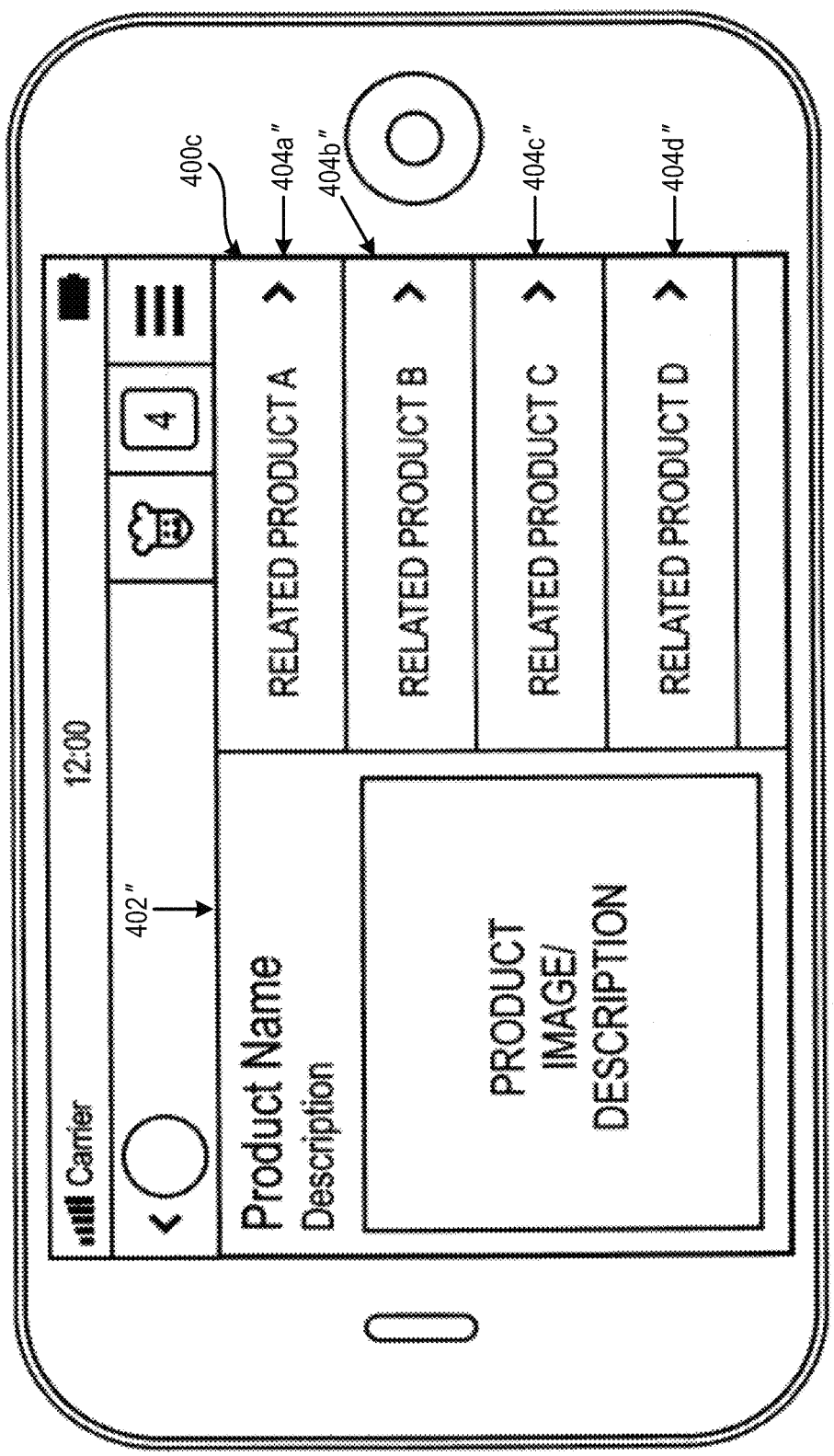
FIG. 4C is an illustration of an alternative product view page having a landscape view.
Figure 4D:
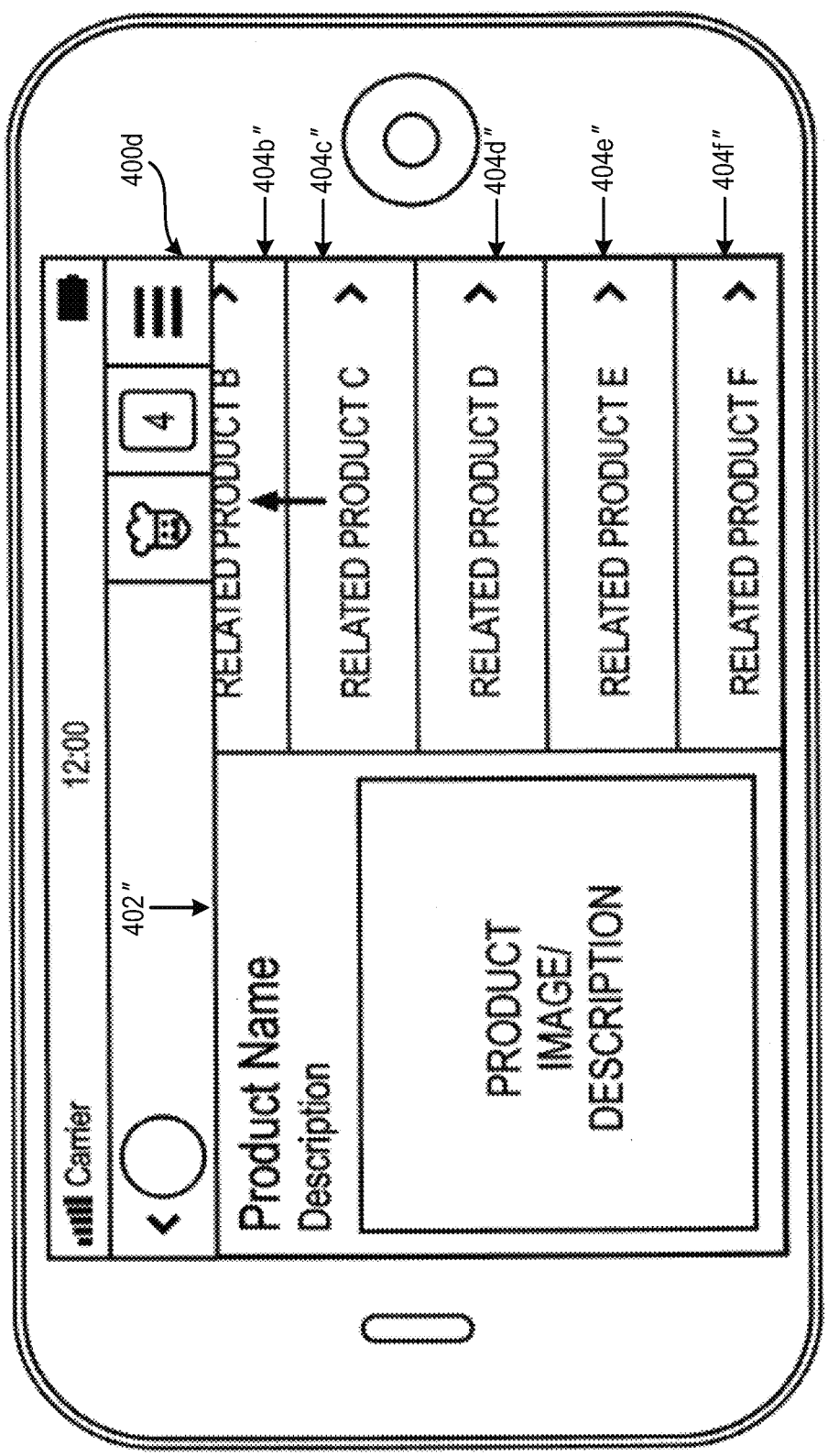
FIG. 4D is an illustration of a product view page that includes the primary advertisement and the list of adjacency product advertisements scrolled up so that adjacency product advertisements, which are considered "below-the-fold" advertisements.

With regard to FIG. 4C, an illustration of an alternative product view page 400c having a landscape view is shown. The product view page 400c shows a primary advertisement 402", and to the side, in this case the right side, of the primary advertisement 402" may be adjacency product advertisements 404a", 404b", 404c", and 404d" (collectively 404"). The adjacency product advertisements 404" are contextually and/or logically related products to the product shown in the primary product advertisement 402". The adjacency product advertisements 404" are scrollable and interactive, such that a user may slide the list of adjacency product advertisements 404" up and down to show an additional adjacency product advertisements 404", as shown in FIG. 4D. The user may select an adjacency product advertisement to cause the adjacency product advertisement to be displayed in another page as a primary advertisement. The software being executed by the mobile device may be configured to automatically change the product view from that of FIG. 4A to 4C automatically, including changing or resizing the information being displayed to adjust for the format in orientation. Moreover, depending on the format of the screen, such as resolution and dimensions, the number of adjacency product ads may increase or decrease, change the amount and type of information being presented, or otherwise be automatically adjusted.

With regard to FIG. 4D, an illustration of a product view page 400d includes the primary advertisement 402" and the list of adjacency product advertisements 404" scrolled up so that adjacency product advertisements 404e" and 404f", which are considered "below-the-fold" advertisements, is shown. As previously described, "below-the-fold" advertisements may have a lower performance cost than those adjacency product advertisements that are displayed when entering a product view page since below-the-fold ads are considered less valuable. It should be understood that many more below-the-fold adjacency product advertisements may exist, but not shown in the user interface 400d.

In any of the product views, a "survey" soft-button (not shown) may be available for the user to take a survey provided by the marketer of the primary products being presented. The survey may include questions and other information that the marketer might want to learn from the shopper about products. Such information may be beneficial to the marketer and may reduce the amount of money that is often spent on focus groups and be more "natural" due to being anonymous than focus groups. In participating in the survey process, the user may be willing to provide additional deal value to the shopper. The mobile device may upload the results of the survey in a real-time or non-real time manner, such as after checkout when other information may be sent to the ad network distribution provider, which, in turn, may send the results of the survey. Alternatively the results of the survey may be communicated directly to the marketer in any format, such as SMS, and may be encoded. In one embodiment, personal information of the shopper may not be communicated with the survey results, but demographic information may be communicated with the survey results.

Figure 4E:
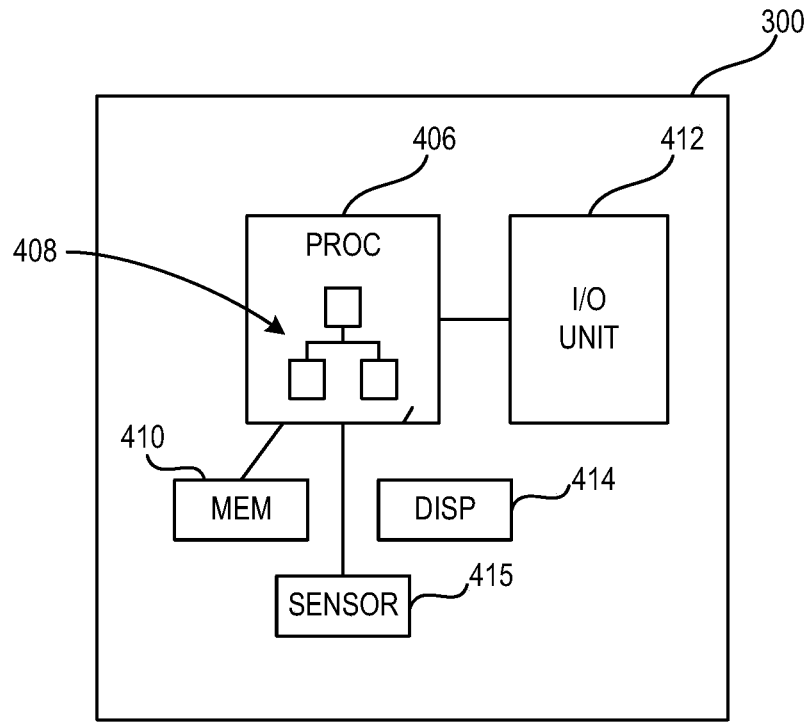
FIG. 4E is an illustration of a mobile device with hardware operating therein.

With regard to FIG. 4E, an illustration of the mobile device 300 with hardware operating therein is shown. The hardware of the mobile device 300 may include a processing unit 406 that executes software 408. The processing unit 406 may be in communication with a memory 410, input/output (I/O) unit 412, and electronic display 414. The memory 410 may be configured to store data, such as deal offers, as previously described. The hardware may further include a sensor, such as a camera, NFC sensor, RFID sensor, Bluetooth® receiver, Wi-Fi® receiver, or any other sensor, as understood in the art.

Figure 4F:
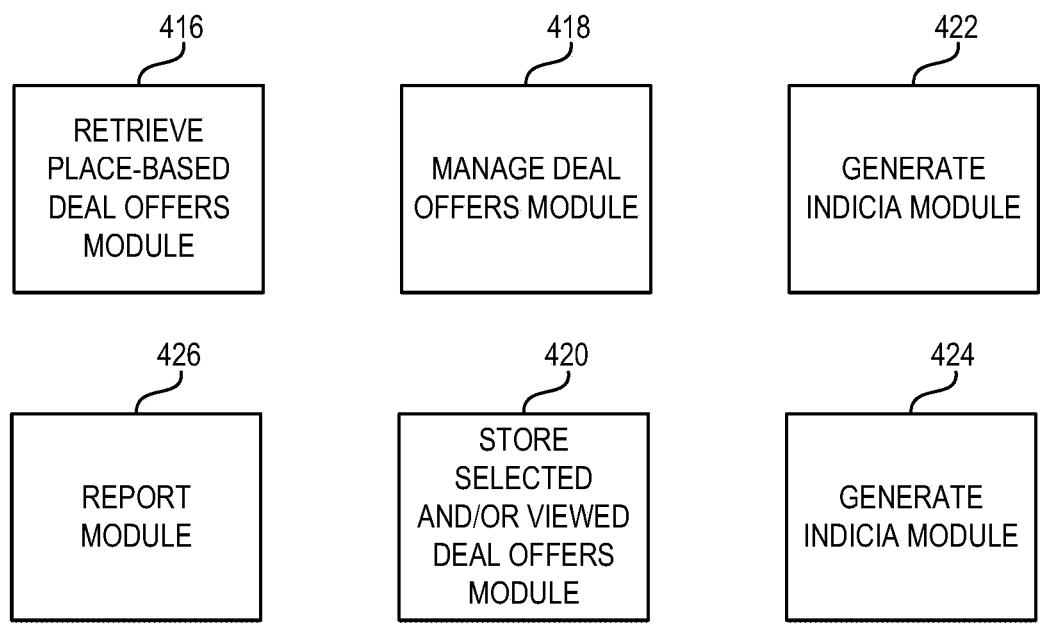
FIG. 4F is a block diagram of illustrative modules that may be executed as part of the software shown in FIG. 4E.

With regard to FIG. 4F, a block diagram of illustrative modules that may be executed as part of the software 408 of FIG. 4E is shown. The modules may include a retrieve place-based deal offers module 416 configured to retrieve deals associated with a particular location in response to an input. The input may include a user using the mobile device 300 (FIG. 4A) to locate deals associated with a location (e.g., entryway of a retail store) or the user operating an app being executed thereon and selecting a particular retail location at which the user is located. In one embodiment, the deal offers are retrieved by the module requesting a URI contained in an indicia (e.g., URI information stored in an NFC tag) input or read by the mobile device. The module 416 may also operate in conjunction with a mobile app.

A manage deal offers module 418 may be configured to manage deal offers that are received from a remote location, such as a server via a mobile communications network. The deal offers may be organized in a particular order, such as an auction-ranked order, that the module 418 uses to store the deal offers. Other techniques for managing the deal offers may be utilized, as understood in the art.

A store selected and/or viewed deals module 420 may be configured to store deal offers that were actively selected or viewed by a user. In storing the deals, information identifying the deals may be stored or otherwise identified (e.g., indicator associated with a record of an existing deal offer) so that the deal offers may be easily identified and communicated to a POS or other system via a network for processing thereat.

A generate indicia module 422 may be configured to generate an indicia responsive to a user "tapping out" or otherwise indicating that he or she is prepared to check out at a POS at a retail store. The indicia may be a graphical, aggregate indicia inclusive of multiple deal offers to which the user has selected or viewed. Multiple indicia may be generated by the module 422 if too much information for a single indicia is to be generated. The indicia may alternatively be a digital indicia that may be communicated to a POS or other system during and/or after checkout.

A display indicia module 424 may be configured to display one or more indicia on an electronic display for imaging or reading by a POS. The display indicia module 424 may be configured to compress, encoding, time stamping, encrypting, or otherwise information associated with the deal offers (or other incentives, gift certificates, etc.).

A report module 426 may be configured to generate a report to a server operated by an ad distribution network provider or other service provider (e.g., marketer, retailer, distributor) of deal offers selected and/or viewed by a user. The report may be communicated in any format and use any communications protocol, as understood in the art.

With regard to FIG. 5, a screenshot of an illustrative menu 500 that is displayed in response to a shopper selecting a menu selector is shown. The menu may include "Categories" 502a, "Brand Deals" 502b, "Combo Deals" 502c, "Retailer Deals" 502d, "Local Deals" 502e, "Product Search" 502f, "Recipes" 502g, "My Preferred Deals" 502h, and "My Personal Mall" 502i. Other deal categories, such as "Kosher Deals," "Vegetarian Deals," "Vegan Deals," "Dollar Store Deals," "Gluten Free Deals," "New and Improved Products," "Closeout Deals," "Diet Deals," "Back-to-School Deals," and so forth may be provided to a shopper via the menu or another menu as well. Moreover, the menu may provide for "Sign-In," "Register," "Help," and "About" selection elements. One menu item may be a "My Deal Basket" item (see FIG. 37) that allows a shopper to see all of the deals that the shopper has selected (and automatically saved) to make for a consolidated way for a shopper to see selected deals of which the shopper desires to purchase associated products during a shopping trip. It should be understood that the menu items shown are illustrative in that additional and/or alternative menu items may be provided.

In one embodiment, a conventional "Coupons" menu item may be provided to shoppers at a retail store, where the coupons are traditional paper-style, albeit presented in a digital format, that provide the same discount offer to everyone in the retail store for a certain time period and comply with coupon laws, as understood in the art. As a benefit to the retailer and marketers, the conventional coupons may be distributed by the ad distribution network provider for free (i.e., no cost to the retailer or marketer). Whether the shopper uses the auction-ranked offers or chooses to use the free conventional-coupons distributed provided by the ad network, the marketer sees greater ROI on its promotion activities by reduced reliance on traditional printing and distribution to shoppers and the associated savings thereto and the lower clearing costs associated with electronic coupons. Retailers achieve savings too by not having to manually sort and ship paper coupons to third party clearing entities. In compliance with redeeming deals, conventional coupons may be included in the same or similar check-out process as the auction-ranked deal redemption at a POS of the retail store.

Figure 6:
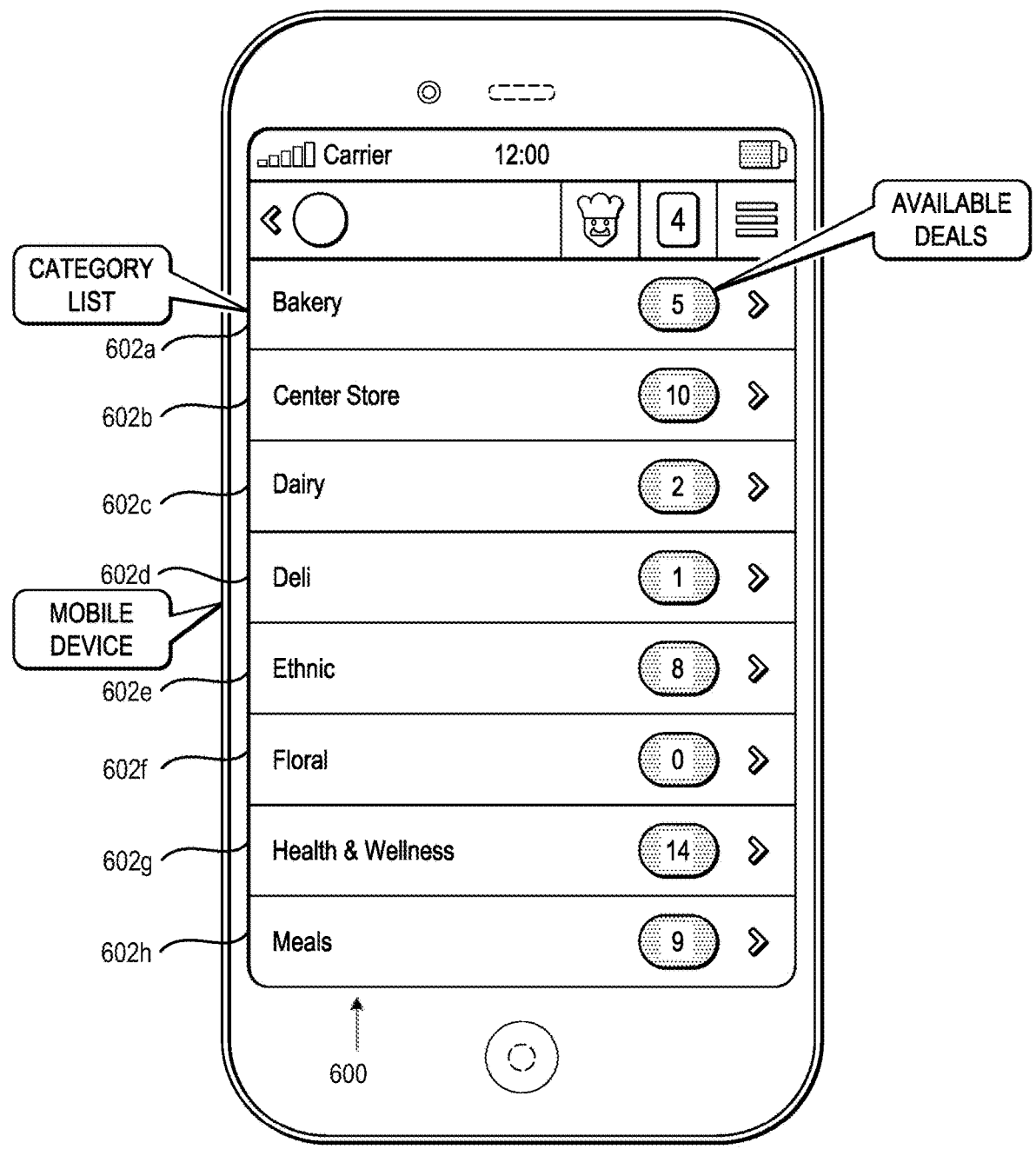
FIG. 6 is screen shot of a listing of illustrative categories that may have advertisements available.

With regard to FIG. 6, a screen shot of a listing of illustrative categories 600 that may have auction-ranked advertisements available is shown. The categories shown with advertisements may include "Bakery" 602a, inclusive of 5 bidded advertisements (available deals), "Center Store" 602b, inclusive of ten budded advertisements or deal offerings, "Dairy" 602c inclusive of two bidded advertisements, "Deli" 602d inclusive of one bidded advertisement, "Ethnic" 602e inclusive of 8 bidded advertisements, "Floral" 602f inclusive of 0 bidded advertisements, "Health & Wellness" 602g inclusive of fourteen bidded advertisements, "Meals" 602h inclusive of nine bidded advertisements, and so forth. The number of deals within each category is shown in association with each category listing. In addition, such categories may be configured to be specific to the store or retail location. The list is interactive, and each item in the list may be selected for specific advertisements (i.e., deals) that are available with each of the sub-categories to be displayed in a subsequent list. That is, ads associated with the "Center Store" category 602b may be displayed in a list responsive to a shopper selecting the "Center Store" category 602b. The listing of advertisements associated with the "Center Store" category 602b may be bid for in the same or similar manner as advertisements that are bid for display in association with an entryway tag of a retail environment. And, in similar fashion to FIG. 4B, each list product offer may be secondarily viewed with offer details and relevant product adjacencies, as described above. Advertisers that desire to have their ad ranked higher in the list may make a financial bid for audience (e.g., $0.05 pay-per-view or on another CPA basis) combined with a product offer discount or deal (e.g., $1 off), for example, to shoppers, where such combined bidded deals may cause the advertisement positioning-engine to rank the combined bid higher than merely a single financial CPA audience bid. An auction, which may be a real-time bidding (RTB) auction, for enabling the advertisers to bid and provide deals is further described herein.

Figure 7:
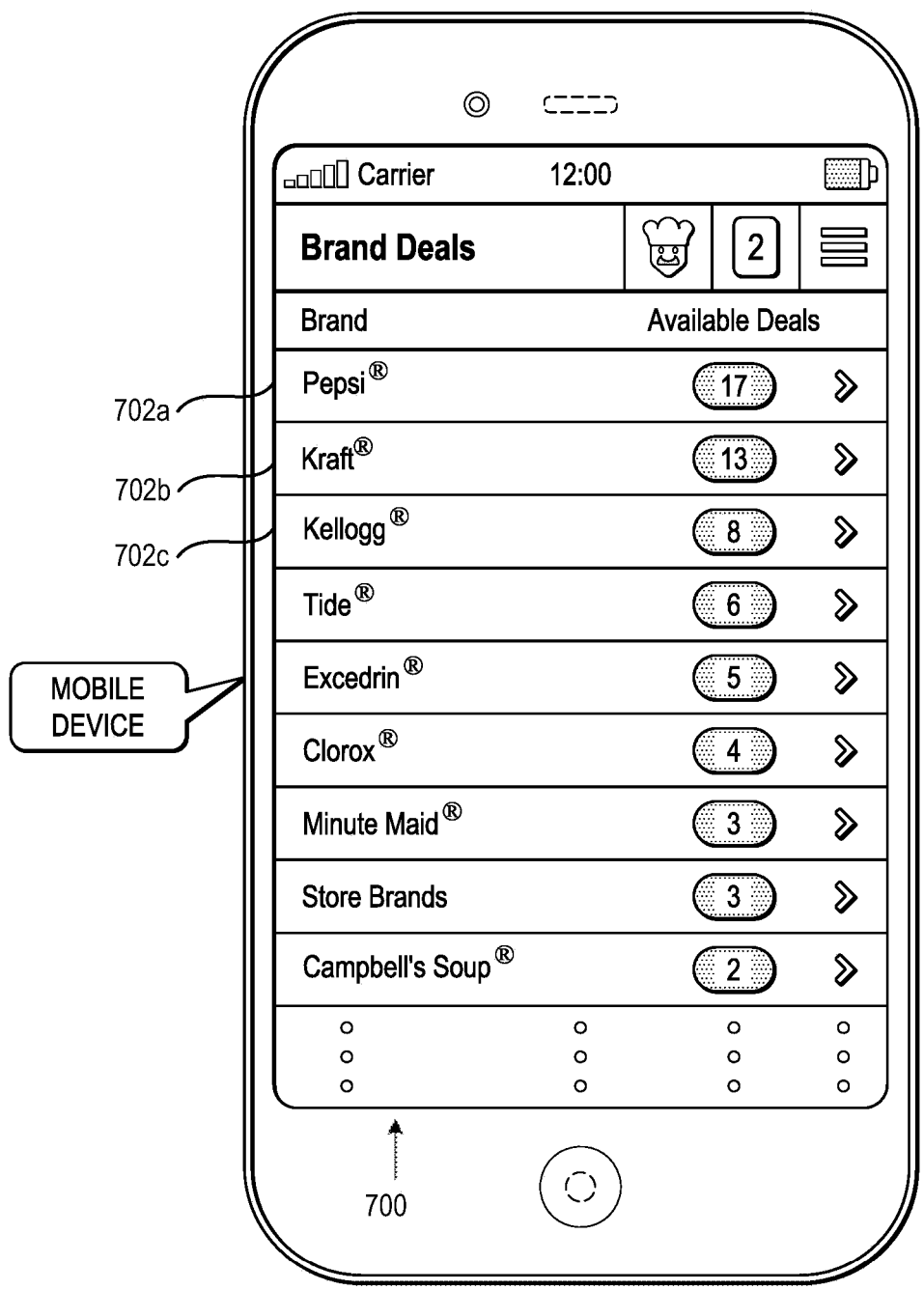
FIG. 7 is a screen shot of an illustrative list, which may be accessible via the menu of FIG. 5 if a "brand deal" item were listed on the menu.

With regard to FIG. 7, a screen shot of an illustrative list of brand deals 700, which may be accessible via the menu of FIG. 5, is shown. The brand deals list 700 may include bidded deals associated with each brand of products. As shown, Pepsi® brand 702a has seventeen bidded deals available, Kraft® brand 702b has thirteen bidded deals available, and Kellogg® brand 702c has eight bidded deals available, and so on. Each of the brands in the list 700 are selectable and, in response to a shopper's selecting one of the items in the list, another list, which may be ranked by an auction (e.g., from highest to lowest deal) and displayed by an advertisement positioning engine, for example, may be shown with specific product deals available from each of the respective brands. And, in similar fashion to FIG. 4B, each list product offer may be secondarily viewed with offer details and relevant product adjacencies, as described above.

Figure 8A:
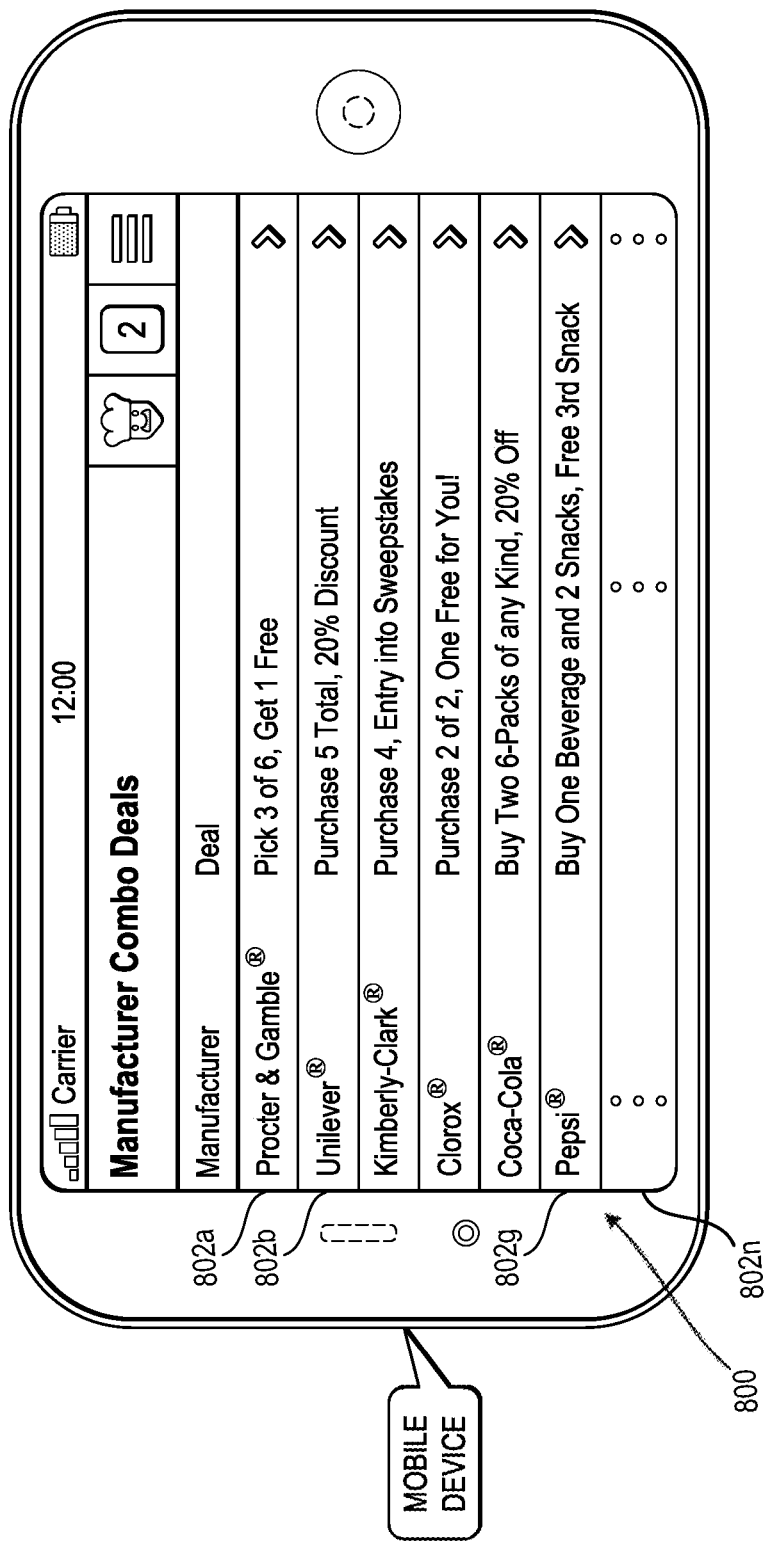
FIG. 8A is a screen shot of an illustrative manufacture combination deals list.

With regard to FIG. 8A, a screen shot of an illustrative marketer or manufacture combination product deals list 800 is shown. The list 800 may include selectable combination deal items 802a-802n arranged by manufacturer. In order to introduce new products or increase incremental shopper purchases of their goods, marketers with multiple products in a store can offer shoppers deals to purchase various combinations of their products or a number of the same product. Combination deals may be organized as a deal applied to the combination of select products or as a deal to the shopper's entire purchase of products at the retail location. For example, Unilever® may offer a combination deal 802*b*, whereby a shopper purchasing five of its products will receive a $5 discount on the entire basket purchased for this shopping trip.

The specific product choices may be viewed in response to a shopper (i) selecting the Unilever® brand product list of goods 802*a*, or (ii) selecting a page view of manufacturer combination offers (see FIG. 8B), or otherwise. In another deal example, Proctor & Gamble® (P&G) may offer shoppers a selection of six items, whereby choosing any three of the six offered items allows the shopper to get one item free at the cash register. In the event a shopper is interested in such a deal, the shopper may select the Proctor & Gamble® list item to cause the full selection of branded goods of Proctor & Gamble® to be displayed, as shown in FIG. 8B.

Figure 8B:
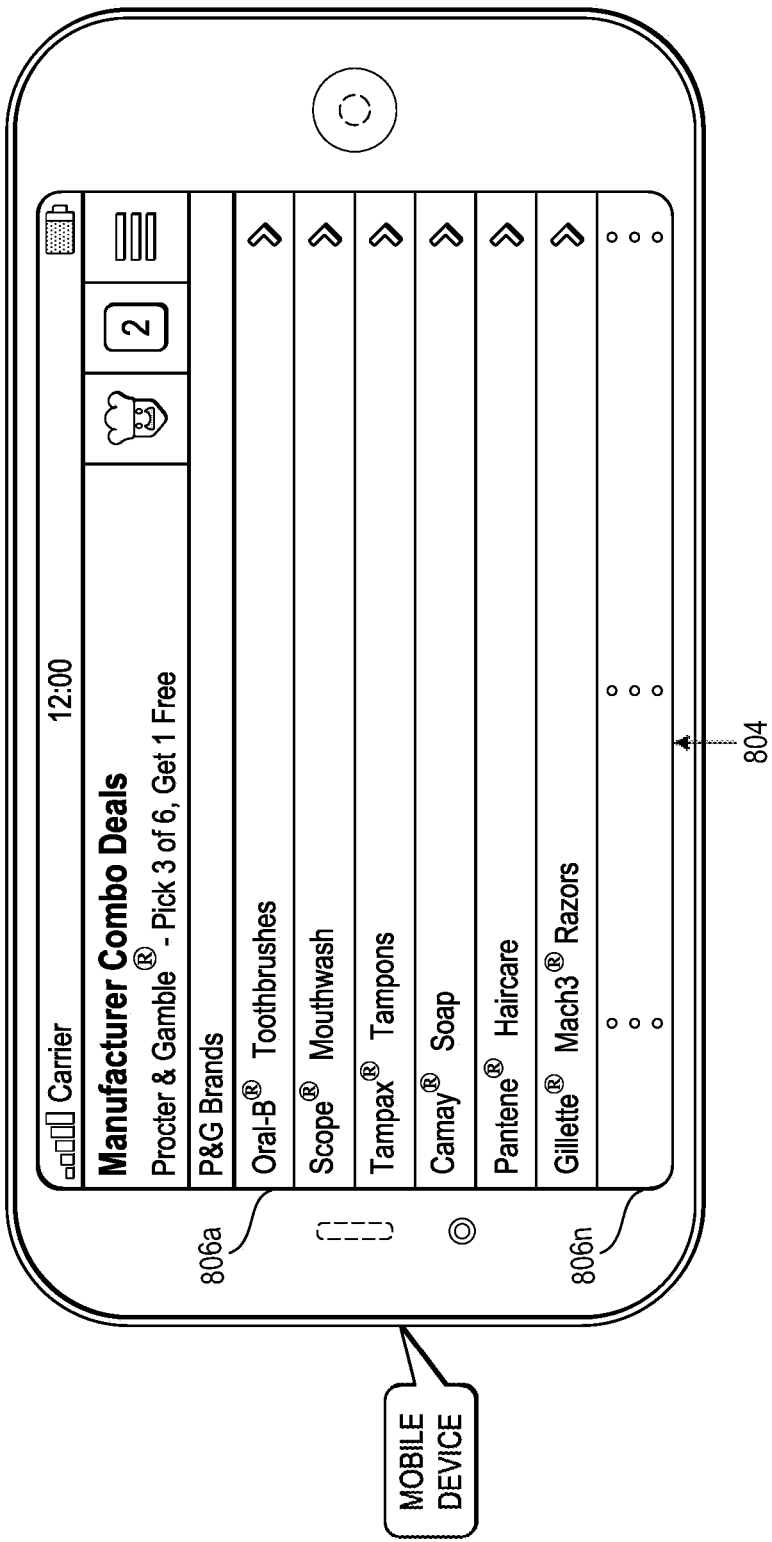
FIG. 8B is a screen shot of an illustrative list of manufacturer brands available to satisfy a manufacturer combo deal offering.

With regard to FIG. 8B, a listing of six P&G® brands 804 and their related branded products that are part of the combination deal are listed. These P&G® brands are illustrative, and it should be understood that P&G® unilaterally or in combination with other marketers and retailers (i.e., different manufacturers and retailers may team up to offer combination deals) may display any of their branded goods as components of a combination deal offer to shoppers. One or more user interfaces (i.e., for the advertiser, retailer, and/or ad delivery network provider) for submitting combination deal offers to the ad auction system may be provided for one or more users to facilitate their respective bid submissions. A value index representative of an aggregate of the components of the combination deal may be determined for submission into an auction for ranking and display by the advertisement positioning engine.

As with other lists, each of the items 806*a*-806*n* identified on the list 804 is selectable in order for the shopper to view additional information about a particular product or marketer's offer or see logical-related and contextual products in relationship to the primary item. In the event the shopper selects via a user interface a promoted combination of products, in this case selecting any three of the offered six P&G® branded items, then the deal is automatically saved for the shopper by the mobile device or other computing device and a 100% discount will be applied at checkout to one of the purchased P&G® items. Alternatively, the user interface may provide a soft-button for the shopper to actively save a deal. It should be understood that a variety of different combination deal options from one marketer or in association with another marketer and/or a retailer may be offered to shoppers in accordance with the principles of the present invention.

Figure 9:
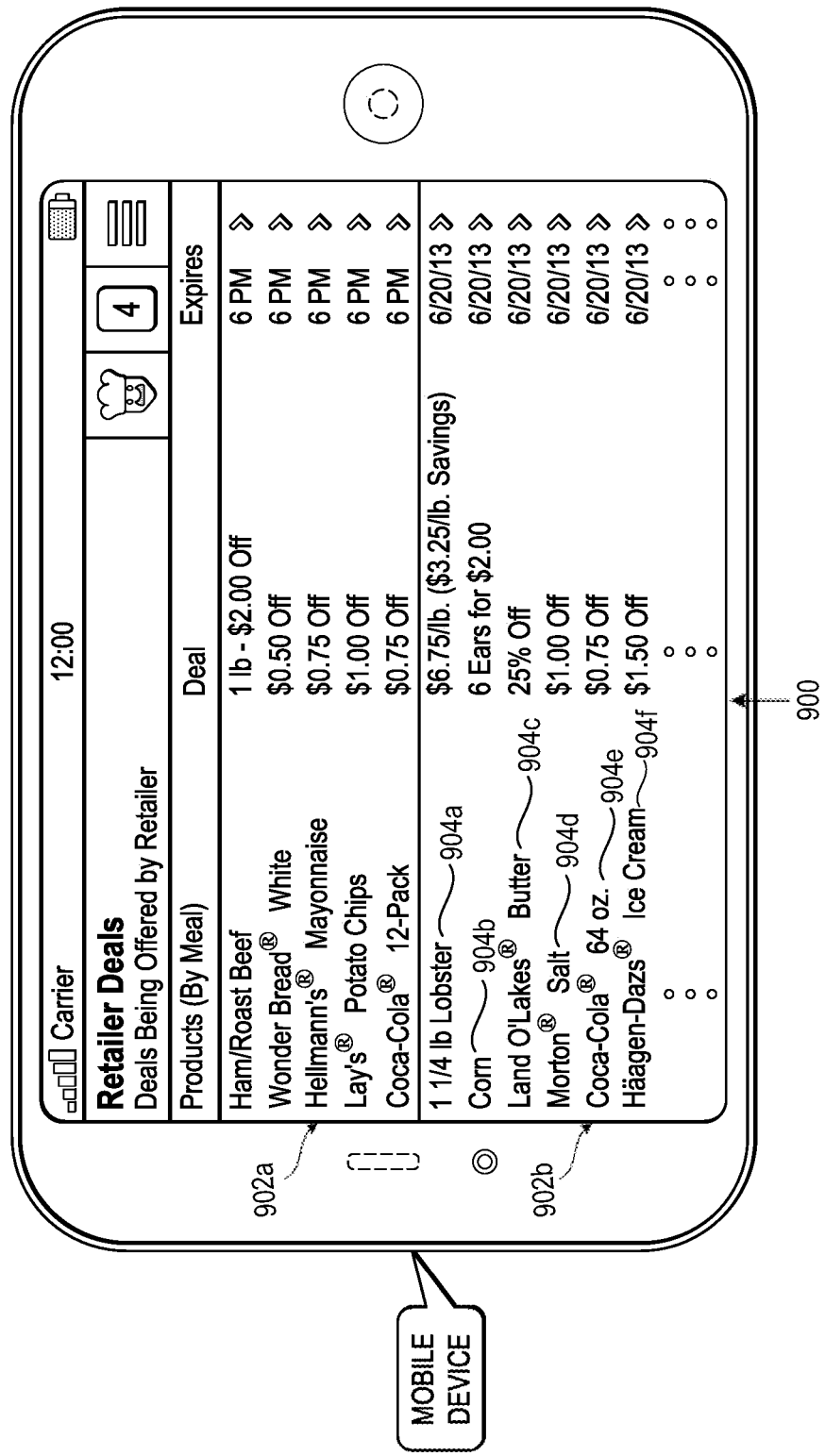
FIG. 9 is a screenshot of an illustrative listing of retailer deals that are being offered by the retailer.

With regard to FIG. 9, a screenshot of an illustrative listing 900 of retailer deals 902*a*-902*b* (collectively 902) that are being offered by the retailer is shown. In one embodiment, the retailer deals 902 may be established as products that are associated with a particular theme, such as a meal or meal plan. For example, a lobster meal deal 902*b* may include savings for lobsters 904*a* being sold by the retailer, corn 904*b* being sold by the retailer, specific brand of butter 904*c*, specific brand of salt 904*d*, specific brand of soft drink 904*e*, and specific brand of ice cream 904*f* (or store branded goods of equivalent utility). Although shown as being organized as meals, it should be understood that retailer deals may be offered in any other manner, such as by activity (e.g., baseball) or relating to a certain day of the week, or unrelated to any particular day or event. As with other lists, advertisers may bid and submit deal offerings in an auction to be ranked high enough to be displayed in the retailer deals. Having such deals may help a retailer promote retailer brands and non-branded products, such as produce, or branded products.

Rather than displaying the retailer deals in the format of this listing 900, one embodiment may provide for retailer deals to be provided in one or more product views. For example, if a retailer ad, such as a retailer meal plan (e.g., "Retailer Barbeque Feast") is placed on the auction-ranked list through the auction process or as a result of receiving a free listing due to participating with the ad network provider, a primary product ad may be displayed (e.g., hamburgers) and then adjacency ads, such as hotdogs, buns, chips, beverages, paper cups, paper plates, ketchup, coolers, beer, or any other logical or contextual product offering may be displayed. As a shopper traverses through adjacent ad listings, each adjacency ad listing underneath or extending from the initial product view may be part of the retailer meal plan. In this manner, advertisers may submit bids to be displayed within the meal plan as an initial primary ad, in this example the hamburger manufacturer, or as an adjacency ad. In such a scenario, the advertiser may be provided with a selection mechanism within a marketer user interface to bid for retailer meal plans.

Moreover, the retailer may enable internal departments to collaboratively participate with the meal plan. As understood in the art, retailers find it difficult to coordinate or collaborate specials or discounts between departments on different products. By providing a tool, such as the meal plan tool, on a user interface (see, FIG. 42E, for example) to coordinate the discounts or deals on store brands, produce, or vendor brands, the retailer may be able to drive incremental sales within the retail store. As with the recipes, such as that shown in FIG. 12C, meal plans may be auction-ranked. Such a user interface that provides for collaborative bidding within different departments of a retailer, could enable a fish department and a chips department to offer a collaborative deal, such as a contingency deal, in a coordinated manner in ways never before possible, thereby improving efficiency for retailers and increasing shopper spend.

Figure 10:
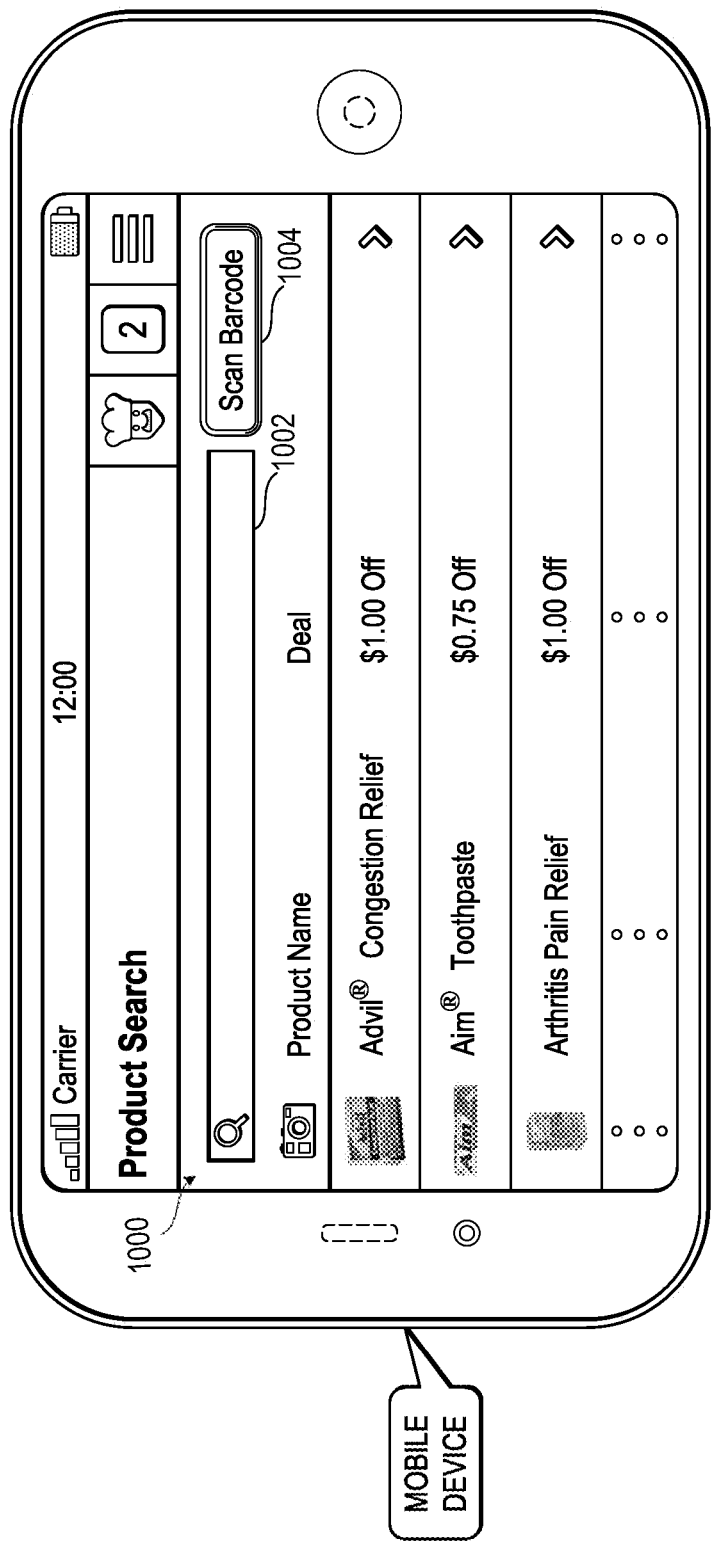
FIG. 10 is a screenshot of an illustrative product search page.

With regard to FIG. 10, a screenshot of an illustrative product search page 1000 is shown. The product search page 1000 may include a text entry field 1002 in which a shopper may enter text that may be contained within or be associated with a product being sold at the retail environment. Alternatively, the shopper may denote data for a search by using the mobile device's optical indicia capture capabilities, such as imaging an indicia, such as a barcode, packaging image, or otherwise. In accordance with the principles of the present invention, a product search for a shopper may only be useful if results of the search include products that are contained within the retail environment. In the case where the shopper is not currently "tapped-into" a particular retail environment through use of an entryway "tap-in", then the product search may enable a shopper to enter a product and, in addition to a product name and deal being listed, particular retail stores near the shopper that carry the product may also be listed. In one embodiment, the listing of the product advertisements with associated deals may be ranked based on bids and deal offers that the advertiser of the product make with the ad distribution network, as further described herein. In addition to the shopper being provided a text entry field 1002, a "scan barcode" soft-button 1004 may be positioned in the product search page that, in response to the shopper selecting the "scan barcode" soft-button 1004, causes the mobile device to turn on a camera to enable the shopper to image a barcode (or other indicia) of a product. The imaged barcode may initiate a search for a product associated with the barcode and produce a results list with bidded deals associated with that product. The bidded deals may be inclusive of non-paid deal listings (i.e., deals in which the advertiser pays $0 for the listing, but offers a discount or other incentive to the shopper), where bidded deals may be ranked higher. As with any auction ranked results list displayed by the ad delivery system, each listed item, when "tapped," reveals additional bidded logical-related and/or contextual product advertisements (see FIG. 4B).

Figure 11:
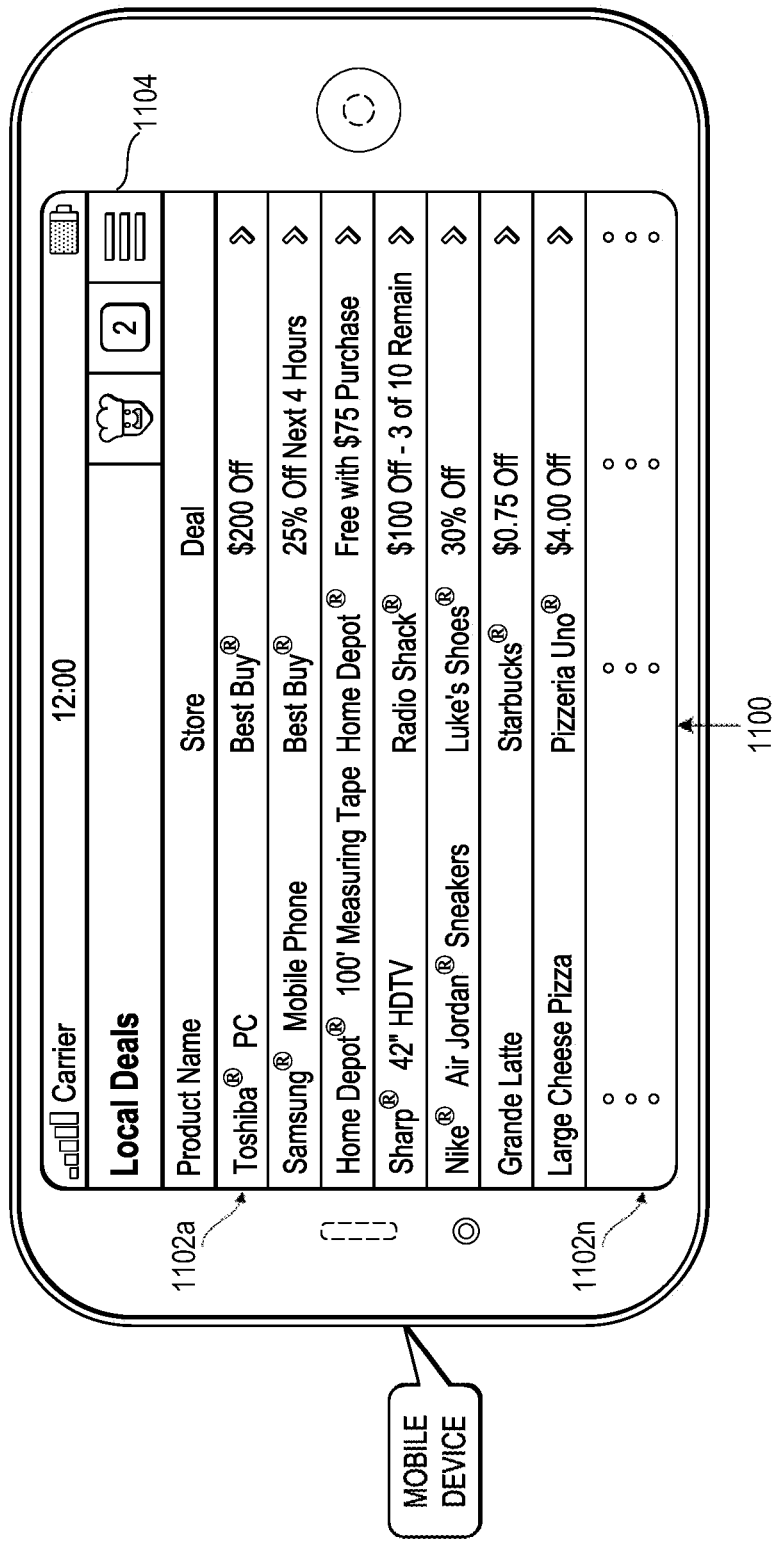
FIG. 11 is a screenshot of an illustrative listing of local deals.

With regard to FIG. 11, a screenshot of an illustrative listing 1100 of local deals 1102a-1102n (collectively 1102) is shown. The local deals list 1102 may be selected from a menu selector 1104, and, responsive to being selected, provide the ranked list 1100 of currently available deals 1102 that are in the physical vicinity of a current retail environment in which the shopper is "tapped-in." In other words, after the shopper registers or "taps" into a retail environment either via the entryway tags or other tags located within the retail environment, the shopper may view deals that are local or in near proximity to the shopper's current location (e.g., within the same mall, strip mall, within 2 blocks, within 1 mile, any other local distance based on density of retail environments at a current location of the shopper, or selectable by the shopper). In one embodiment, the local deals 1102 may be listed in a ranked manner based on bid submissions made by advertisers of the products or services, ad view-to-purchase ratio, measured ad interactions ratio, shopper profiles and demography, shopper preferences, and/or other parameters. The advertiser may be a manufacturer, service provider, local retailer, distributor, ad agency, or otherwise. As shown, a product name, store, and deal may be listed in the interactive list 1100 as with other lists previously shown, each item in the list may be selectable by the shopper, which, when selected, may cause a product view to be displayed that provides additional detail of the item along with other logically and/or contextually related ads of other products, as shown in FIG. 4B, for example.

Figure 12B:
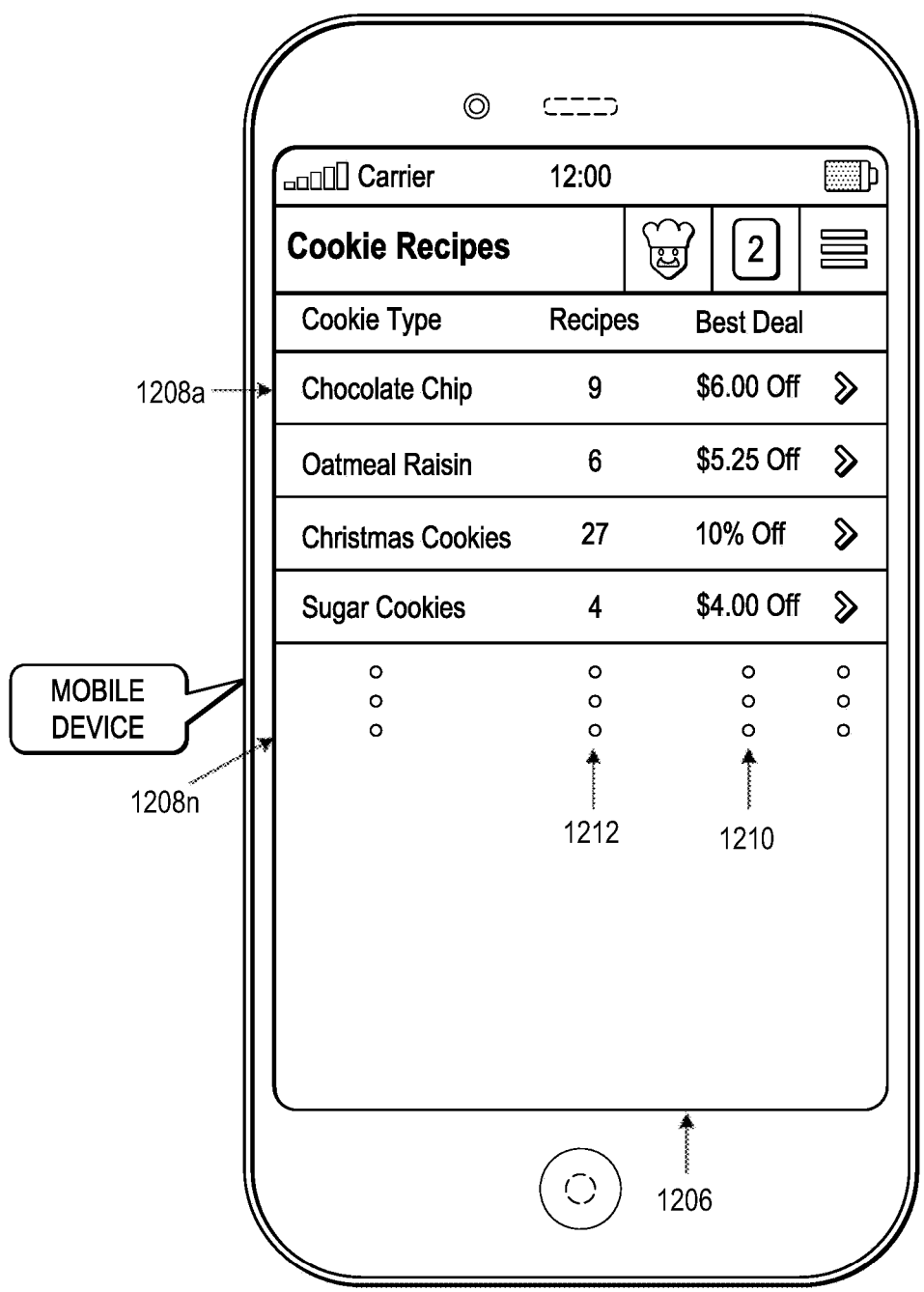
FIG. 12B is a screen shot of an illustrative listing of available cookie type recipes along with best deal associated with each type of cookie.

With regard to FIG. 12A, a screenshot of an illustrative listing 1200 of categories 1202a-1202g (collectively 1202) for recipes is shown. In one embodiment, the shopper may access this list via the menu item 502g of FIG. 5, or access recipes in item or product views, such as the product view 400a illustrated in FIG. 4A. Alternative ways to access the recipes may be provided, as well. As shown, categories of recipes, including appetizers 1202a, beverages 1202b, breakfast 1202c, casseroles 1202d, cakes/frostings 1202e, candy 1202f, and cookies 1202g may be listed. This listing 1200 is shown in an alphabetical order. However it should be understood that the categories can be listed in any other order or enable the shopper to reorder the category listings, remove or add additional category listings, or otherwise. Furthermore, a text entry field 1204 may enable a shopper to perform a search on categories or specific recipes that he or she may be interested in viewing. A shopper may select a particular category listing, such as cookies 1202g and another list of categories (see FIG. 12B) may be provided to the user within the selected category. For example, if a shopper selects the cookies category 1202g, then a listing of different types of cookies, such as chocolate chip, oatmeal raisin, sugar, etc., may be provided to the shopper for further selection (see FIG. 12B). The shopper may continue to "drill down" within a particular category until a particular recipe is made available to the shopper. As with other views, the principles of the present invention provide for advertisers and other participants (e.g., retailer, ad network, etc.) to submit bid and deal offers to list a particular product in recipes. In one embodiment, depending on the products that are listed in the recipes, the recipes may be varied as compared with recipes associated with alternative products due to products having different formulas from one another and due to costs of ingredients, for example.

With regard to FIG. 12B, a screen shot of an illustrative listing 1206 of available cookie type recipes 1208a-1208n (collectively 1208) along with best deal 1210 associated with each type of cookie 1208 is shown. A number of recipes 1212 indicate how many recipes for each type of cookie 1208 are available for view. By providing a list of cookie type recipes 1208 and best deal 1210 available for each type, a shopper may be biased toward cookie types based on the deals. The best deal 1210 may vary depending on the type of deal, for example, that is being offered by an aggregate of manufacturers of ingredients in the recipes. Although shown as pure discounts, alternative configurations of the list may present other deals (e.g., incentives), as well. Still yet, the best deals may be normalized, such that discount-per-dozen cookies or other normalized parameter may be calculated and presented to shoppers because, in at least some cases, the deals are measured in bulk purchases and have to be applied on a product level produced from the ingredients noting that some ingredients make up a small percentage of a product (e.g., sprinkles for a cake) than other ingredients (e.g., flour). By aggregating deals being offered by individual product manufacturers of ingredients of cookies, in this case, an auction with multiple players as part of an additive bid may compete with manufacturers of another recipe to have a recipe that is highly ranked. Moreover, if multiple manufacturers of an ingredient within a recipe submit bids to be listed in a recipe, the ingredient with the best deal may be selected to be included in the recipe.

Figure 12C:
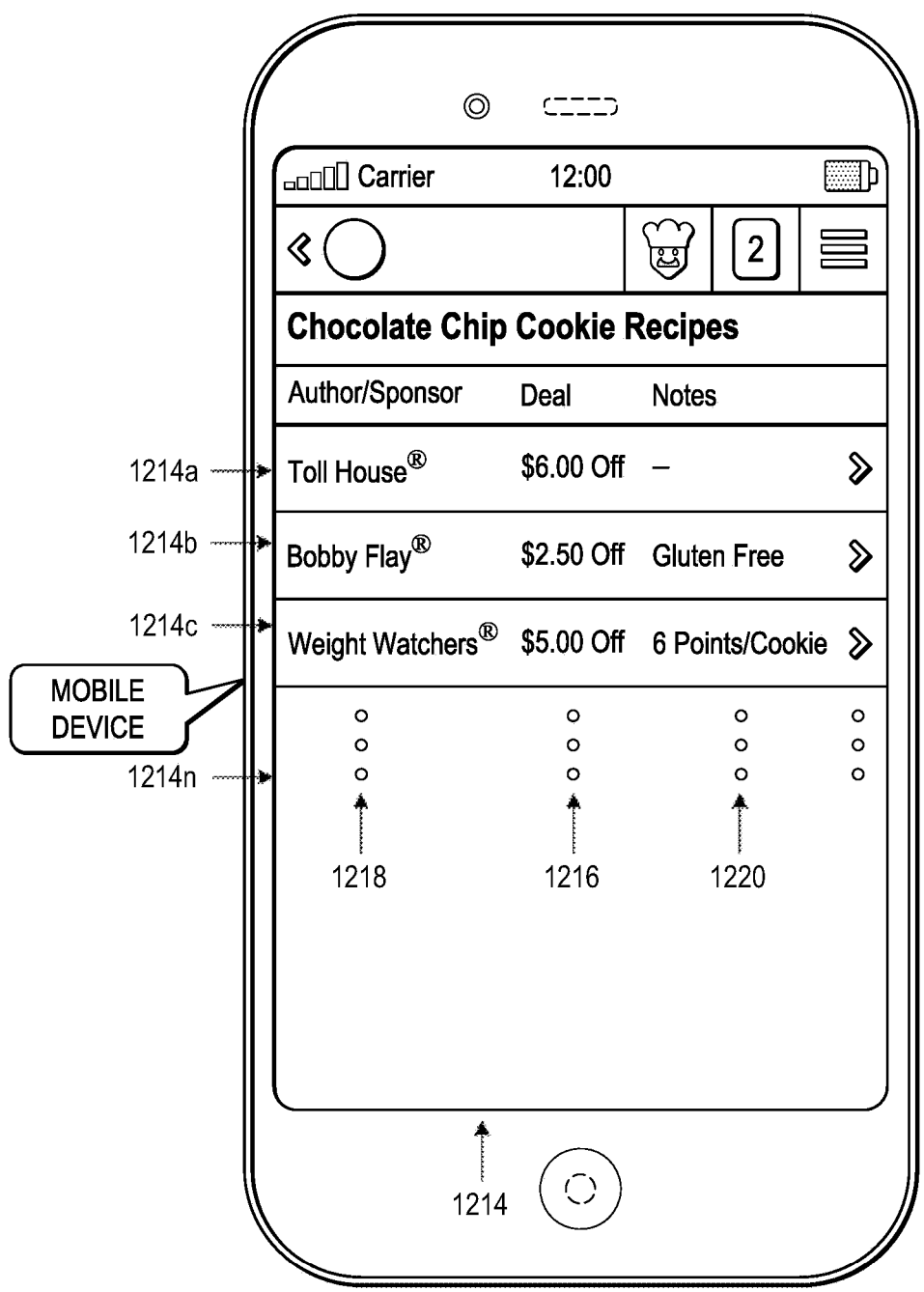
FIG. 12C is a screen shot of an illustrative listing of multiple recipes for chocolate chip cookies having different deal amounts.

With regard to FIG. 12C, a screen shot of an illustrative listing of multiple recipes 1214a-1214n for chocolate chip cookies having different deal amounts 1216 in an auction-ranked order is shown. It should be understood that the deals could additionally or alternatively include incentives (e.g., buy 1-get 1 free). Upon selection of a chocolate chip recipe listing 1208a from FIG. 12B, a number of different chocolate chip cookie recipes may be presented. In one embodiment, an author or sponsor 1218 of a recipe may be listed. As examples, the authors or sponsors may include Toll House® (a division of Nestles®), Bobby Flay (famous chef), Weight Watchers®, etc. Associated with each of the recipes, a deal 1216, such as a discount, may be listed, and notes 1220, such as "Gluten Free," "6-points per cookie," "150 calories per serving," or other information that may motivate someone to want one recipe versus another beyond bidded deals that are available in the aggregate from the manufacturers of ingredients of a recipe. As with other lists, the list may be an auction ranked list utilizing the principles of the present invention.

With regard to FIG. 12D, a screenshot of a particular recipe 1222 for chocolate chip cookies is provided. Because the recipe 1222 is associated with a retail environment, such as a grocery store, the recipe may be limited to products being available within the retail environment and, as such, display deals 1224 for the requisite ingredient items, as offered by the advertiser of the products. As an example of an ingredient offer, Nestlé® is an ingredient listing 1226a offering shoppers a $1 discount on its Toll House® Chocolate Chip Morsels. Recipe deals may be dissimilar from more generalized listings and other areas of the user interface because a shopper using a particular recipe may be more inclined to actually purchasing the product for a specific purpose. As shown, each ingredient listing 1226a-1226n in the recipe for making chocolate chip cookies may be listed in a scrollable and interactive list. In order for the shopper to receive the deals 1224 for those products, the shopper may either tap or select a product to cause the list to transition to a product adjacency view, such as that shown in FIG. 4B, or the shopper may simply select one or more selector boxes 1228 that indicates that the shopper has selected the deal for that product without having to view the product view since the recipe may itself be considered a type of product view. In this case, the user has selected selector boxes 1228a and 1228c of the Toll House® Chocolate Chip Morsels and the baking soda listings 1226a and 1226c for the deals, and has not selected the flour and, thus, would not receive the deal if the user, in fact, purchases the flour. In the alternative, all deals for a viewed recipe may be automatically accrued for the shopper therefore ensuring the flour discount is applied at the cash register. In one embodiment, a marketer, group of marketers, retailer, etc. may provide for a bundle deal for multiple products within a recipe being purchased. A user interface may be provided to one or more users (e.g., each marketer) showing an aggregate of deals being offered by each of the manufacturers of products in a recipe for bid submission to an auction. In one embodiment, a marketer, group of marketers, retailer, etc. may provide for a bundle deal for multiple products within a recipe being purchased.

As with other listings, if the user selects or "taps" a product to display a product view, such as shown in FIG. 4B, adjacency advertisements that are logically and/or contextually related may be displayed with the primary listing being displayed. Such an adjacency display may be competed for in an auction process by other advertisers by submitting bids and deal offers, as further described herein. When the shopper arrives at checkout, the system may in concert with the retailer's POS system determine what items, if any, are subject to the represented recipe deals. In an alternative embodiment, the principles of the present invention may provide for discounts independent of the POS of the retailer, as further described herein.

In addition to the various menu items provided above, other menu categories may be available to shoppers utilizing the principles of the present invention. These menu items, in one embodiment, may be selectable by a retailer depending on various concepts and product offerings that the retailer has within the retail store. Such menu categories may include (i) "Gluten Free," (ii) "Vegetarian," (iii) "Kosher," (iv) "Less than $5 Meals," (v) "Dollar Items, (vi) "Half Price Products," (vii) "Shoes," (viii) "Kids," (ix) "Baby," (x) "Seniors," and so forth. In general, a retailer may be able to provide shoppers with digital specialty retailing concepts and provide deals for those concepts within its broader concept than the specialty concepts, thereby competing with specialty stores or even what has been traditionally online concepts.

Figure 13A:
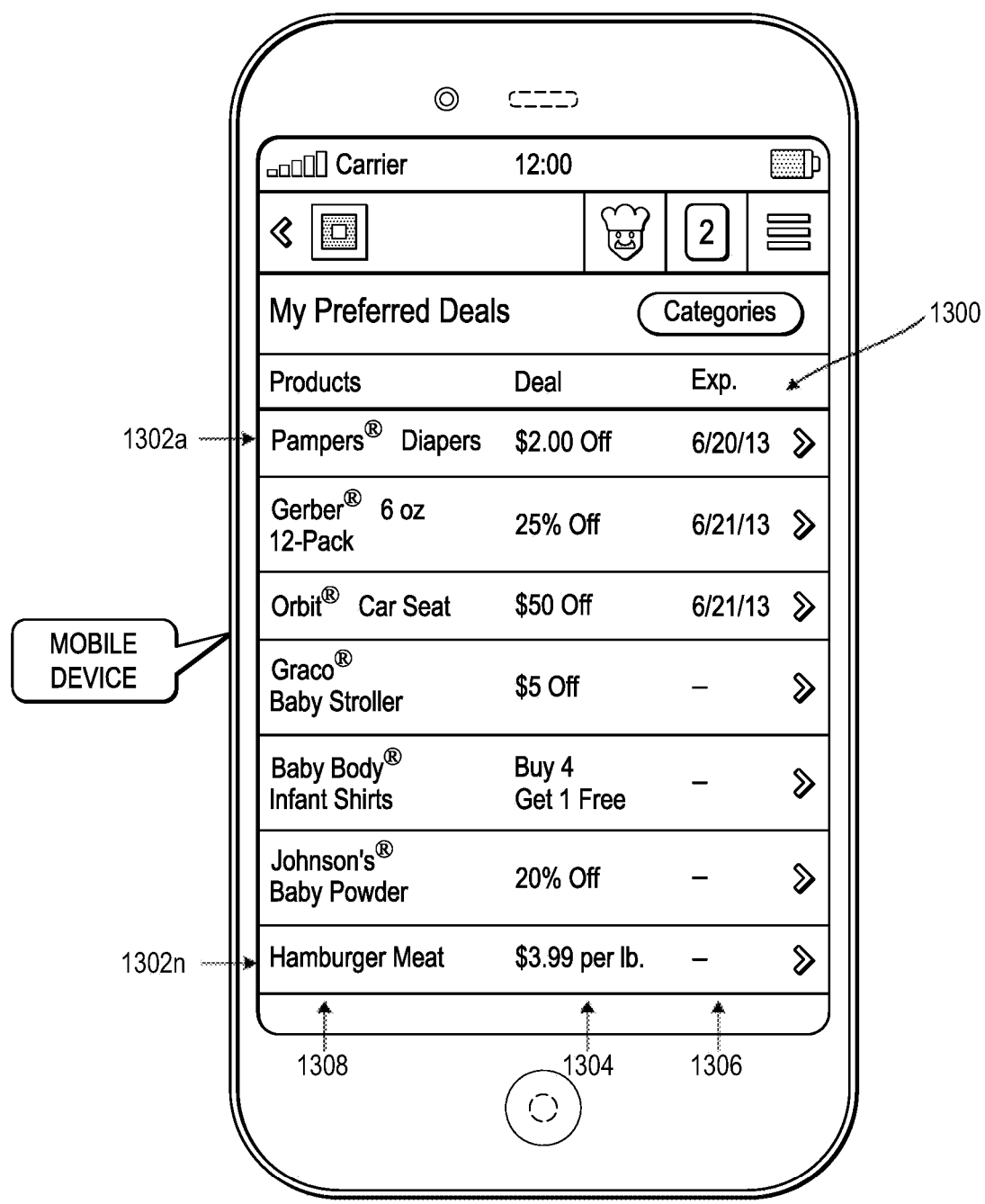
FIG. 13A is a screenshot of an illustrative list of preferred deals as requested by the shopper.
Figure 13B:
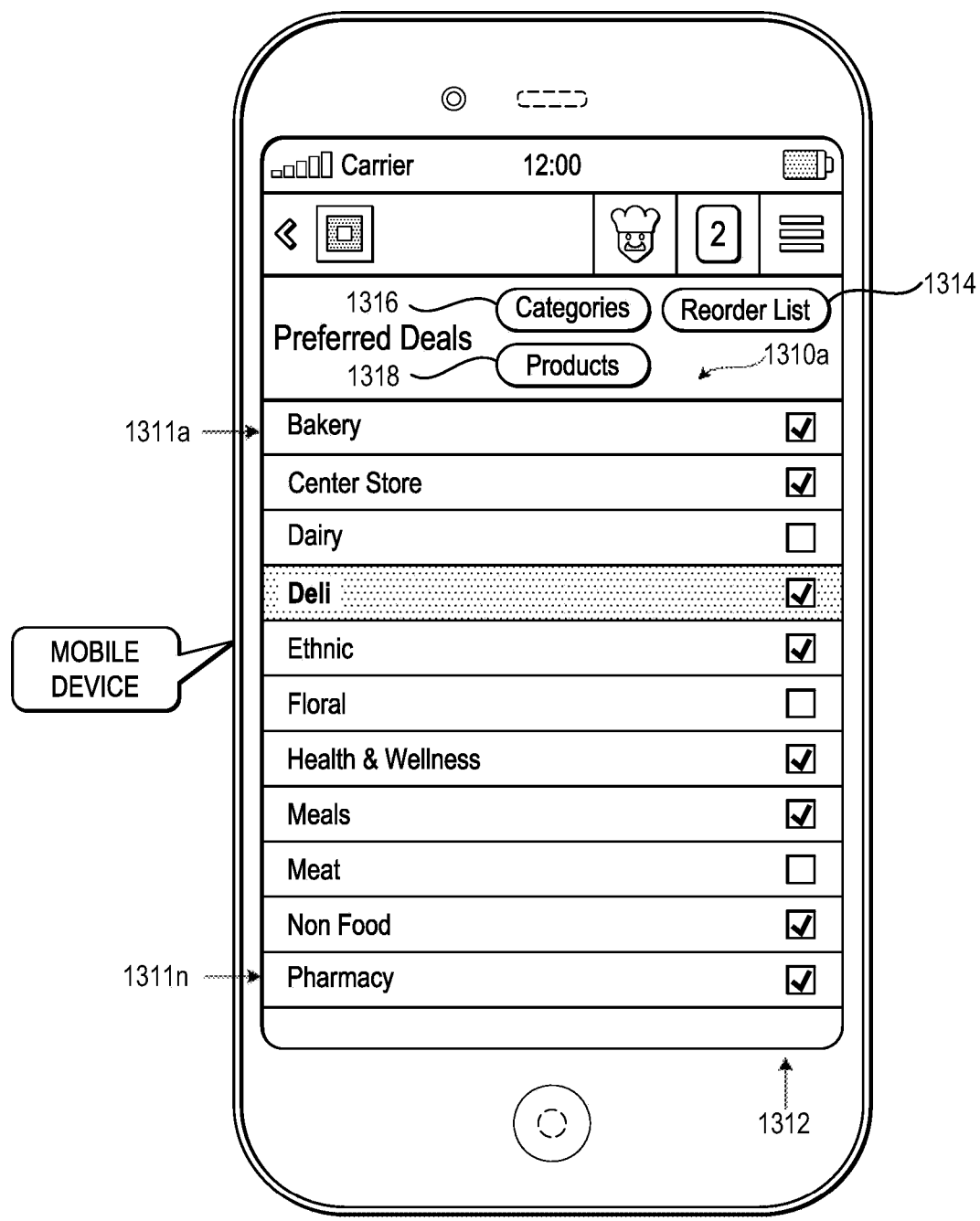
FIG. 13B is a screenshot of an illustrative preferred deals selectable by category.
Figure 13C:
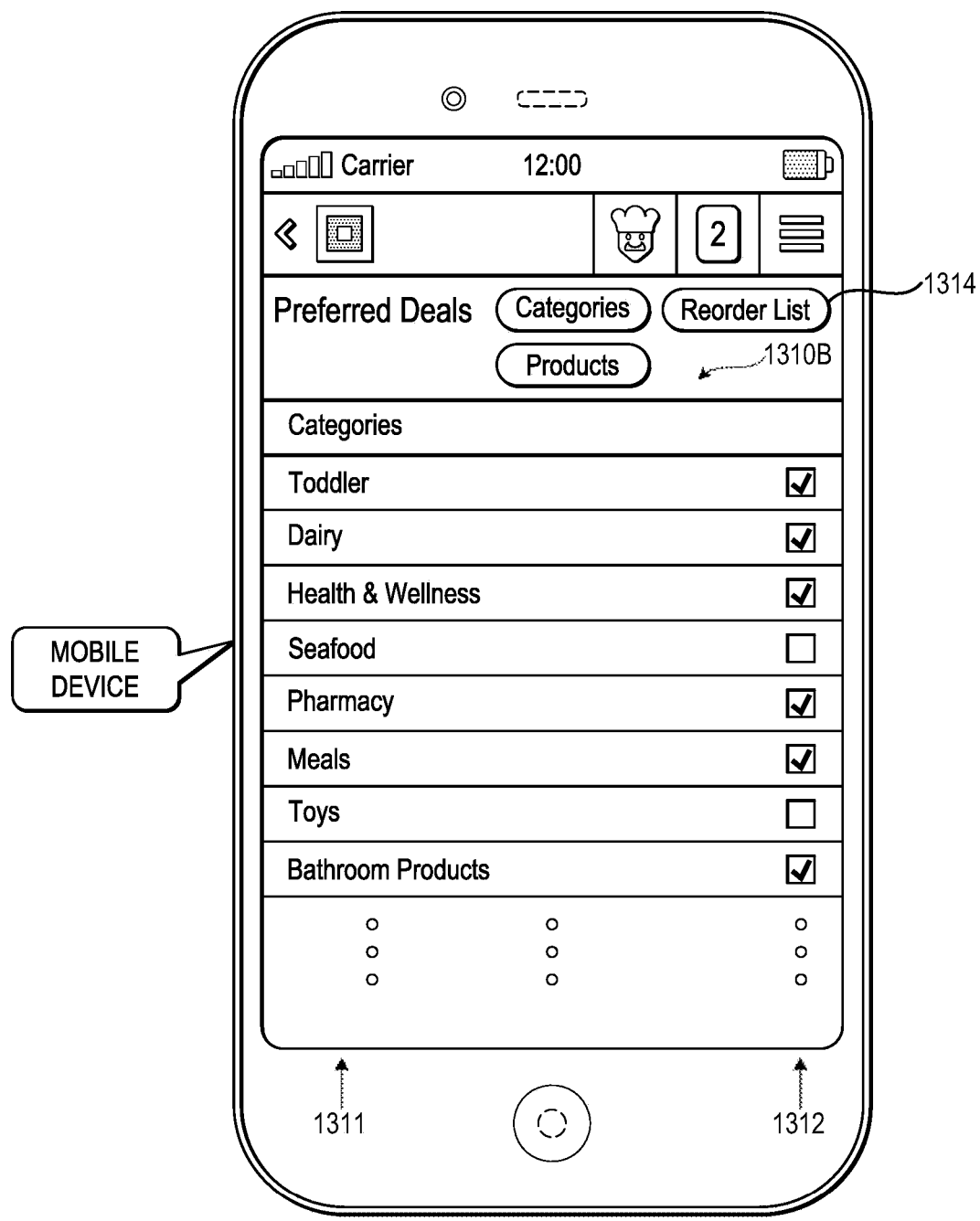
FIG. 13C is a screenshot of a re-ordered product categories list.

With regard to FIG. 13A, a screenshot of an illustrative list 1300 of preferred product deals 1302a-1302n (collectively 1302) as requested by the user is shown. These preferred deals 1302 are deals of any products that the shopper has previously established as products of which the shopper is interested in purchasing via a preferred product selection interface (FIGS. 13B and 13C). In this case, the shopper is interested in baby products, and has listed those products that, if a deal is available, that the shopper would consider purchasing. As shown, a number of auction ranked deals 1302 that are available to the shopper for those products are provided, where deal values 1304 may vary in type, such as a fixed amount discount, a percentage discount, a bulk purchase discount, and so forth. In addition, an expiration 1306 of the deals 1302 of those particular products 1308 may also be listed, where applicable. It should be understood that the products 1308 that are listed may be preselected by the shopper through a category listing, search feature, or any other technique that allows the shopper to select products for listing in a preferred deals interactive list 1300. In one embodiment, a selector element (not shown) may be associated with each of the deals 1302 may be made available. Additionally and/or alternatively, the shopper may select a deal 1302 of a product and then a product view (see FIG. 4B) of the product along with logical-related and contextual related products may be displayed with or without deals. In one embodiment, the shopper may re-order the list of available categories and/or products to allow the user to have faster access to those categories and/or products that he or she is more interested in purchasing while shopping in a particular retail store. Expiration dates 1306 of deals 1302 may be listed to indicate a date after which the deal associated with the product expires. Rather than using dates, times (e.g., within the next 30 minutes), may be utilized in accordance with the principles of the present invention.

With regard to FIG. 13B, a screenshot of a product categories list 1310a is shown. The list 1310a is shown with categories 1311a-1311n (collectively 1311) in alphabetical order, and certain categories may be preferentially selected or deselected using respective elements 1312 by the shopper in a dynamic manner as the shopper may wish to purchase from certain product categories during a shopping trip and ignore or reduce the significance of product deal offers associated with less relevant or lower interest categories. That is, the more interest a shopper has in certain categories, there may be a higher chance those categories will be "above the fold" listed in the main page (see FIG. 3C) from tapping into a retail environment or specific location (e.g., department) in the retail environment. A user may select a "Reorder List" soft-button 1314 to enable the user to selectably reorder the list. The user may select a "Categories" soft-button 1316 to display categories, as currently displayed, in a list format. The user may select a "Products" soft-button 1318 to display particular products in a list to select as preferred deals, thereby allowing the ranking auction to more highly weigh those products for the user.

With regard to FIG. 13C, a screenshot of a re-ordered product categories list 1310b is shown. The reordering may be performed by the shopper selecting the "re-order list" soft-button 1314 and moving up/down the different categories 1311. As previously described, the positioning of the categories 1311 indicate the importance of the categories for the shopper. In this case, the user has prioritized "toddler" products followed by dairy, health & wellness, seafood, pharmacy, meals, toys, and bathroom products. Selection elements 1312, such as check-boxes, may be provided to enable the shopper to selectively turn on and off the categories. As a result of the user preferences based on category positioning, the system may use the preference ordering to determine and deliver auction ranked advertisements with deals of interest to the shopper (i.e., from most important to least important based on his or her preferences category ordering and, if available, selection of categories).

Figure 14:
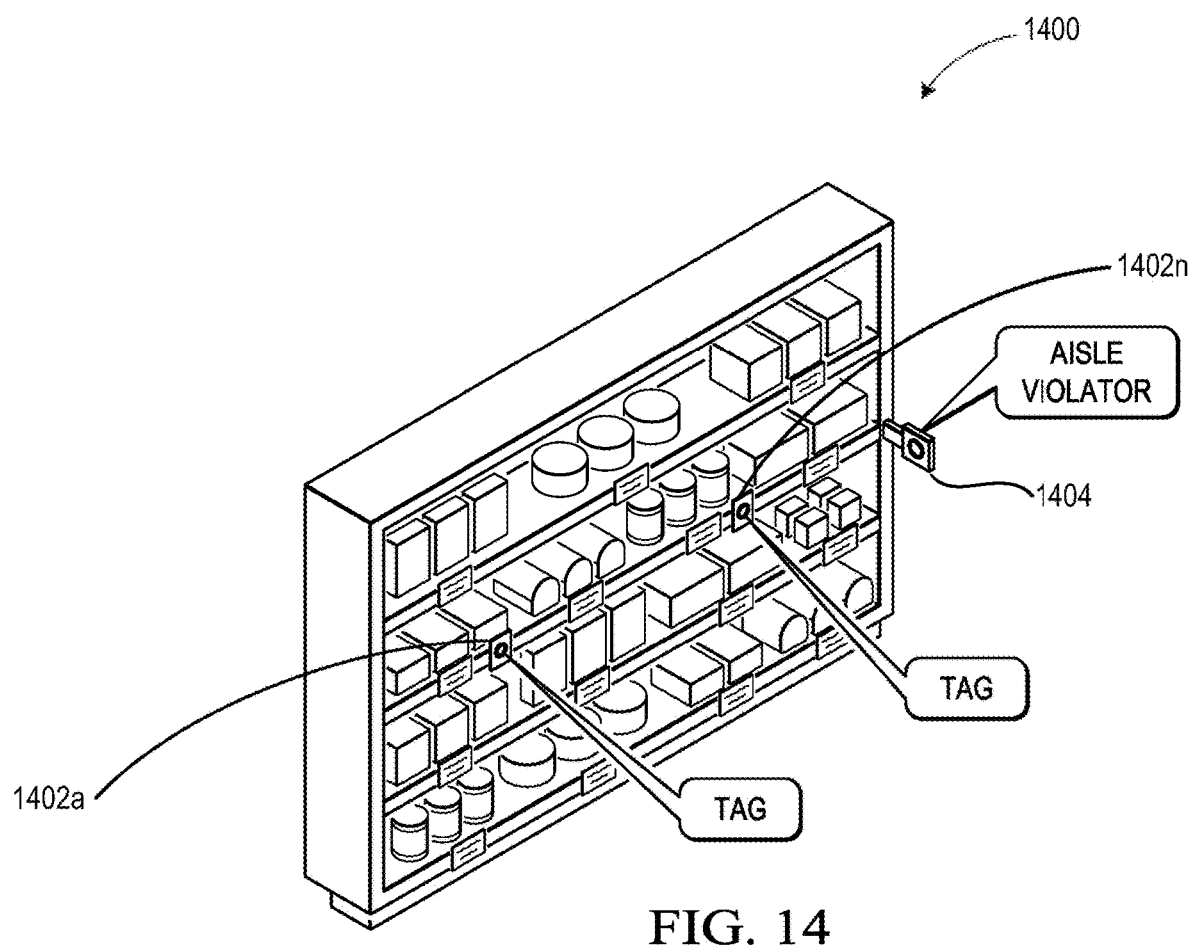
FIG. 14 is an illustration of illustrative tags associated with particular products positioned on shelves in a retail store.

With regard to FIG. 14, an illustrative gondola 1400 on which products available for purchase may have physical tags 1402a-1402n (collectively 1402) associated with particular products positioned on shelves of the gondola 1400 in a retail store. Additionally and/or alternatively, tags (not shown) incorporated into displays or signs 1404, such as aisle violators, associated with products on shelves or located in the retail store are shown. In this particular case, when a shopper interacts with the tags (e.g., "taps" a tag using NFC capabilities of a mobile device or captures an image of an indicia displayed on or associated with the tag), the mobile device may communicate via a communications network, with a URI endpoint included in the indicia of the tag to receive content via an app for display on the mobile device. Because a marketer may pay a premium for a tag 1402a, the content may be presented in a product adjacency view (as opposed to a list view) of the product at which the tag is located, and the associated content may include logical and contextual related products in advertisements in the product view that may be auction ranked, and include "above" and "below the fold" listings. Video or other messaging satisfactory to the marketer and retailer may be presented to the shopper. In this embodiment, the product view is presented to the shopper rather than a list view with multiple unrelated products because the tag's placement in the retail location is paid for by the advertiser and/or manufacturer of the product. Again, as with the product view of FIG. 4B, related products may also be displayed on the product view. In one embodiment, an advertiser may buy-out the adjacency views, thereby not having any adjacency advertisements or having adjacency advertisements limited to a select list (e.g., their own product ads) of the advertiser of the main product in the product view.

Furthermore, product advertisers may bid for contextual placement of their related product offers by entering a bid in the product view for the product associated with a tag 1402a. In the same manner as previously described, the bid submission may include a deal offer, which may be factored into which related products are ranked high enough to be displayed in the product adjacency view (e.g., "above the fold" ranking and succeeding lower bid submissions may be "below the fold"). Other advertisement and product view sales performance factors may be utilized by the auction to rank the adjacency advertisements.

In one embodiment, the manufacturer of the product at which a tag is positioned may pay extra to limit the related products to be those of the manufacturer of the product at which the tag is located. For example, if Kraft® has a tag associated with one of its products, then Kraft® may pay extra to have other Kraft® products be displayed as logical and/or contextual related products in the product adjacency view of the product associated with the tag. Similarly, a manufacturer may bid for all product adjacency views for any product ad listing by buying out space with more money than bids of other bidders (e.g., system notifies advertiser a "buy it now" price that that may be higher than current bids). The tags 1402 may be separate tags from any other signs within the retail environment. Alternatively, the tags may be integrated and delimited into other signs (e.g., paper, plastic, metal, or electronic signs) 1404 displayed within the retail store.

Figure 15A:
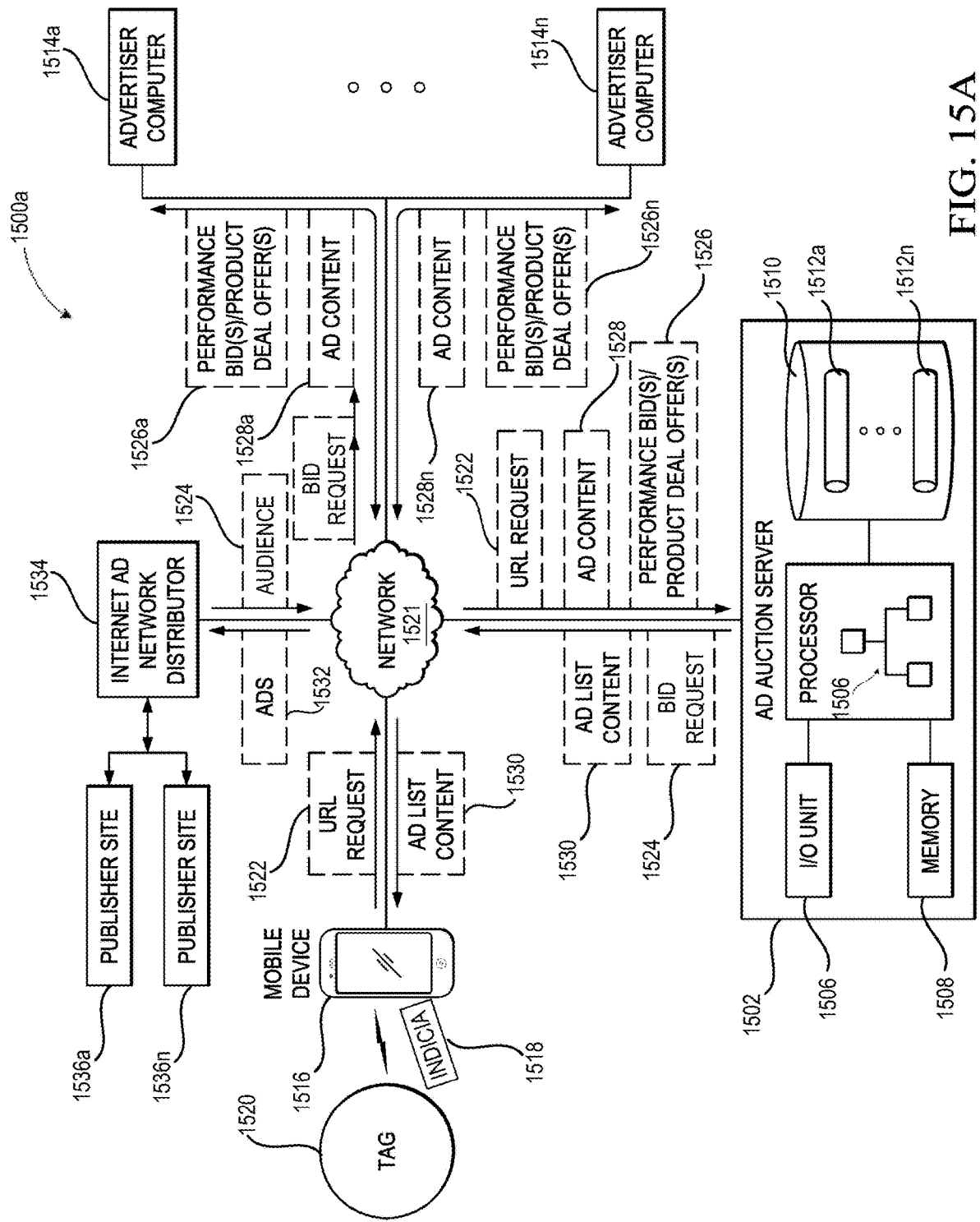
FIG. 15A is an illustration of a network environment in which the principles of the present invention may operate.

With regard to FIG. 15A, an illustration of a network environment 1500a in which the principles of the present invention may operate is shown. The network environment 1500a may include an ad auction server 1502 including a processor 1504 and software 1506 being executed on the processor 1504 that performs auctions and responds to bids and deal offers being submitted, as well as any other factors used to create bid submissions, as further described herein. The server 1502 may further include an input/output (I/O) unit 1506, memory 1508, and storage unit 1510. The storage unit 1510 may be configured to store data repositories 1512a-1512n (collectively 1512) to store and manage data used for auctions, exchanges, and ad delivery platforms as described herein. Advertiser computers 1514a-1514n may interact with the ad auction server 1502 via a webpage or other network address that allows advertisers to enter bids and product deal offers, and audience (user-shopper) targeting information, upload ad content including images and copy, and select particular auctions in which the advertiser desires to participate. Particular auctions may include auction-ranked list, product view pages, recipe pages, aisle tags, time of day, retail locations, etc. The ad auction server 1502 may perform auctions, such that every time another bid or product deal submission is submitted and/or adjusted, either individually or programmatically, or in response to the mobile device 1516 reading or imaging a tag inclusive of an indicia and requesting a URI endpoint connection with the ad network or receive a URI request by other means (e.g., via an app or online publisher site), the ad auction server 1502 may rerun the advertisement rankings results list and product advertisement positioning of the auction. In one embodiment, an auction for a particular location (place-based) may be run in response to a shopper with a particular demography "tapping in" using available bid submissions or request bid submissions from ad submission networks or aggregators on a real-time or near real-time basis. The ad auction server 1502 may further be configured to run auctions for every retail environment' retail store chain, particular stores within retail store chains, departments within a retail store, aisles within a retail store, and for categories within an aisle or retail store, deal offers, brand deals, manufacturer combo deals, retailer deals, local deals, recipes deals as available with particular retail stores, and any other menu categories as described herein or that may be incorporated into the system in accordance with the principles of the present invention.

As further shown in FIG. 15A, as a mobile device 1516 obtains an indicia 1518 at a tag 1520, such as a URI being stored by the tag 1520, the mobile device 1516 may connect to a URI endpoint of the ad auction server 1502 or other computing system associated with the ad auction server 1502 via network 1521 to receive content inclusive of an ad list as well as any other content associated with the URI endpoint associated with the tag 1520. The tag 1520, if located at an entryway of a retail store, may cause the ad auction server 1502 or content delivery server associated with the ad auction server 1502 to communicate all data currently available for that particular retail environment at which the tag 1520 is located. For example, associated with the tag 1502, a current listing of product deal offers at the retail environment may be provided along with any other data that is currently available for that retail environment including list and product views of all products, available recipes, category deals, and so forth, as previously described herein. By downloading all available content associated with that retail environment, the mobile device 1516 may be able to operate independent of a network communication to access all of the product deals and related data, thereby avoiding failure of the system in the event that poor communication coverage exists within the retail environment. It should be understood that other communications processes, such as downloading the most viewed content during a first download and downloading additional content on an asrequested basis, may be utilized. The ad list content downloaded to the mobile device may be ordered and displayed prior to or once at the mobile device. In one embodiment, if the mobile device is in communication with a retail store local area network, then less data may be communicated to the mobile device at "tap-in" because a good communications link exists for future communications.

In operation, in response to the mobile device 1516 "tapping in" with the tag 1520 and receiving an indicia 1518, a URL request 1522 may be communicated to the ad auction server 1502. The "tapping in" may occur in a number of different ways, including (i) performing an NFC tap-in by placing the mobile device 1516 in close proximity with the tag 1520 to receive the indicia 1518, (ii) imaging a visible indicia, such as a QR code, bar code, image, etc. that includes or is able to cause the indicia 1518 to be created, (iii) using a mobile app and selectively tapping in using a soft-button or other graphical user element to notify the mobile app that the user is in a particular retail environment, (iv) receive a wireless communication, such as a beacon, radio frequency identifier, etc. that causes an app or other process to be initiated, (v) website ad request, or (vi) other mechanism that performs a "tap-in" function that can trigger a URL request 1522 or any other request to notify the ad auction server 1502 that the user is tapping in and desires to receive an auction-ranked list of deals at that retail environment.

The URL request 1522 may include a number of different components, including the indicia 1518, mobile identifier of the mobile device 1516, user ID (not shown), loyalty card ID, phone number, email address, or any other identifier that may provide identification of a shopper, either direct (e.g., shopper ID) or indirect (e.g., mobile ID) to enable the ad auction server 1502 to conduct an auction that is customized for that shopper. It should be understood that identification of the shopper may include a specific identification of the shopper (e.g., name, address, birthday, age, gender, etc.) or historical information of the user (e.g., shopping patterns, historical purchases, types of deals desired, gender based on purchases, etc.). Identification may be further improved by combining first-party and second-party audience (shopper) data, the former supplied by the shopper and the latter from the retailer, with third-party user data from typical RTB-based data management and audience management platforms or suppliers. From the identification information, bidders in the auction may bid for their desired audience; the audience more likely to purchase or use their product or service. For example, an advertiser of tampons may focus advertisements on females within a certain age range.

The ad auction server 1502 may be configured to operate in a variety of different manners, including as a (i) pre-auction bid submission, (ii) real-time bid submission, and/or (iii) hybrid bid submission to participants in an ad auction. As further described herein, the bid submissions may have a protocol that includes a deal component and performance component, where the deal component is a deal to be offered to shoppers and the performance component is an amount of money the advertiser is willing to pay for some performance, such as display, view, selection, purchase, and so on.

In response to the ad auction server 1502 receiving the URL request 1522, a bid request 1524 may be communicated to advertiser computers 1514 to submit bids 1526a-1526n (collectively 1526) in a real-time or semi-real-time manner into the auction. Such an auction process is generally known as real-time bidding (RTB), where bids are submitted in response to a request for advertisement. In the instant case, however, rather than filling a single ad spot, an entire list of auction-ranked ads (see FIG. 3C) is filled along with adjacency spots associated with primary ads in product views (see FIG. 4B). Although shown as advertiser computers 1514, it should be understood that ad agencies that represent and place ads for multiple advertisers may operate the advertiser computers. Along with the bid submissions inclusive or audience targeting information 1526 may be ad content 1528a-1528n (collectively 1528), where the ad content 1528 may include an image of a product along with deal content (e.g., discount offer or other deal information). In an alternative embodiment, rather than sending a deal image and/or deal content, the auction server 1502 may store the product image and/or deal content and audience targeting information to reduce the amount of information having to be communicated between the advertiser computers 1514 and ad auction server 1502.

In response to the ad auction server 1502 receiving a bid 1526 within a predetermined time period (e.g., 100 ms), the auction server 1502 may close the auction and select winning bidders based on best deal for shoppers, shopper demography, highest performance bid, and other factors, as further described herein, including additive deal bids from third parties (e.g., distributor, retailer, ad delivery network, etc.). The winning bids may be ranked as ad list content 1530 by an advertisement positioning-engine for both a list view and product view and communication to the mobile device 1516.

In addition to the ad auction server 1502 and/or ad delivery system being able to provide ranked product advertisements to mobile devices, the principles of the present invention provide for the ad delivery system to communicate ads 1532, which may include advertisement adjacencies, to an Internet ad network distributor 1534 for distribution of the ads to publisher websites 1536a-1536n (collectively 1536) on the Internet. Those ads 1532 that are delivered to the publisher sites 1536 may utilize the same or similar principles for being distributed or listed in higher position than other ads through use of bids and product deals, and user data to help improve relevancy and rankings of the ads 1532 for distribution to the Internet sites 1536. In one embodiment, the ranking of the ads 1532 may be performed using a weighted average of one or more bid and deal components and/or other product related submissions, and audience (user-shopper) targeting information for each physical location associated with a physical tag or other means, if within a retail environment, or for a website, if on the Internet.

The deal components (e.g., coupon, product discount offer, incentive, pay-per-action, etc.) view-to-purchase ratio, measured interactions (views) ratio, shopper profile, shopper preferences, shopper history, and/or other product related submission may be utilized to calculate a value score or index (or bid submission) that is factored into ranking an ad for placement on a list, in an adjacency view, and so on, in accordance with the principles of the present invention. The weighted average may weight different product deals differently (e.g., free items weight high, ratio of discount to MSRP weight lower, combo deals weight higher than discounts on single products, etc.). As a general example, the value index or bid submission may be calculated using the following illustrative equation:

Bid Submission(into Auction)=Value Index(VI)=performance bid$*X1$+coupon$*X2$+deal$*X3$+discount ratio$*X4$+view-to-purchase ratio$*X5$+measured interactions (views)ratio$*X6$+shopper preferences$*X7$+shopper profile$*X8$+parameter $N*XN$, where X1, X2, X3, X4, X5, X6, X7, X8, XN are variable scale factors that may be unknown to the advertisers to prevent the advertisers from "gaming" the system. These variable scale factors may be varied by the advertisement delivery network manager for a variety of reasons, including, but not limited to, being varied in response to events or time dependent. It should be understood that the actual value index equation may be both aggregate and extensive, and utilize additional and/or alternative factors as well as other mathematical functions. Game theory principles may be incorporated into the auction process. Through use of gaming principles for a cooperative, multi-player auction whereby players make aggregate bid submissions (e.g., inclusive of pay-per-view (PPV) and/or cost-per-action (CPA) for audience delivery and deals) on the same advertised product within a dynamic place-based media system, shoppers may find the ad delivery system more interesting and, hence, be willing to use the system to ultimately lower their overall basket costs and purchase more products of advertisers. Such gaming principles would therefore facilitate the development of analytical and predictive strategies that can be used by the ad delivery network to augment the auction ranked result lists in order to generate higher levels of shopper usage of the system. In an alternative embodiment, the ad network can charge a fixed rate on a PPV and/or CPA (audience delivery) and the bid submission may be a function of the bid and deal offers independent of the PPV and CPA parameters.

In one embodiment, shopper consumption may be a factor into content delivery as a result of a particular customer's purchase history. For example, if products are offered with a maximum discount a certain number of times, such as three, and the shopper does not purchase those products, then the system may automatically not provide such ads to that shopper for subsequent views, thereby eliminating ads of products that he or she have a low likelihood of purchasing and save the advertiser money or enable the advertiser to be more efficient with its ad spend by not presenting an ad to a shopper of limited value to the advertiser.

Figure 41A:
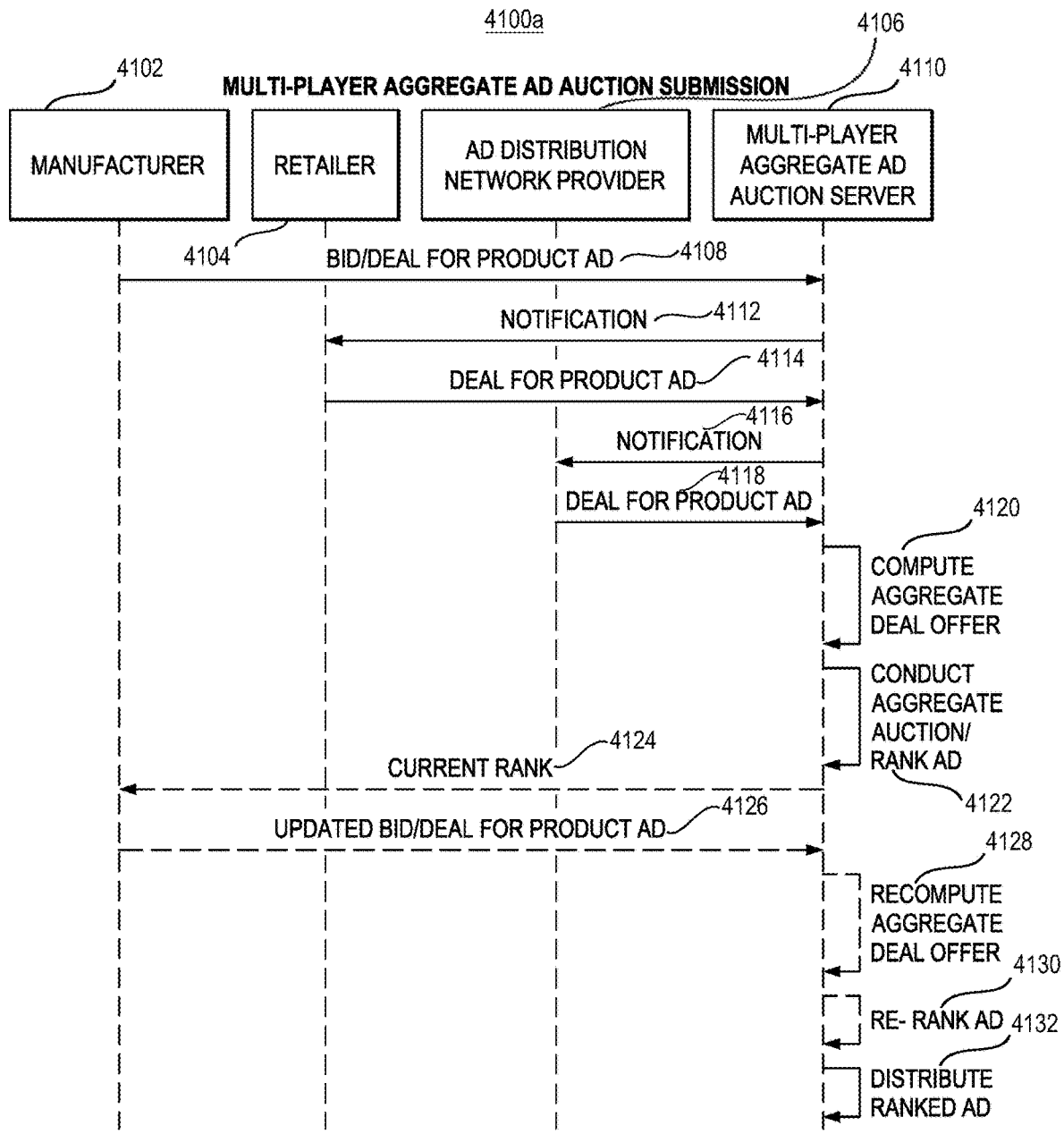
FIG. 41A is an illustrative multi-player aggregate ad auction submission process.

With regard to FIG. 41A, an illustrative multi-player aggregate ad auction submission process 4100a is shown. The process 4100a may include an advertiser/manufacturer 4102, retailer 4104, and/or ad distribution network provider 4106 participating in submitting a bid and respective deals in a serial manner for a single product in a particular location, such as a known retail store and in association with a physical tag positioned at a known location in the retail store. The process 4100a may start with the advertiser/manufacturer 4102 submitting a bid and/or deal 4108 for a product advertisement to a multi-player aggregate ad auction server 4110 of the ad distribution network provider (or 3rd party server). The auction server 4110 may communicate a notification 4112 to the retailer of the bid and deal submission, or in the alternative, the auction server 4110 may communicate a notification (not shown) to the manufacturer 4102 of the bid and deal submission of the retailer 4104. In one embodiment, the retailer 4104 is provided with the bid and deal of the advertiser or manufacturer 4102. In an alternative embodiment, the retailer is not provided with the bid and deal 4108 submitted by the advertiser or manufacturer 4102. The retailer 4104 may then elect to submit a deal 4114 of its own for the product.

It should be understood that it is unnecessary for the manufacturer 4102 to submit a deal for the retailer 4104 and ad distribution network provider 4106 to submit deals. It should also be understood that the bids/deals for a product by each of the manufacturer 4102, retailer 4104, and ad distribution network provider 4106 may be shared with each other so as to provide a collaborative bid effort. It should further be understood that the process for each of the manufacturer 4102, retailer 4104, and ad distribution network provider 4106 to submit deals may be automated. As an example, the retailer 4104 may establish a setting such that when a manufacturer 4102 incentivizes buyers with a deal that crosses a certain threshold, that the retailer 4104 may then submit a further incentive to improve views, sales, audience delivery of the bidded item. The opposite deal submission may occur, where the manufacturer 4102 participates in a deal submission in response to seeing the retailer 4104 entering a deal submission.

In response to receiving the deal 4114 from the retailer 4104 (or no deal from the retailer 4104), the ad distribution network provider 4106 may be communicated a notification 4116 of the bid and deal(s) from the manufacturer 4102 and retailer 4104 via a network communication from the auction server 4110. The ad distribution network provider 4106 may also submit or not submit a deal 4118 for the product to the server 4110. Once each of the players have or have not submitted deals 4108, 4114, 4118 within a given time period, for example, the auction server 4110 may compute an aggregate deal offer at step 4120 and bid submission, and conduct an aggregate auction 4122 to rank the ad amongst other ads in the auction for the same location (e.g., associated with the same tag(s) located within the same retail environment). In computing the aggregate deal offer at step 4120, a value index may be computed by using weights or otherwise, as previously described. As further previously described, the bid submission may include other factors, such as ad view-to-purchase ratio and ad interactions ratio, and audience (user-shopper) targeting information. Once ranked, the auction server may place the ad in a ranked order. In one embodiment the ranking may vary based on user or shopper preferences simply because different ads are to be considered based on those preferences. The ranking may be affected during or after the auction by the shopper preferences, where the shopper preferences may be used as a factor in the auction or the shopper preferences may be used to adjust auction results.

As shown, the ad distribution network provider 4106 may have the last deal submission. This last deal submission may provide the ad distribution network provider 4106 with some additional control over the manufacturer and retailer because the deal can be increased by sufficient amounts to cause the ranking of the ad to increase above other ads for which deals are being submitted for each of a ranked ad listing or a ranked adjacency listing. In an alternative embodiment, and as shown using dashed lines, a current rank 4124 as computed by the auction server may be communicated back to the manufacturer 4102, whereby the manufacturer 4102 may have a final bid and/or deal submission opportunity at step 4126, which gives the manufacturer more control over retail price than ever before since a manufacturer is generally limited to providing a manufacturer's suggested retail price (MSRP). That is, the manufacturer 4102 may be able to give a larger discount or other deal within the retail store independent of the retail store to help influence shoppers to purchase the manufacturer's product for which the deal is being offered. The auction server 4110 may thereafter recomputed the aggregate deal offer at step 4128, re-rank the ad at step 4130, and distribute the ranked ad at step 4132.

Figure 41B:
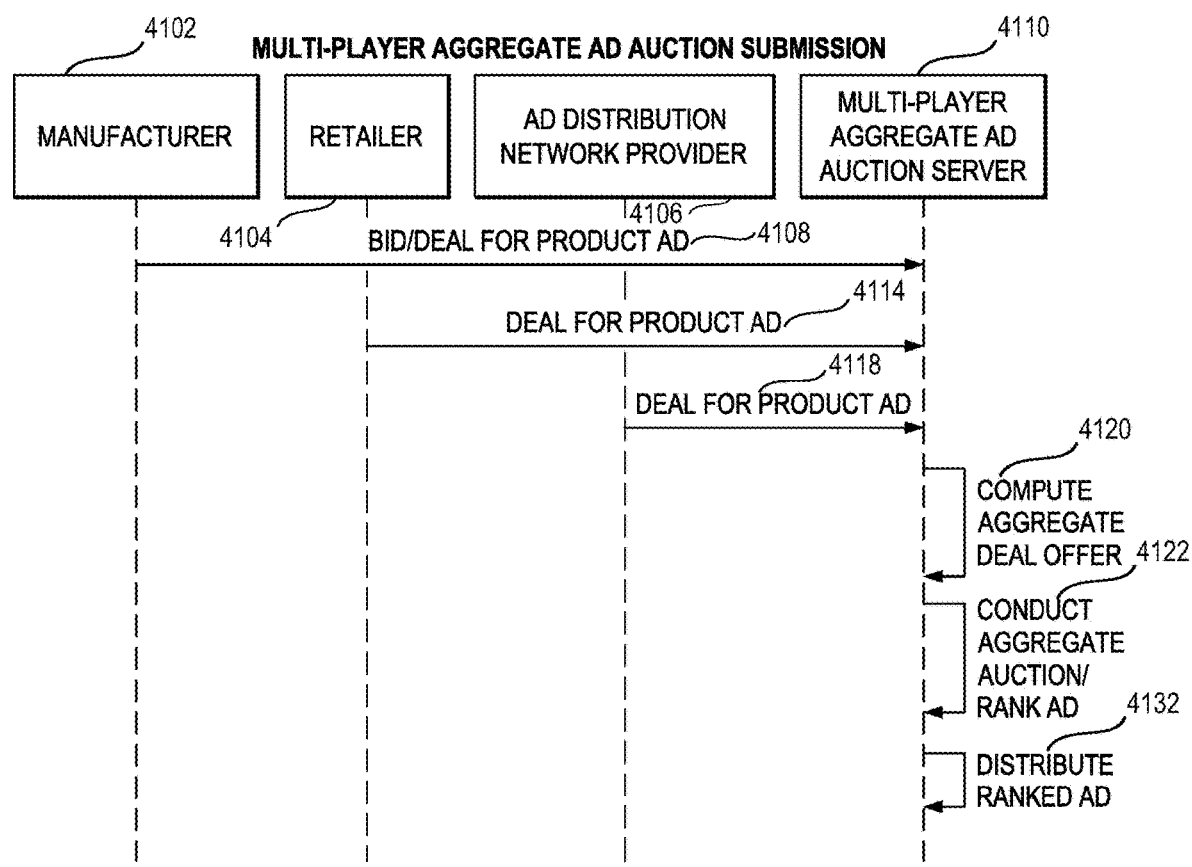
FIG. 41B is the multi-player aggregate ad auction submission that allows for multiple players to submit respective deals and the advertiser to submit a bid in a parallel manner.

With regard to FIG. 41B, an illustration of an alternative multi-player aggregate ad auction submission process 4100b is shown to allow for multiple players to submit a deal and respective bids 4108, 4114, and 4118 in a parallel manner.

That is, each of the deals 4108, 4114, and 4118 that are submitted may be submitted in parallel, which may be at distinct times, but without any of the other players having an opportunity to see the deals from the other players to help motivate a shopping audience to purchase the product for which the bids and deals are being submitted. The auction server 4110 may compute an aggregate deal offer at step 4120, perform a bid submission, conduct an aggregate auction at step 4122, and rank the ad. The ranked ad may thereafter be distributed at step 4132 to shopper(s) in the retail environment for which the auction was conducted.

Figure 15B:
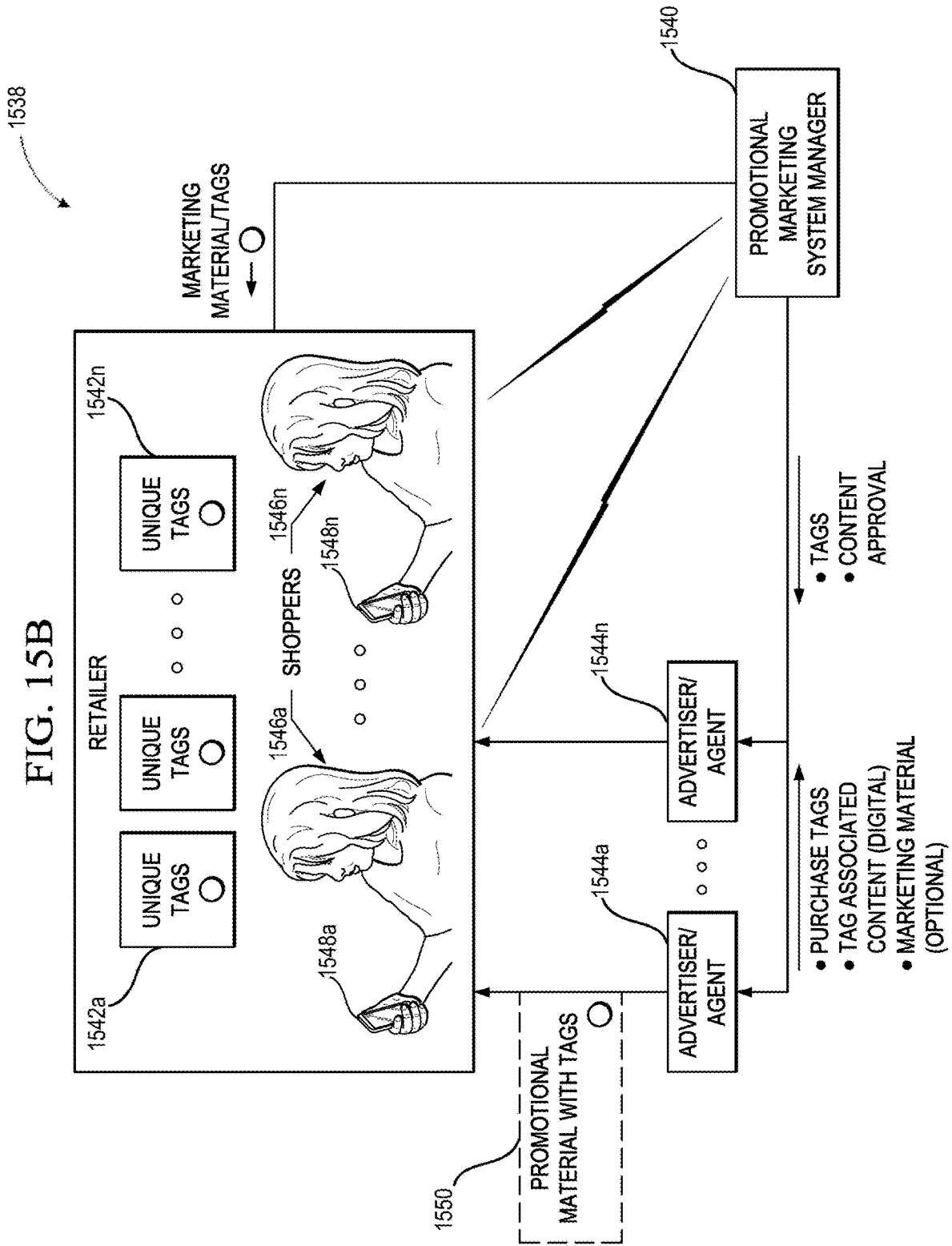
FIG. 15B is an illustration of an illustrative environment in which a promotion-marketing system manager may operate to distribute tags for advertisers and establish digital content associated with the tags.

With regard to FIG. 15B, an illustration of an illustrative environment 1538 in which a promotional marketing system manager 1540 may operate to distribute physical tags for advertisers and establish digital content associated with the physical tags is shown. This environment 1538 may include the same participants as those in FIG. 15A, but rather than providing for content associated with tags meant to provide advertisements that compete for main page listings, department listings, aisle listings, and product adjacency listings, etc., the environment provides for supporting tags of marketers that use tags 1542a-1542n (collectively 1542) for their specific products. As shown, advertiser/agents/ad agent for Coca-Cola® 1544a-1544n (collectively 1544) may wish to position tags directly in front of their products and incorporate physical tags 1542 into shelf-edge signs and displays in order to convey to shoppers 1546a-1546n (collectively 1546) with NFC enabled mobile devices 1548a-1548n content about their products. To do so, the advertisers/agents 1544 may request, via a communications network (e.g., on a website), tags for specific retail locations and upload its content to the promotional marketing system manager's servers for approval and distribution to shoppers 1546. In response, the promotional marketing system manager may provide tag(s) inclusive of indicia (e.g., URI) and content approval.

The advertiser/agent 1544 may incorporate the tag(s) to the advertiser/agent for inclusion in their promotional materials for display in association (e.g., in front of) with the product(s) of the advertiser. In addition, the advertiser/agent 1544 may optionally provide physical marketing material 1550 to the promotional marketing system manager 1540 to include tags with the promotional marketing material 1550 and the promotional marketing system manager may coordinate positioning of the promotional marketing material 1550 with the incorporated tags in the retail store in association with the product(s) of the advertiser. FIG. 18B provides additional details for managing and controlling product messaging via place-based mobile devices in a retail environment, where the product messaging may include a cooperative multi-player auction system using aggregate bids, bids are generally limited to an advertiser, and aggregate deals by the players to compute bid submissions for a single product advertisement (i.e., multiple parties submit deal offers for the same product being sold in a retail environment for shoppers to purchase, which the auction system aggregates as a total deal offer in computing a bid submission to conduct an auction to rank the product advertisement with respect to other product advertisements). In an alternative embodiment, the system owner encodes an NFC tag with the content or send the content to an active NFC tag located on a communications network.

Figure 15C:
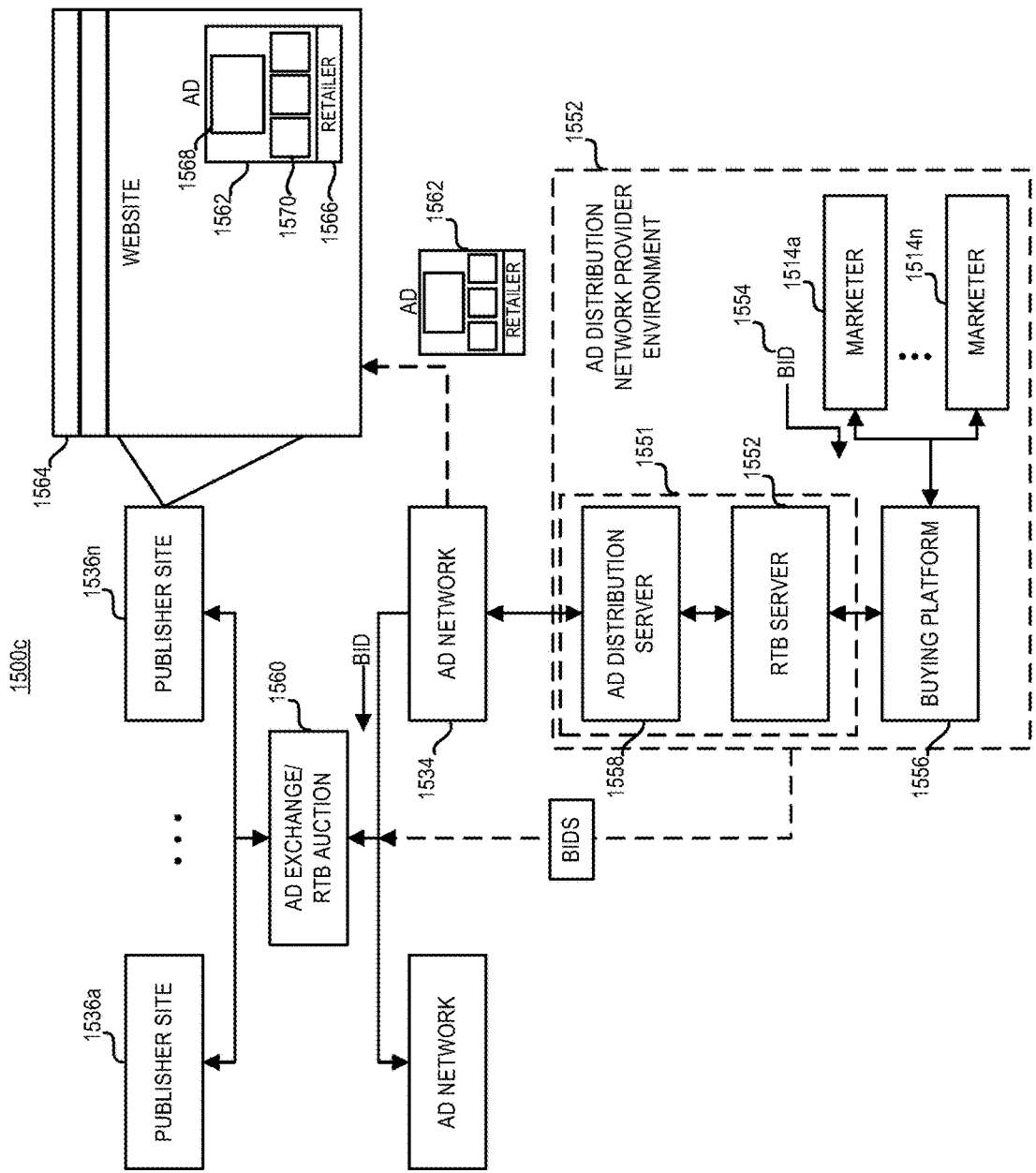
FIG. 15C is an illustration of a network environment showing an ad distribution network provider in an ad distribution network provider environment that includes the RTB server and marketers that submit bids to a buying platform.

With regard to FIG. 15C, an illustration of a network environment 1500c showing an ad distribution network provider 1551 in an ad distribution network provider environment 1552 that includes the RTB server 1502 and marketers 1514 that submit bids 1554 to a buying platform 1556 is shown. As described with regard to FIG. 15A, the ad distribution network provider 1551 operates to conduct an auction in a retail environment so as to distribute auction-ranked deals of products available for purchase or use at the retail environment to shoppers. The buying platform 1554 may enable the marketers 1514 to sponsor conventional online advertisements, either conventional Internet or mobile advertising. The RTB server 1502, in the case of submitting a bid for a conventional online advertisement, may, in response to receiving a request for a bid submission for an online ad space auction, request or access local ad auction bids from marketers 1514 who want to sponsor an advertisement. The RTB server 1502 may select a winning bid from the marketers 1514 (or other advertiser, such as a retailer) and submit the winning bid via an ad distribution server 1558 to the ad network 1534 that, in turn, submits the bid 1554 to an ad exchange with an RTB auction 1560, as understood in the art, with access to the publisher sites 1536 (e.g., traditional website, mobile apps, etc.) for placing ads. That bid submitted to the ad exchange with RTB auction 1560 conducts an auction with the bid submitted to the ad network 1534 against all other ad networks that submit bids for a particular ad spot on a publisher site. In one embodiment, an advertisement 1562 sponsored by marketer 1514a that wins an auction by the ad exchange/RTB auction 1560 may be placed on website 1564 on a browser of a computer or mobile device. In an alternative configuration, rather than the ad distribution network provider purchasing ad space via an ad network 1534, if sufficient demand can be generated by the ad distribution network provider, then it may operate as an ad network itself and submit bids directly into the ad exchange/RTB auction 1560 to compete to purchase ad space on the publisher sites 1536. In event that the ad distribution network provider becomes a direct bidder into the ad exchange/RTB auction 1560, then the ad distribution server 1558 may be configured to support delivery of the ad 1562 direct to the browser on which the publisher site 1536n is being displayed, as understood in the art.

Depending on the winning marketer and product to be presented on the ad 1562, a retailer that carries the product and is local to a user who is accessing the website 1564, may be selected and an indicia 1566, such as name and/or logo, may be displayed in the ad 1562. The ad, in one embodiment, may be a product view showing a product from the marketer with the winning bid as a primary product ad 1568 in the ad 1562 with adjacency product ads 1570 from the same or other marketers or retailer, as described with regard to FIG. 4B. If the user selects the ad 1562, then the browser may be redirected to a site of the ad distribution network provider to be able to perform additional advertisement/deal viewing at the retailer. In one embodiment, a combination of bidders, such as a marketer, retailer, ad distribution network provider, distributor, and/or any other parties, may participate in the auction to distribute the ad 1562 online at publisher site(s). In an alternative embodiment, rather than using the product view as the content of the advertisement, an auction-ranked listing, such as FIG. 3C, may be used as the ad content and a selection of the ad may cause the browser to be rerouted to an auction-ranked listing at the retailer. The deals may be identical or different from deals that would be seen within the retail store.

Figure 15D:
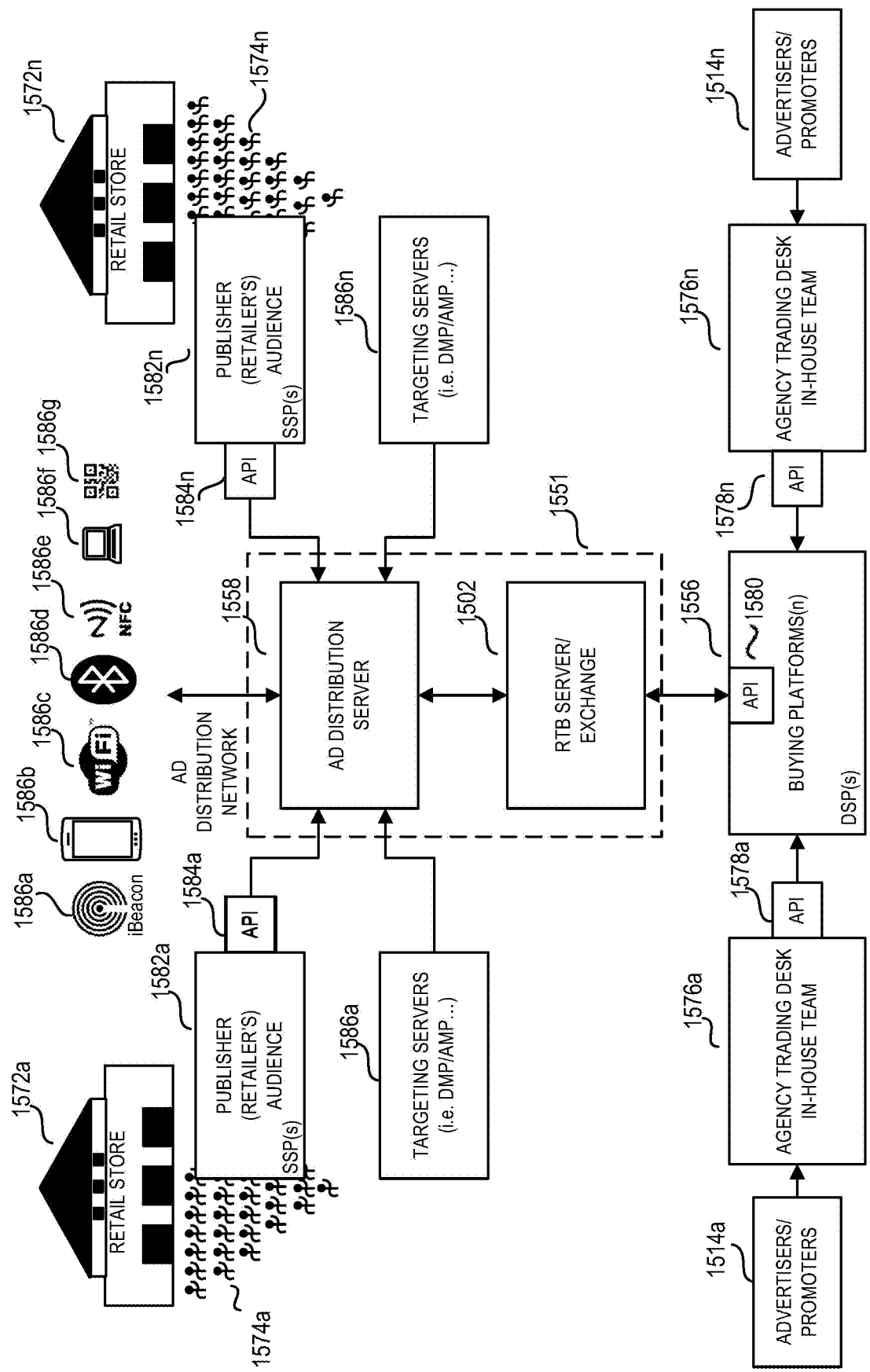
FIG. 15D is an illustration of an illustrative network environment in which the ad distribution network provider may operate as an exchange for distributing ads within retail stores to shopper audiences via mobile devices of the shopper audiences.

With regard to FIG. 15D, an illustration of an illustrative network environment 1500d in which the ad distribution network provider 1551 may operate as an exchange for distributing ads within retail stores 1572a-1572n (collectively 1572) to shopper audiences 1574a-1574n (collectively 1574) via mobile devices (not shown) of the shopper audiences 1574 is shown. Advertisers/promoters 1514a-1514n (collectively 1514), which may be consumer products goods (CPGs) manufacturers or fast-moving consumer goods (FMCGs) manufacturers who want to communicate advertising to the shopper audiences 1574. In conducting an ad campaign, the advertisers/promoters 1514 may use an ad agency, trading desk, in-house team 1576a-1576n (collectively 1576; "agencies") to establish, conduct, and manage the ad campaign. In one embodiment, the agencies 1576 may utilize an application programming interface (API) 1578a-1578n (collectively 1578) that may be provided to the agencies 1576 for use in interfacing with one or more buying platforms 1556 that operate to bid for and purchase ad space via the ad distribution network provider 1551. The buying platforms 1556 are generally considered demand-side platforms (DSPs), and may utilize an API 1580 provided by the distribution network to provide a proper interface to the RTB server 1502. The APIs 1580 may be configured to ensure that the agencies 1576 and buying platforms 1556 are submitting proper bids inclusive of performance bids and deal bid submissions, as previously described.

One or more publishers 1582a-1582n (collectively 1582) that have access to the retail audiences 1574 may expose the audiences 1574 of the retailers 1572 to advertisements from the advertisers/promoters 1514. As shown, each of the publishers 1582 may utilize an API 1584a-1584n (collectively 1584) that interfaces with the ad distribution server 1558 and/or RTB server 1502. The publishers 1582, as an example, may include conventional coupon distribution networks that have historically distributed digital coupons that are merely digital copies of paper coupons and are commonly understood to be analog in nature since the coupons are identical for all shoppers. By creating an API 1884, the publishers 1582 may be able to expose their current audiences 1574, which is also the retailer's audience, to the auction-ranked advertisements inclusive of deals that are bid through the RTB server 1502.

To enhance the effectiveness of delivering advertisements to the retail audiences 1574, the ad distribution server 1558 and/or RTB server 1502, buying platforms 1556 and/or agencies 1514 may be in communication with audience targeting services via targeting servers 1586a-1586n (collectively 1586). The targeting services may include data management platform (DMPs), audience management platforms (AMPs), or any other service provider that enables the ad distribution network provider to better target individual shoppers in the audiences 1574. In improving targeting, the targeting servers 1586 may be capable of receiving an identifier (e.g., telephone number, mobile ID, loyalty card ID, etc.) associated with an audience member and provide demographic information, geographic information, historical information, or other information of the audience member to the ad distribution network provider 1551 so that the RTB server 1502 may make that information available to the buying platforms 1556 to assist with decision making processes as to whether and how to submit bids using deal types and deal values as submission parameters. If the buying platforms 1556 are using programmatic buying and machine learning capabilities, then the information of the audience member can be used by a programmatic or automated process to increase or decrease discounts for certain types of customers. For example, customers who have never purchased a particular product can be avoided for a bid or submit a low performance bid or an increase in the deal bid to encourage the customers to try the product may be made by the automated process, As previously described, the audiences 1574 may access the ad distribution network utilizing a variety of different communications protocols and user interfaces, including mobile devices that communicate with iBeacon® 1586a, geo-positioning 1586b, Wi-Fi 1586c, Bluetooth® 1586d, near field communications (NFC) 1586e, personal computer 1586f, imaging (e.g., QR code) 1586g, or any other communication device, user interface, and communications protocol, as understood in the art.

By the ad distribution network provider 1551 operating as an customized exchange for retail audiences that delivers auction-ranked deals within the retail stores 1572, the ad distribution network provider 1551 may be able to create larger demand side and supply side participants than if the ad distribution network provider 1551 were to operate a "closed" network, as represented in FIG. 15A.

With regard to FIG. 16, an illustration of an interactive flow diagram 1600 that shows communications and operations of each of the devices for use in generating and delivering product deals to shoppers in a retail environment is shown. The devices may include a physical tag/indicia 1602, mobile device 1604, ad network manager server 1606, and advertiser computer 1608. The ad network manager server 1606 may be used to compute positioning of product advertisements relative to other advertisements (ad listings and adjacencies), and deliver product deals (advertisements) to shoppers using mobile devices 1604 within a retail environment.

At step 1610, a URL may be stored with a location at which the tag 1602 is to be positioned representative of the URL at step 1612. In response to the mobile device 1604 reading or imaging a physical tag inclusive of an indicia 1602, the mobile device 1604 may request a URI endpoint (or communicate data for requesting data to be delivered via a mobile app) at step 1614, where the URI endpoint is associated with a particular physical location, such as a particular store, street address, or otherwise of a physical retail location or retail environment.

It should be noted that in the case of using a URI endpoint (e.g., webpage within a browser), that the shopper may not have to actually log into a website. Alternative embodiments may allow the shopper to log into the website. In the case of using a mobile app, the app may have a shopper log into the app in a first instance, but not be required to do so thereafter, as understood in the art. Such a traditional app configuration, however, tends to be less desirable and, thus, less used than in years past. The information that may be communicated to the ad network server may include a request with the URI, where the URI may include location information of the physical tag (e.g., retailer name, store number, department name, aisle number, city, address, zip code, etc.). Additional information, such as a mobile identifier or ID (MID), telephone number, email address, or any other identifier, may be communicated along with the URI. The MID may be communicated at step 1616 as part of the URI communication or through communication network and protocols. In one embodiment, preferences, demographics, or other information may be communicated to the ad network manager server from the mobile device 1604. However, such information may not be possible if using a mobile browser because cookies are generally limited or unavailable with mobile browsers these days due to bandwidth considerations or may not be desirable or available to include. Future systems, however, may use cookies or similar tracking technology on mobile devices, as understood in the art of Internet advertising. The ad network manager server 1606 may be configured to store preference, historical information as well as third-party supplied demographic data associated with the mobile ID, location and tag information, thereby being able to customize advertising information that is more relevant for the shopper (e.g., products for a male in his age range and related to historical products that he has purchased in the past or related to wider user activities and associations beyond a particular retail location).

At step 1618, the advertiser computer 1608 may upload ad content 1618 to the ad network manager server 1606, where the content may include a product image, logo, text, etc. At step 1620, an advertiser may use the advertiser computer 1608 to submit an ad bid and/or product deal offer, as previously described. It should be understood that an advertising agency trading desk may perform steps 1618 and 1620 for the advertiser. In one embodiment, the ad network manager server 1606 may compute an ad position auction order at step 1622 prior to the URI request 1614. Alternatively, step 1622 may be performed after step 1616, thereby enabling the auction to factor in specific parameters associated with the particular shopper, where such a process is considered an RTB process.

The ad network manager server 1606, in response to receiving the URI request, may populate an auction-ranked ad list via its ad positioning-engine function, product views and ad content associated with that particular location associated with the tag 1602 at step 1624. The auction-ranked ad list, product views, and ad content may be loaded to a webpage and communicate to the mobile device 1604 at step 1626 that is thereafter displayed on the mobile device 1604.

The shopper may interact with the user interface, such as through a browser or mobile app, at step 1628 to cause the mobile device 1604 to store product deals (e.g., discounts/coupons/incentives) at step 1630 by viewing or selecting the items displayed in ranked lists or otherwise. In response to the shopper deciding to check-out of the store, the mobile device 1604 may generate an aggregate deal indicia at step 1632 that may be communicated to or scanned by a checkout scanner or checkout NFC tag integrated into the functionality of the retailer's POS system 1634 at step 1636. In one embodiment, the checkout physical tag may be available for the shopper to "tap" with his or her mobile device that causes the aggregation of the deal indicia for reading at the POS system by a barcode, QR code, or other reader. The aggregate deal indicia may be an indicia, such as a QR code, that includes all deals that the shopper has viewed or selected to buy when shopping for goods at the retail environment. Other information, such as gift certificates and cash-back rewards, may be included in the aggregate indicia, as further provided herein.

The POS system may discriminate the actual goods purchased and apply the deals at step 1638 from any of the ad delivery network, retailers, marketer, advertiser, etc., to only the products being purchased. In one embodiment, the POS system may read all the deals prior to the scanning of the goods, and apply the deals at step 1638 as the POS terminal is recording the product purchases. Alternatively, the deals may be read after scanning the goods into the POS terminal system and applied thereafter. It should be understood that the retailer's POS system may be configured in a variety of different ways in applying the deals to products being purchased for the shopper. In an alternative embodiment, rather than the POS 1639 applying deals, a credit card company server or third-party server may apply the deals and offset the purchase or provide a rebate or credit, thereby allowing the retailer to be paid in full without having to wait for reimbursement after settlement with the advertiser. At step 1644, uploaded data may be aggregated with other shopper data and advertiser data. In aggregating the data, a variety of parameters and metrics may be used in performing the aggregation and analyzing the data, such as specific products purchased by specific demographics at specific times. It should be understood that while the POS communicating the shopper and deal data at step 1646 is helpful, the principles of the present invention may operate without the POS data. At step 1648, the ad network manager server 1606 may process shopper and deal data for an advertiser, and generate and send a reply and invoice to the advertiser (or debit account of the advertiser) at step 1650.

The generation of the deals indicia at step 1632 may be performed in a variety of ways and also created in a manner that avoids fraud and is limited to a single use by the shopper. For example, the deals indicia may be inclusive of a particular mobile ID, shopper identifier, payment system identifier, timestamp, retail store location, encryption code with a public and/or private encryption key, or any other technique that limits the ability for the shopper to re-use or share the discount indicia with other shoppers who may take an image of the indicia on their mobile device, reuse the indicia by giving the mobile device to another shopper, or attempt to perform any other fraudulent use of the mobile indicia. As previously described, the aggregate deals indicia may include all discounts that the shopper selected and viewed (and automatically stored), thereby minimizing amount of time needed at the POS to conduct a transaction. The POS, of course, includes software that allows for reading, decoding, deciphering, decrypting, parsing, or otherwise interpreting the aggregate deals indicia for processing the deals against the products that the shopper is purchasing. If a shopper has selected a deal offer, but has not purchased the corresponding product or a sufficient number of the corresponding products that would otherwise allow for the shopper to receive the specified deal, then the POS may simply ignore those discounts and/or list potential discounts on a receipt that the shopper had requested, but not given as a result of not purchasing those products. At step 1646, the POS may report selected deals and products purchased to the ad distribution network manager 1606 so that information, such as deals selected without product purchased, may be determined.

The mobile device 1604 may also upload the discount and other data at step 1640 to the ad network manager server 1606 while or after checking out of the retail store so that the ad network manager server 1606 may update its records and create a report to the advertisers about bid audience delivery, shopper and discount activity. The uploaded data from the mobile device 1604 may also be associated and stored at step 1642 with the mobile ID (or any other identifier) of the mobile device 1604 and shopper so that the data may be analyzed and utilized in future shopping trips to that or other retail environments. In one embodiment, the ad network manager server 1606, in determining that a shopper who has selected or viewed a deal for pet food and actually purchased pet food as evidenced by data from a POS, may reduce the chances or avoid delivering pet food ads to the shopper for a certain duration of time (e.g., one month) as it is unlikely that the shopper will be purchasing pet food within that certain duration of time. In reducing the chances or avoiding delivery of pet food ads, a weighting factor or other logical or mathematical function may be utilized for pet food ads to be adjusted automatically by the ad network manager server 1606, thereby minimizing advertising waste and presenting more timely relevant ads to the shopper. The purchase history and deal usage factors may be utilized in the auction process for the individual shopper or used to adjust auction results prior to delivery of the advertisement position-engine's results-list to the shopper. Similarly, the POS system or other retailer system may also communicate shopper and discount data to the ad network manager server 1606. The ad network manager server 1606 may create a real-time audience delivery and deal usage report for the advertisers, retailers, and/or ad delivery network manager, thereby enabling the bidders to adjust bids and deals, either manually or automatically, based on substantially real-time information. The bidders may use that information to achieve a higher ranking of their advertisements or improved product positioning relative to other advertised products by increasing their bids, enhancing their product deal offers, or otherwise, in accordance with the principles of the present invention.

The place-based audience may be an audience of shoppers within a retail environment for which the advertisers may pay on an audience level (e.g., cost per thousand (CPM), in addition to or in lieu of paying on an individual CPA or usage level (e.g., pay-per-view, pay-per-tap, pay-per-action)). The audience may be one of which advertisers desire to reach because that audience represents actual shoppers, as opposed to potential shoppers (e.g., online shoppers, out-of-store shoppers, etc.), and the advertisers may be willing to pay more for higher actual shopper audiences. Moreover, the system may be configured to determine distinct shoppers using information received from a mobile device of the shoppers, and calculate a number of audience members inclusive of distinct shoppers versus a number of audience members inclusive of all shoppers that are using the system via out-of-store means. Because the same shoppers may shop in different retail stores and the system may support multiple different retail stores (e.g., Walmart® and CVS®), the system may generate greater levels of audience delivery efficiency for advertisers by stopping or allowing shoppers in different retail environments to be exposed to the same ads, generate reports, adjust ad delivery, adjust deal offerings, and otherwise across disparate retail environments. Furthermore, by being able to determine how many different shoppers are reached across a designated market area (DMA), rating points (e.g., number of distinct households in a given DMA that have seen an ad), that are comparable with traditional in-home television measurement may be generated. Other media metrics, such as gross rating points, may also be generated as a result of being able to collect location and repeated viewings data within a DMA.

Moreover, because it is well known that shoppers of grocery stores, along with other types of retail stores, generally travel a certain distance to the retail store (e.g., average shoppers of a grocery store travels 2.4 miles in suburban locations, while average shoppers of a grocery store in NYC may travel 4 blocks), the ability to refine the DMAs to micro-DMAs or sub-DMAs, micro-targeting of advertising to specific demographics, such as average household income, race, language, and so forth, may be performed, and may impact advertising performance bids or pricing and deal values. Such micro-targeting may alter the deal-type and deal values that are made within different micro-DMAs and may be altered to appeal to the demographics and desires of demographics in those micro-DMAs. As a result, an audience created by the principles of the present invention may be monetized in ways that conventional coupon distribution systems and place-based media have not heretofore been able to develop because such measurement tools did not exist. In one embodiment, programmatic buying of audiences may enable a marketer (or other bidding participant) to alter and/or automatically dynamically alter the deal types being offered. For example, as demographics may shift throughout a day due to younger, older, male, female, etc. shoppers entering a retail environment, then the programmatic buying may dynamically adjust the deal types (e.g., change from discount percentage to buy-one-get-one free; change from buy 3 out of 6 and get 25% off to discount percentage fixed discount to "spin wheel" to find out deal) to drive sales or trials in the retail store because different audience demographics may be attracted to different deal types and deal values.

Figure 17:
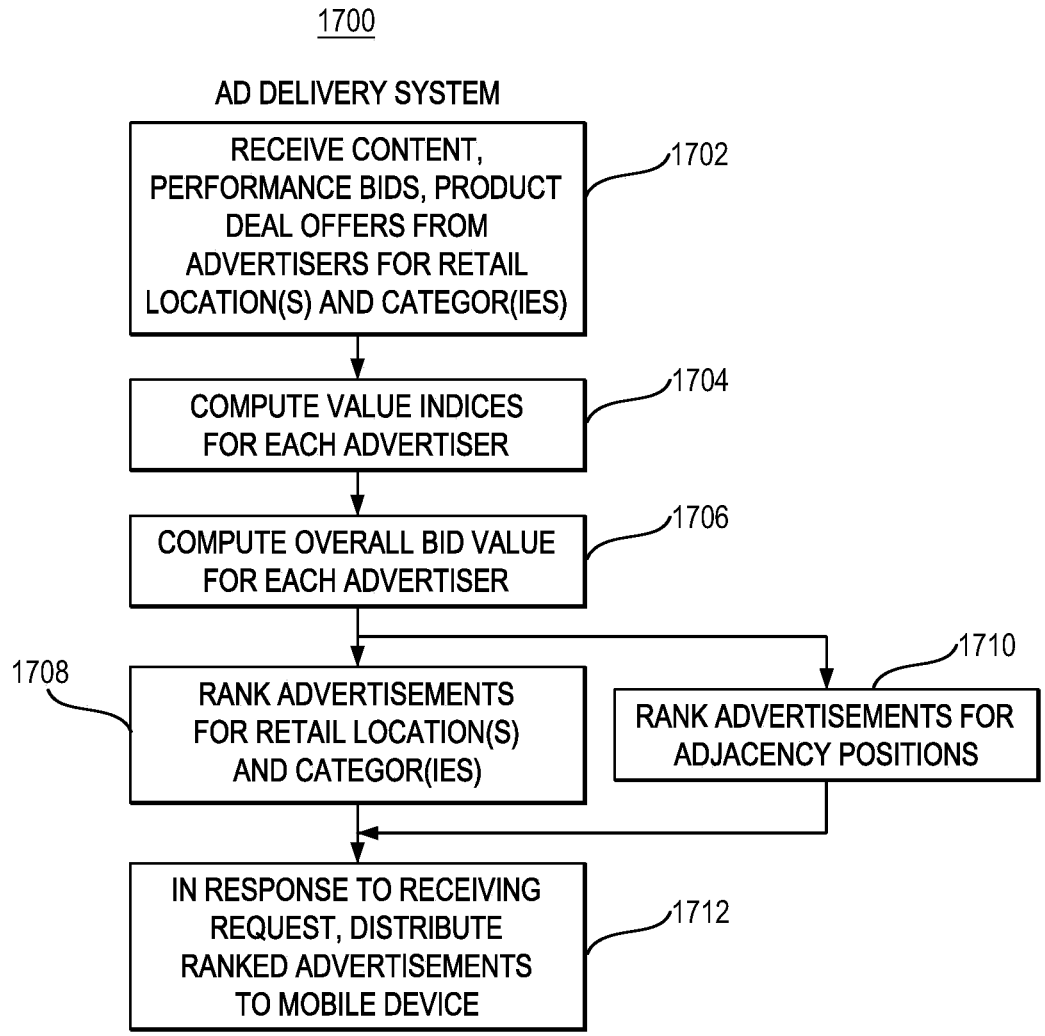
FIG. 17 is a flow diagram of an illustrative process for an ad delivery system to generate and deliver ranked advertisement lists to shoppers within a retail environment.

With regard to FIG. 17, a flow diagram of an illustrative process 1700 for an ad delivery system to generate and deliver auction ranked advertisement lists to shoppers within a retail environment is shown. The process 1700 may start at step 1702 to receive content, bids, and product deal offers from advertisers for retail locations and categories of products. The retail location(s) may be retail chains, individual retail outlets, malls, or any other retail or place-based media environment at which the advertisements are to be delivered. Value indices may be computed at step 1704 for each advertiser that submits product deal offers. The value indices may be considered a "transfer value" from bidders to a shopper or consumer. The value indices may be a mathematical and/or statistical value associated with a deal offer being made by the advertiser as compared to a typical retail selling price or a manufacturer's suggested retail price (MSRP). As previously described, deals may be normalized to produce a value index that can be compared against deals for other products. An overall bid value or bid submission, inclusive or composite of a performance bid and the value index for each advertiser and each product of each advertiser optionally along with ad performance statistical data and product performance statistical data, may be computed at step 1706. The advertisements may be ranked for each retail physical location, ad category listing (e.g., main page, diet foods), and each adjacency position (i.e., contextual and/or logical related advertisements with other product advertisements, as previously described) at steps 1708 and 1710. In response to receiving a request from a shopper's mobile device "tapping" a physical tag and reading and communicating an indicia associated with the physical tag, a server of an ad delivery network provider may communicate the auction-ranked advertisements to the mobile device of the shopper at step 1712. In an alternative embodiment, ranking of the advertiser for both the list and product views may be performed after receiving a request from a shopper, so that the auction is real-time and may factor in demographics, historical information, and other information of the shopper.

Figure 18A:
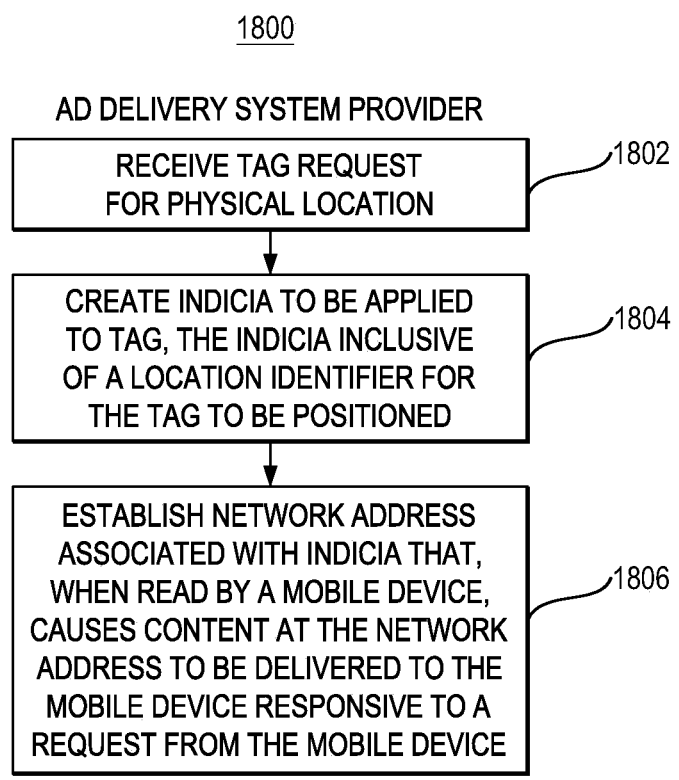
FIG. 18A is a flow diagram of an illustrative process for an ad delivery system provider to provide tags and network addresses associated with those tags.
Figure 18B:
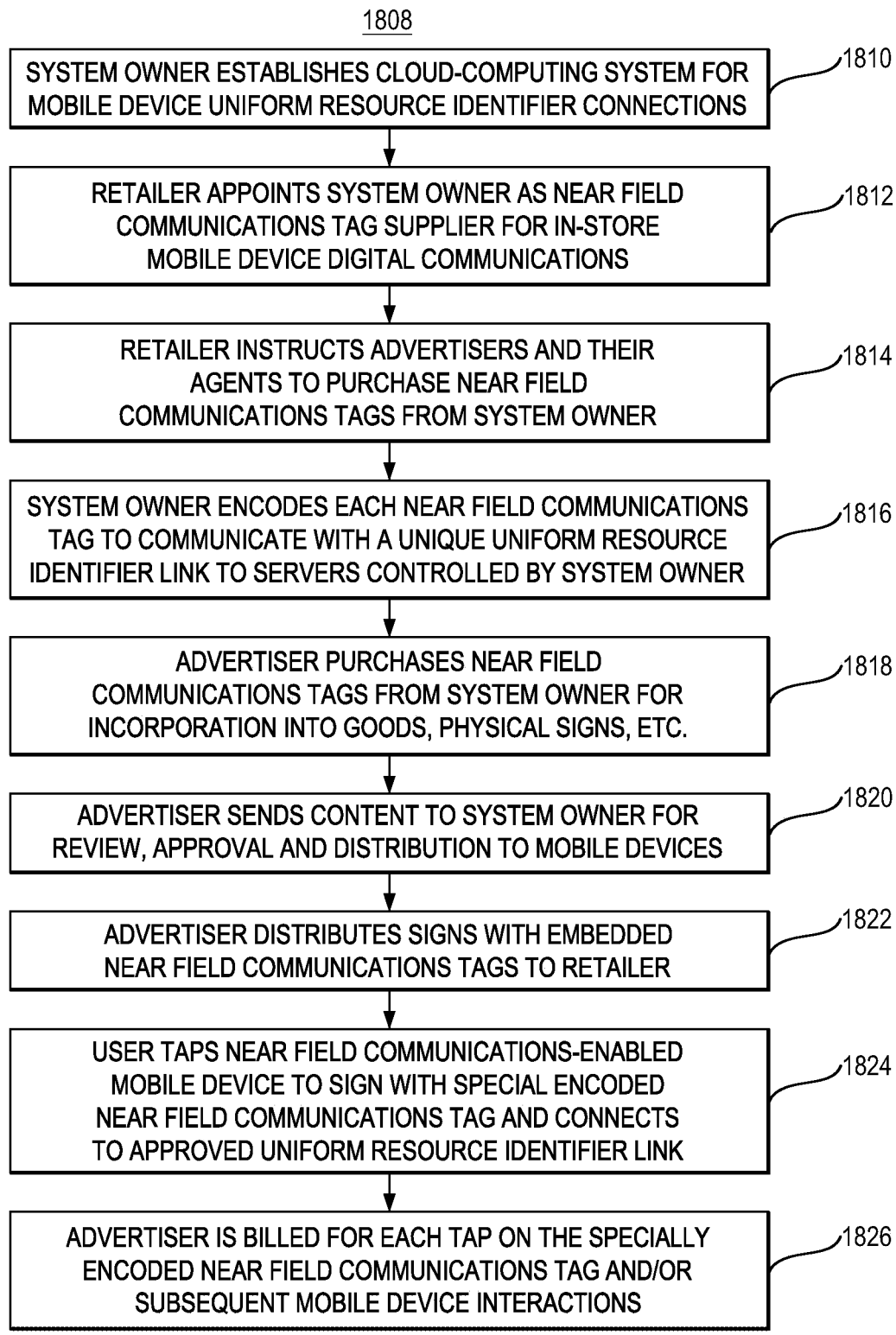
FIG. 18B is a flow diagram of an illustrative process for enabling a retail environment owner to control product messaging in the retail environment.

With regard to FIG. 18A, a flow diagram of a physical tag ordering and registration process 1800 in which an ad delivery system provider provides tags and network addresses associated with those tags is shown. This tag ordering process 1800 provides control of digital content delivery with a retail environment by an owner of the retail environment, thereby allowing the owner to control or have oversight authority of content that may be delivered to customers of the retail environment and participate financially for supplying an audience to the ad delivery system provider and marketers. The process 1800 may start at step 1802 by a physical tag request for a physical location being received by the ad delivery system provider. The request may be received via a website request from a retail store, advertiser, or otherwise. The physical location may be a physical location of a particular retail store, department or aisle within a particular retail store, entryway of a particular retail store or mall, for example, a sign to be displayed within a retail environment, and so forth.

At step 1804, an indicia to be applied to the tag may be created, where the indicia may be inclusive of a location identifier (e.g., URI) for the tag to be positioned at the physical location. Alternative indicia may be included at the physical tag, such as including a graphical representation of a URI, that, when processed by an application that may be executed on a mobile device, may request data associated with that information to be delivered to the mobile device from a remote server via a communications network, and so forth. A network address associated with the indicia may be established at step 1806. When the indicia is read by a mobile device, the content at the network address may be delivered to the mobile device responsive to a request from the mobile device. That is, if the indicia is a URI, then the mobile device may automatically recognize that the indicia is a URI and request the URI via a browser to be executed for display of the content. In one embodiment, the URI may operate in a similar manner as a conventional mobile app. However, because the browser may be automatically launched by the mobile device when using NFC technology, a higher likelihood of adoption and usage of the advertising system may result from shoppers simply by eliminating the step of the shopper having to download the mobile app and later having to locate the mobile app on his or her mobile device, launch the mobile app, and perform the process of reading the indicia at the tag. By populating the network address with product deal offers, as previously described, the principles of the present invention may continuously and dynamically maintain a real-time and/or up-to-date product deal program for both advertisers and consumers. It should be understood that alternative technologies that do not use an indicia to cause a URL to be automatically loaded may be used. Such technologies may include, but not be limited, to QR code imaging, RF signal reception using RFID and beacon technology, or otherwise. In one embodiment, the principles of the present invention may utilize SMS or text messaging that allows for a user to send an SMS message to a network address using an abbreviated code (e.g., *deals) or telephone number (e.g., 800-OUR-DEAL) and, in response, an SMS message may be returned inclusive of auction-ranked deals at the retail store and/or a selectable URL that causes a browser of the mobile device, if so equipped, to open the URL with the auction-ranked deals at the retail store. With some of these alternative technologies, data may be communicated and displayed via a mobile app, as understood in the art.

The retailer, by requiring the advertisers that desire to have physical tags positioned in front of or in association with their products to enable shoppers to access product views or receive other messaging in response to "tapping" or otherwise reading those tags to buy the tags from trusted source(s) of tags, the advertiser (e.g., manufacturer or agent) may receive pre-loaded tags with URIs or content that (i) allow the retailer to control messaging being delivered in its store that may be inclusive of product adjacency content of both the retailer and a third party advertiser and (ii) allow the retailer to participate financially with each tag sale and each "tap" of a tag. That is, tolling for use of the tags in the retail store and delivery of content associated with use of the tags to shoppers in the retail store may be controlled and managed by the retailer and/or ad delivery network such that advertisers may be properly billed for audience delivery.

With regard to FIG. 18B, a flow diagram of an illustrative process 1808 for enabling a retail environment owner to control product messaging in the retail environment is shown. In one embodiment, the process may start at step 1810 by a system owner or advertising delivery network provider establishing a cloud-computing system for mobile device URI connections. A retailer may appoint the system owner as the approved tag (e.g., NFC tag) supplier for in-store mobile device digital communications at step 1812. The retailer may instruct advertisers and their agents to purchase the approved tags from the system owner at step 1814. The retailer may participate in the sale of the approved tags, such as $0.25 for each tag. The system owner, in response to receiving a request from an advertiser or their agent, may encode each tag to communicate with a unique URI link to servers controlled by the system owner at step 1816. At step 1818, the advertiser may purchase the specially encoded physical tags from the system owner for incorporation into goods, physical signs (e.g., paper or electronic), etc. The advertiser may communicate content to the system owner for review, approval, and distribution to mobile devices at step 1820.

The advertiser may distribute the signs with embedded approved tags to the retailer at step 1822. In response to a shopper "tapping" or otherwise reading indicia with a mobile device from the approved physical tag, the mobile device may be directed to and connect with an approved URI link at step 1824. The ad delivery network may charge the advertiser for audience delivery on a pay-per-tap basis as shoppers "tap" their mobile devices to the approved tags or otherwise connect to the ad delivery server at step 1826. Audience delivery revenue may be shared with the retailer. If the tag is an NFC tag, the mobile device may "tap" the approved NFC tag by the shopper placing the mobile device close to or against the approved NFC tag. The connection to the approved URI link may be performed via a mobile browser in an automated manner. The advertiser may be billed for each audience delivery "tap" on the specially encoded tag and/or subsequent mobile device interactions (e.g., shopper selecting and displaying a product view of an advertisement on the electronic device) and/or displays (e.g., display of advertisement of the advertiser). The retailer may share in a variety of audience delivery revenue generation, revenue streams because the retailer is providing a forum and audience in which the ad distribution network may operate. As previously described, rather than using NFC technology, other communications and "check-in" technologies, such as RFID, WiFi®, Bluetooth®, beacons, mobile apps with soft-button check-in capabilities, geofencing, etc., may be utilized in accordance with the principles of the present invention.

Figure 19:
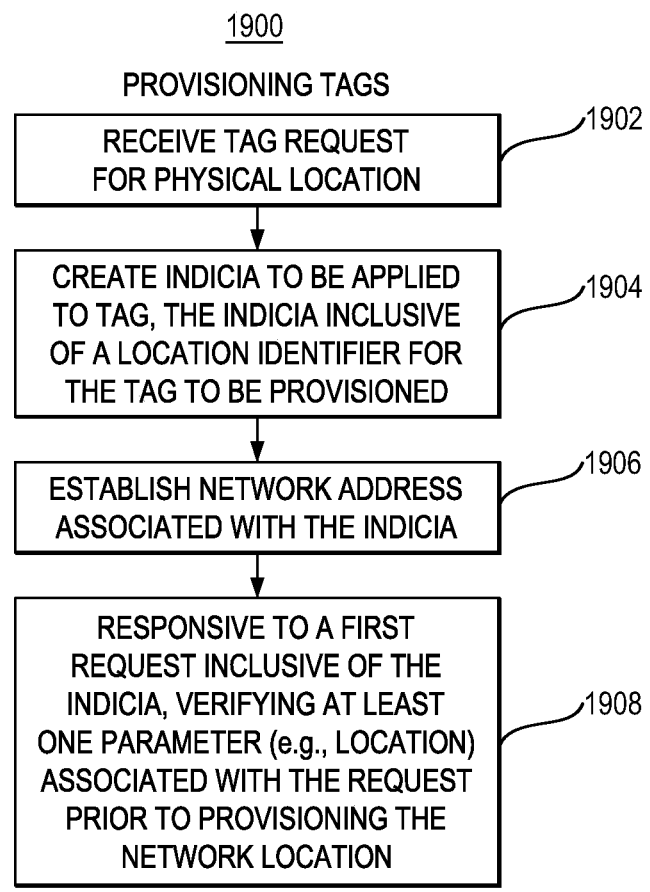
FIG. 19 is a flow diagram of an illustrative process for provisioning tags.

With regard to FIG. 19, a flow diagram of a process 1900 for provisioning physical tags is provided. The process 1900 may start at step 1902 by receiving a physical tag request for positioning at a known, predetermined physical location. At step 1904, an indicia may be created and applied to the physical tag, where the indicia may be inclusive of a location identifier for the tag to be provisioned. The location identifier may be a known physical location at which a tag is to be positioned, such as retail store, physical address of the retail store, store number, retail chain identifier, zip code, aisle, department, etc. At step 1806, a network address may be associated with the indicia and established with data associated with the tag. At step 1808, in response to a first request inclusive of the indicia, which most likely is from an installer of the physical tag at the known location, a verification may be performed using at least one parameter (e.g., physical location) associated with the request prior to provisioning the network location. That is, by the system verifying that the tag is being positioned in a correct location in association with the indicia, mistakes that a network address with information associated with a retailer that is different from the retailer at which the physical tag is being positioned can be avoided (e.g., avoid placing a tag destined for a grocery store from being placed in a pharmacy unrelated to the grocery store). In one embodiment, the verification may include the use of GPS coordinates to ensure that the retail location is, in fact, the one specified in the indicia. It should be understood that a variety of different techniques may be utilized prior to provisioning a network address for use by shoppers of a retailer.

With regard to FIG. 20A, an illustration of an illustrative mobile device 2000 displaying a product view 2002a of a product that was either selected from a list of product deal offers (ad listings) or responsive to the mobile device accessing an indicia of a physical tag associated with a particular product is shown. As shown, and previously described, the product view 2002a may display primary product information 2004a associated with a product and have related product information (i.e., adjacency ads) 2006a displayed beneath the primary product information 2004a, which may include images, a description of the product, and deal offer(s). As further previously described, advertisers, retailers, and/or ad distribution network provider may bid for their advertisements that are related to the primary product information 2004a using bids and product deal offers with the goal of being displayed in association with the primary product information 2004a. For example, if the primary product is a pancake mix, then manufacturers of syrup, cookware, orange juice, blueberries, or any other product that is contextually and/or logically related the primary product may submit ads for those respective products along with corresponding bids and deals. Each of the advertisements that are submitted for the advertisement relationship positions may be ranked based on the bid submissions, as previously described. In this case, and as shown, the highest three ranked advertisements (i.e., related product information 2006a) may be displayed beneath the primary product information 2004a. In this case, related products A, B, and C 2006a are displayed below the primary product information 2004a. In one embodiment, the retailer may have one of the adjacency positions for display of a retailer brand related to the primary product.

With regard to FIG. 20B, in response to a shopper of the mobile device 2000 selecting related product B of the related product information 2006a to view in FIG. 20A, the related product advertisement B may become a primary product information or advertisement 2004b listed in the primary product area, and related product information 2006b may include product advertisements D, E, and F, which are the highest three auction-ranked product advertisements related to product B, may be displayed. That is, related product advertisements D, E, and F are bid for display in relation to product advertisement B, and are accordingly displayed on the mobile device when product advertisement B is displayed as a primary product advertisement in the product view. It should be understood that as related product advertisements are selected by a shopper, that selected related product information may thereafter be displayed as a new primary product advertisement with other auction-ranked related product advertisements that bid to be adjacent to the primary product advertisement displayed therewith. This product advertisement selection and display process may be repeated for as many products as the shopper desires to view.

Figure 20C:
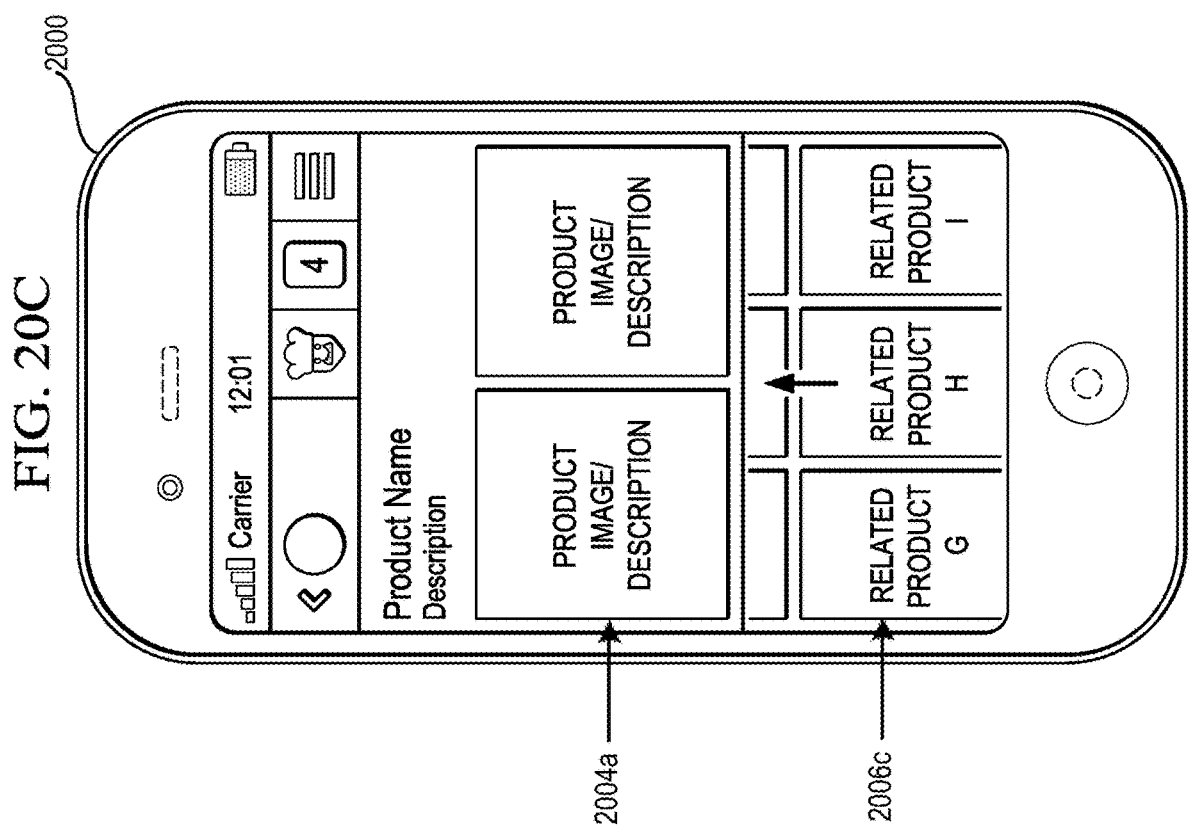
FIG. 20C is the product information of FIG. 20A showing "below-the-fold" related product advertisements.

With regard to FIG. 20C, the primary product information of 2004a FIG. 20A is shown, but additional related product advertisements 2006c, in this case related product advertisements G, H, and I, may be viewed by a shopper by scrolling those listings from being previously out of view or "below the fold" related products. These "below the fold" related product ads may be those of advertisers that bid for their product to be displayed in association with the primary product advertisement 2004a, but were ranked in positions 4, 5, and 6, respectively. By using such a "below the fold" configuration, an unlimited number of ads may be displayed in relation to each primary product advertisement 2004a. This "below the fold" configuration also applies to a list of advertisements, such as FIG. 3C that are bid to be displayed in a list of advertisements. Because the advertisements are displayed "below the fold," or below the viewing area, the cost for such a position may be lower than that paid by the advertisers of the advertisements that are "above the fold." In one embodiment, advertisements that end up "above the fold" may pay a premium for such a position, but that premium may be inclusive within the list view bid submission made by the advertiser. Alternatively, a separate charge for being "above the fold" may be paid by the advertiser. However, in either case, audience delivery statistics for the advertiser being above or below the fold may be generated and reported to an advertiser so that the advertiser may adjust his or her bidding strategy to capture greater levels of audience delivery as it relates to above or below the fold viewing. In one embodiment, views and/or selections of ads may command additional payments by the advertiser, as understood in the art. It should be understood that software module(s) for managing display and selection of ads may be executed by a processor with memory operating the mobile device, as understood in the art.

Figure 21:
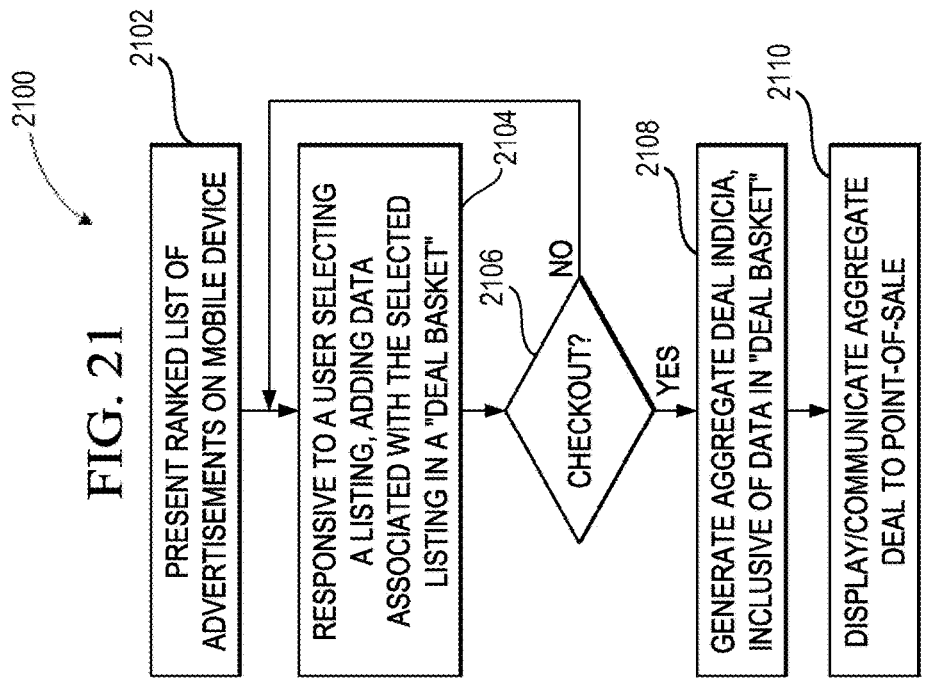
FIG. 21 is a flow diagram of an illustrative process for product deal advertisements to be displayed and used by a shopper in a retail environment.

With regard to FIG. 21, a flow diagram of an illustrative process 2100 for product deal advertisements to be displayed and used by a shopper in a retail environment is shown. The process 2100 may start at step 2102, where an auction-ranked list of advertisements may be presented on a mobile device of the shopper. The auction-ranked list may be generated through an auction process as a function of bids, product deal offers by an advertiser of a product, retailer, ad network, ad agency, distributor, or other party, advertisement performance metrics (e.g., ad interaction ratio), product conversion metrics (e.g., ad view-to-purchase ratio), or other factors, and where the list may be limited to products that are available (e.g., Levi's® Jeans) or usable (e.g., an advertisement by a credit card facility to encourage card usage) in a retail environment. At step 2104, responsive to a shopper selecting a listing in the ranked list, data associated with the selected listing may be automatically stored and added to a "deal basket" or "moneybag" of deals for the shopper to redeem at checkout. Shopper efficiency is greatly improved by accumulating each discount based on shopper selection of a listing as the shopper is not required to perform another action to actively save a deal in addition to selecting a listing to be viewed. At step 2106, a determination may be made as to whether the shopper has checked out. In the event the shopper has not checked out, then the shopper may continue to select product listings from a ranked list or adjacent product listings, in the case of being in a product view, to continue to add deals to his or her "deal basket."

At step 2108, in response to a shopper checking out by either selecting a "checkout" soft-button on the mobile device or performing an action at a point-of-sale, such as engaging or "tapping" a physical tag inclusive of an NFC device that causes the mobile device to initiate and perform a check-out routine, an aggregate deal indicia inclusive of data in the "deal basket" may be generated. The aggregate deal indicia may include an aggregate of some or all deals that the shopper selected during his or her shopping trip at the retailer. The aggregate deal indicia may be displayed and/or communicated to the POS terminal that the shopper is using to checkout product purchases at step 2110. The aggregate deal indicia, if being a QR code, may be scanned by a scanner or camera the POS terminal to identify all of the products that were listed in the QR code receiving deals. Alternatively, a wireless communication may be performed between the point-of-sale and the mobile device to communicate the deals, optionally in an aggregate indicia, to the point-of-sale wirelessly from the mobile device.

Figure 22:
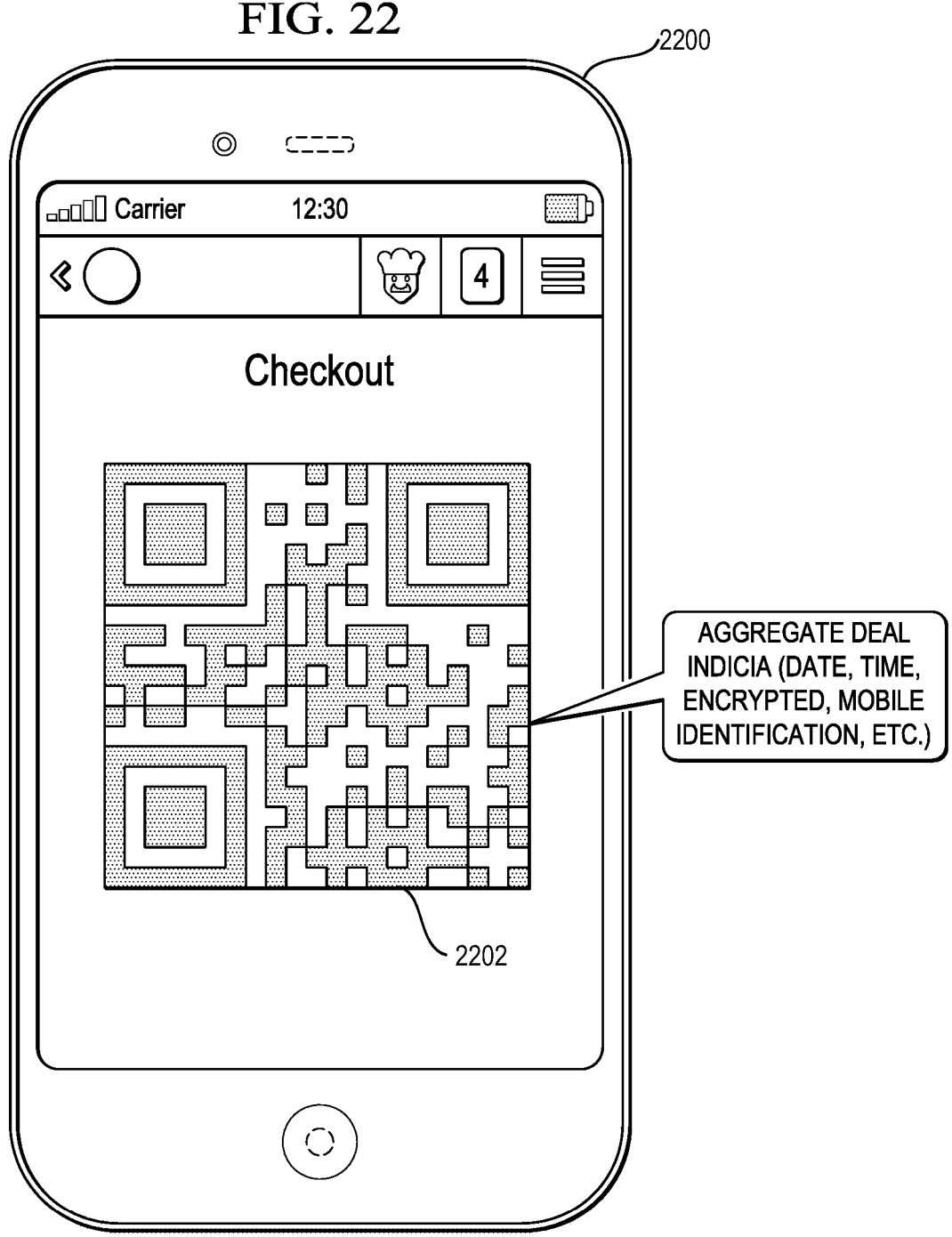
FIG. 22 is an illustration of a mobile device showing an illustrative aggregate deal indicia inclusive of one or more deals collected or selected by the shopper.

With regard to FIG. 22, an illustration of a mobile device 2200 showing an illustrative aggregate deal indicia 2202 inclusive of one or more deals collected or selected by the shopper is shown. In this case, the aggregate deal indicia 2202 is a QR code. It should be understood that alternative indicia may be utilized. The aggregate deal indicia may include a date that the aggregate deal indicia was created, time that the indicia was created, mobile ID of the mobile device, shopper name, loyalty card number, or any other information associated with the shopper and/or location in which the shopper is currently located (e.g., retail store name, store number, geo-position, etc.). In one embodiment, the aggregate deal indicia may be encrypted utilizing encryption techniques, as understood in the art. The indicia 2202 may additionally or alternatively be a coded signal that is communicated to a POS of a retailer or other entity that may apply selected discounts to goods purchased.

Figure 23:
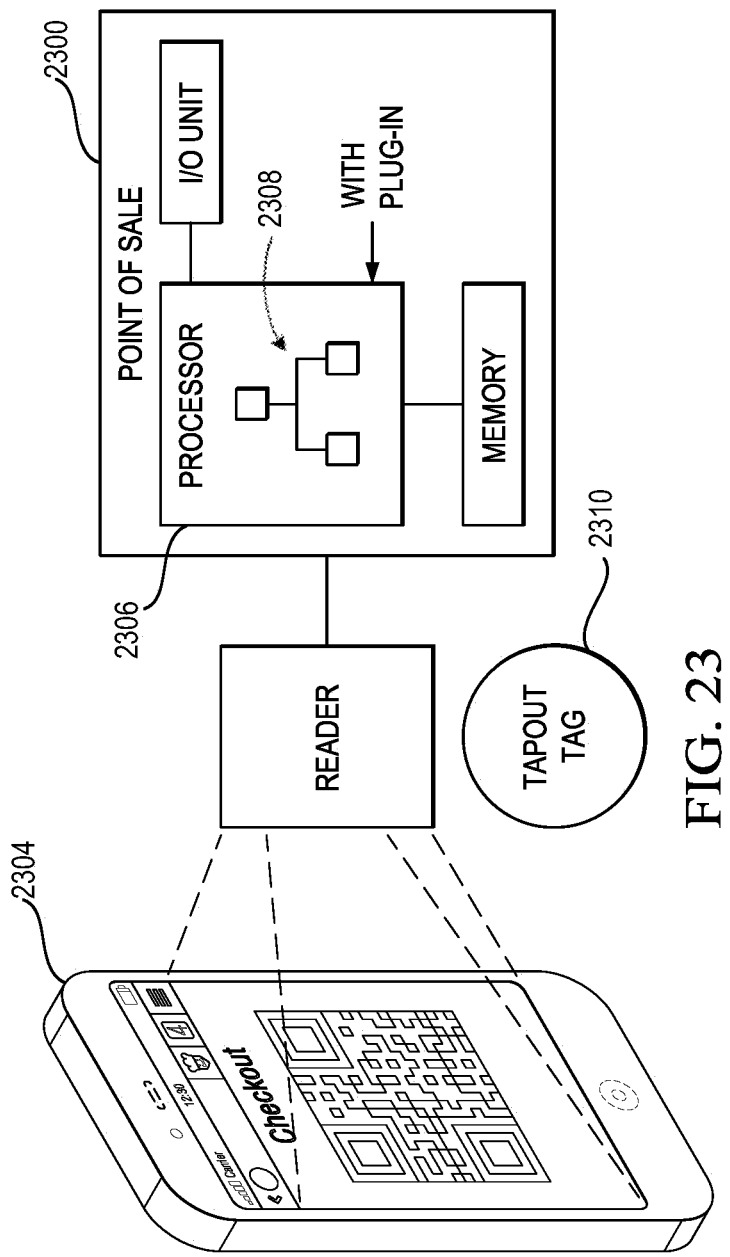
FIG. 23 is an illustration of a point-of-sale configured to read an aggregate deal indicia displayed on a mobile device during a checkout process.

With regard to FIG. 23, an illustration of a point-of-sale 2300 configured to read an aggregate deal indicia 2302 displayed on a mobile device 2304 during a checkout process is shown. The point-of-sale 2300 may include a processing unit 2306 that executes software 2308 that includes a plug-in software module that may be utilized to read, decrypt, parse, verify, etc. the information contained in the aggregate deal indicia 2302. If compression is used to compress the amount of information of the deals that is included in an indicia, then a decompression module may operate at the POS or elsewhere in a communications network in communication with the POS to enable the POS to decompress the information to identify the deals to be applied to the products being purchased. In an alternative embodiment, the POS, may communicate the data read from the aggregate deal indicia 2302 to a server (not shown) that may perform the functionality of the plug-in, and receive information of the deals for processing thereat. As further shown, a "tap-out" tag 2310 may be "tapped" by the shopper to cause the mobile device 2304 to automatically generate the aggregate deal indicia 2302, as displayed thereon, for reading by the POS 2300. Such a "tap-out" tag 2310 may eliminate the need for the shopper to interact with the user interface to request the aggregate deal indicia 2310 to be displayed or wireless communication to the POS 2306.

Depending on the number of deals and/or conventional coupons selected by a shopper, more than one aggregate deal indicia may be generated and displayed as indicia has a finite amount of information that may be stored in an indicia. As such, multiple aggregate indicia may be displayed on a single display or multiple displays, where the multiple indicia may be displayed in successive order, either manually or automatically controlled, so that a reader may read each of the indicia in successive order. If multiple indicia is displayed on the same display, then the user or cashier may simply image each of the indicia.

Figure 24:
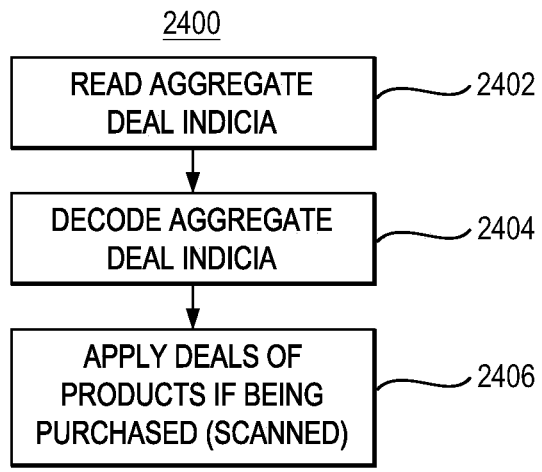
FIG. 24 is a flow diagram of an illustrative process for a point-of-sale system to read and process an aggregated indicia of product deals.

With regard to FIG. 24, a flow diagram of an illustrative process 2400 for a point-of-sale system to read and process an aggregate deal indicia of product discounts is shown. The process 2400 may start at step 2402 by the aggregate deal indicia being read. The aggregate deal indicia may be decoded at step 2404, where decoding may include decrypting, parsing, or performing any other technique to read the individual deals that the shopper has collected and is requesting. The deals of products, if being purchased (e.g., scanned using an optical barcode scanner or similar reading technology), may be applied at step 2406. As previously described, the deals are not applied if the shopper does not purchase the products or does not purchase sufficient products or such combination of products required by the deal offers.

Figure 25:
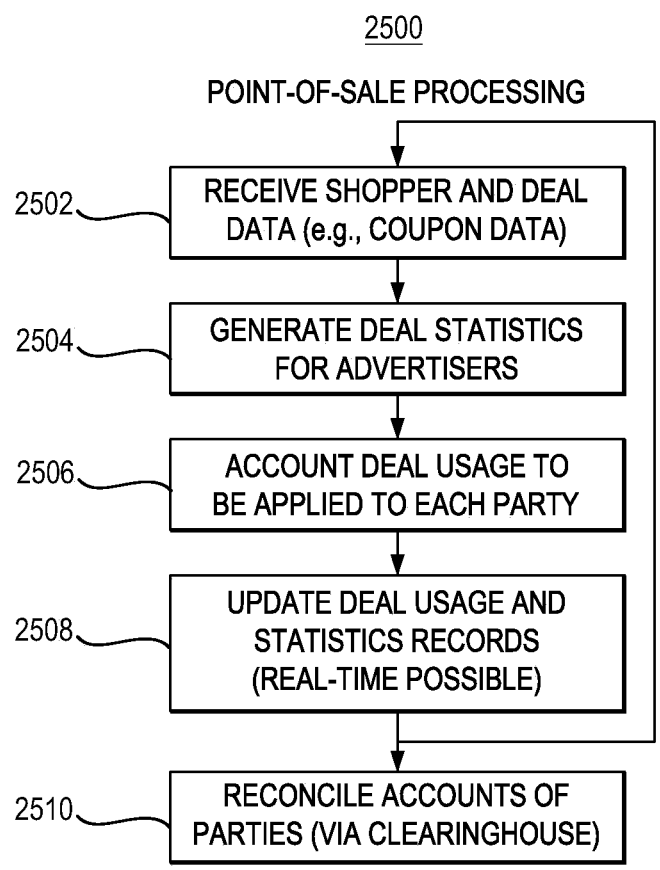
FIG. 25 is a flow diagram of an illustrative process for a point-of-sale to process deals.

With regard to FIG. 25, a flow diagram of an illustrative process 2500 for a point-of-sale to process deals is shown. The process 2500 may start at step 2502 by a shopper and deal data (e.g., dynamic coupon data) being received by the POS. Deal statistics for advertisers may be generated at step 2504 by a computing system. The deal statistics may be inclusive of deals or ads that the shopper has selected or viewed based on advertisements via his or her mobile device. The statistics may include deals selected and deals viewed, deals applied, deals selected or viewed but not purchased, deals for each advertiser, related deals selected, primary deals selected, below the fold deals selected, and so forth. The statistics may be valuable both for products that are purchased using a certain deal and for products that are not purchased in response to a certain deal offer. For example, a product that is being given away that is not "purchased" by shoppers tells a big story to the marketer. Deal usage to be applied to each party may be accounted at step 2506. The parties may include advertisers, manufacturers, retailers, ad distribution network, or otherwise. Deal usage and statistics records may be updated at step 2508. The update may be performed on a real-time basis. That is, as deals are being used, the advertisers, agencies, manufacturers, retailers, distributors, ad distribution network, etc. may be able to access an updated, possibly real-time, usage of the deals. After the deals have been accounted for, accounts of the parties may be reconciled by the computing system at step 2510. In one embodiment, virtual financial transactions may be performed to show parties updated or estimated balances for participating on the ad distribution platform. The accounts are ultimately bank accounts or other financial account inclusive of actual money that may, in one embodiment, be performed by a clearinghouse that performs coupon clearing, as understood in the art. The reconciliation of the accounts may be performed on a periodic or aperiodic basis, such as weekly or in response to an amount crossing a threshold (e.g., $10,000).

Figure 26:
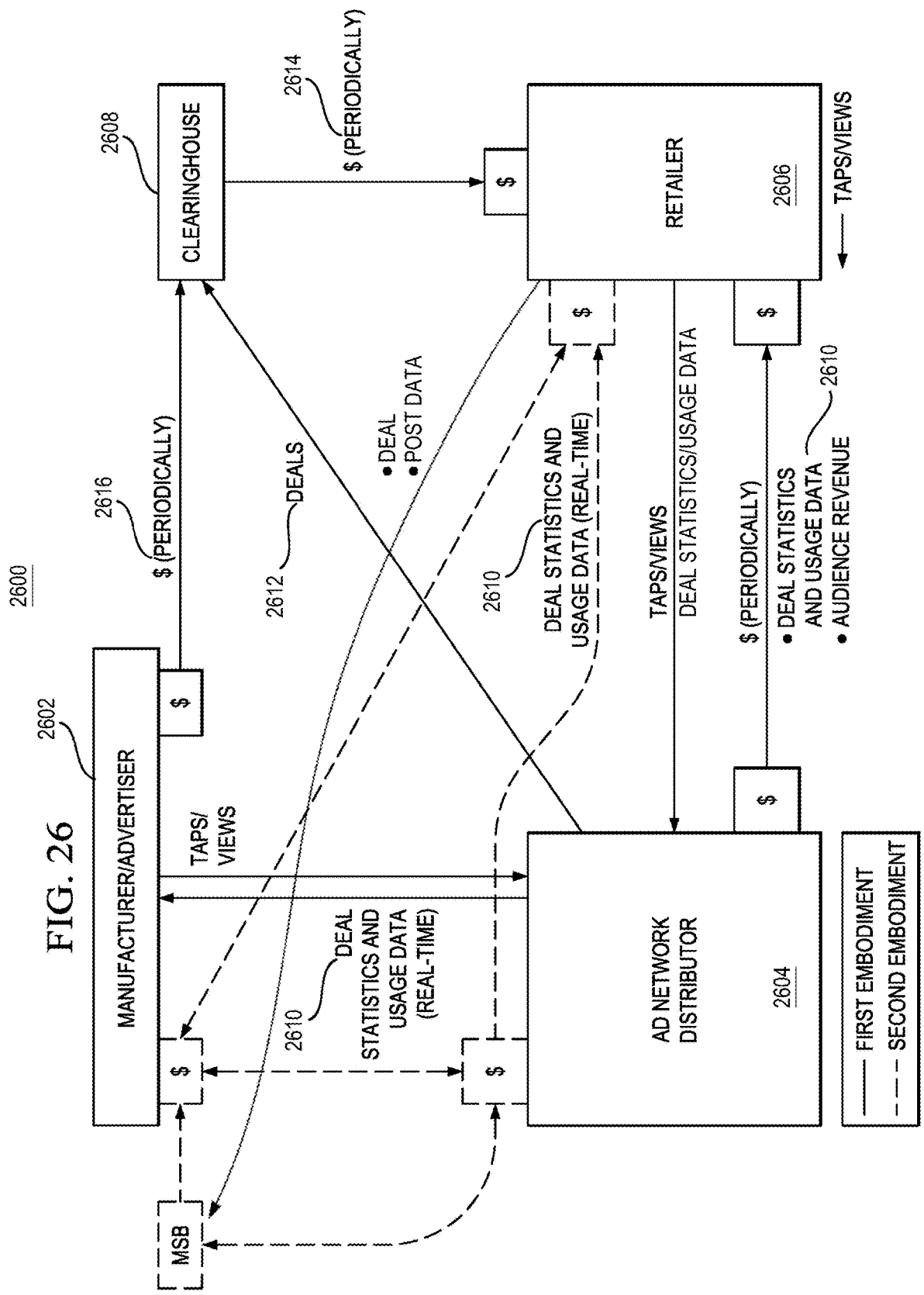
FIG. 26 is an illustration of a network environment in which financial remuneration for each of the parties involved in the product deals being distributed to shoppers in a retail environment, two alternative embodiments are shown.

With regard to FIG. 26, an illustration of a network environment 2600 in which financial remuneration for each of the parties involved in the product deals being distributed to shoppers in a retail environment is shown. Two embodiments are shown, a first embodiment in solid lines with text, and a second embodiment in dashed lines without text. The network environment 2600 may include a manufacturer/advertiser 2602, ad network distributor 2604, retailer 2606, and clearinghouse 2608. Because manufacturers and retailers may not communicate directly with one another (distributors are often in the middle), the ad network distributor 2604 may monitor and collect discount/coupon usage information 2610 and use that information to report to the retailer 2606 and manufacturer 2602. In addition, and with regard to the first embodiment (solid lines with text), the ad network distributor 2604 may notify a clearinghouse 2608 of deals (e.g., coupons) 2612 of the manufacturer that have been used so that the clearinghouse 2608 can reconcile the money 2614 to be paid or debited to the retailer 2606, money 2616 collected from the manufacturer 2602, and possibly money (not shown) from the ad distribution network provider 2602 or any other deal participant. Such a capability of distributing deal statistics and usage information on a real-time or non-real-time (e.g., up-to-date by hours, days, week) basis is available as a result of the ad network distributor 2604 being able to collect the deal selection and deal usage information from the point-of-sale of the retailer 2606 and, optionally, mobile devices of shoppers. In the second embodiment, the ad network distributor 2604 may provide the functions typically performed by the clearinghouse 2608 to all parties on the system and use a money service business, such as PayPal®, for conducting the financial transactions (i.e., collection from and payment to the various parties) on a real-time, semi-real-time, periodic, or aperiodic basis.

Moreover, the ad network distribution 2604 may provide or utilize a third-party electronic funds transfer system to debit and credit accounts of advertisers 2602, retailers 2606, the ad network distributor 2604, and any other party that participates in the auction-ranked product advertisement auction and distribution system, as provided herein. In one embodiment, rather than transferring actual money, virtual money may be transferred during a certain time period, such as a day, week, month, and then an actual transfer of money may be moved by the ad network distributor 2604 or clearinghouse 2608. The virtual money may be accounted for and posted for view or communicated to one or more of the parties in real-time, substantially real-time, periodically, non-periodically (e.g., event driven, such as in response to a coupon being used or a certain amount of money being reached), or otherwise. The accounting may account for a variety of different events, including, for example, (i) deal usage (e.g., manufacturer coupon usage), which is accounted for by a retailer submitting the coupons to the manufacturer for reimbursement, (ii) "tap-ins" at a manufacturer's product tag, which is accounted for by a manufacturer paying the ad network distributor 2604 that may share the tap revenue with the retailer 2606, and (iii) display and selection of product advertisements either on a main page or product view, which may be accounted for by a manufacturer 2602 paying the ad network distributor 2604 that may share the display and selection revenue with the retailer 2606. Other revenue opportunities and accounting may be provided in accordance with the principles of the present invention.

Figure 27:
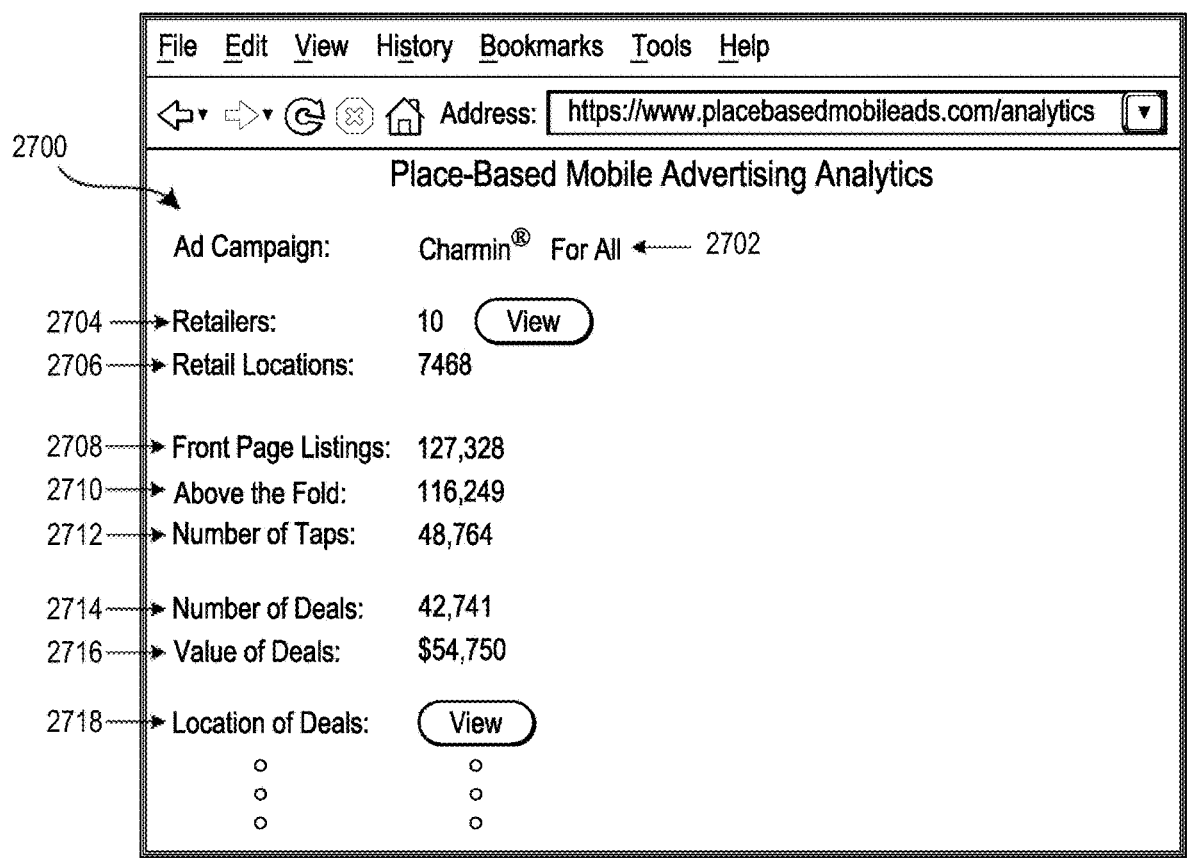
FIG. 27 is a screenshot of an illustrative place-based mobile advertising analytics information page.

With regard to FIG. 27, a screenshot of an illustrative place-based mobile advertising analytics information 2700 page is shown. The analytics may provide for an ad campaign of a particular product 2702, showing number of retailers 2704 in which the ad campaign is being run, and list a number of retail locations 2706 that the ads are being run. The analytics may further include showing the audience delivery associated with the a number of front page listings 2708 that the ad is displayed, a number of "above the fold" listings 2710 that the ad is displayed, and a number of taps or selections 2712 that shoppers make of the advertisement once displayed and a total transfer value (not shown), inclusive of costs associated with clearance house functions, associated with such tallies. Furthermore, a total number of deals 2714 that are being used and a total value of the deals 2716 that are being given in association with the number of deals being used. Other information, such as locations of deals 2718, may also be shown.

Figure 31:
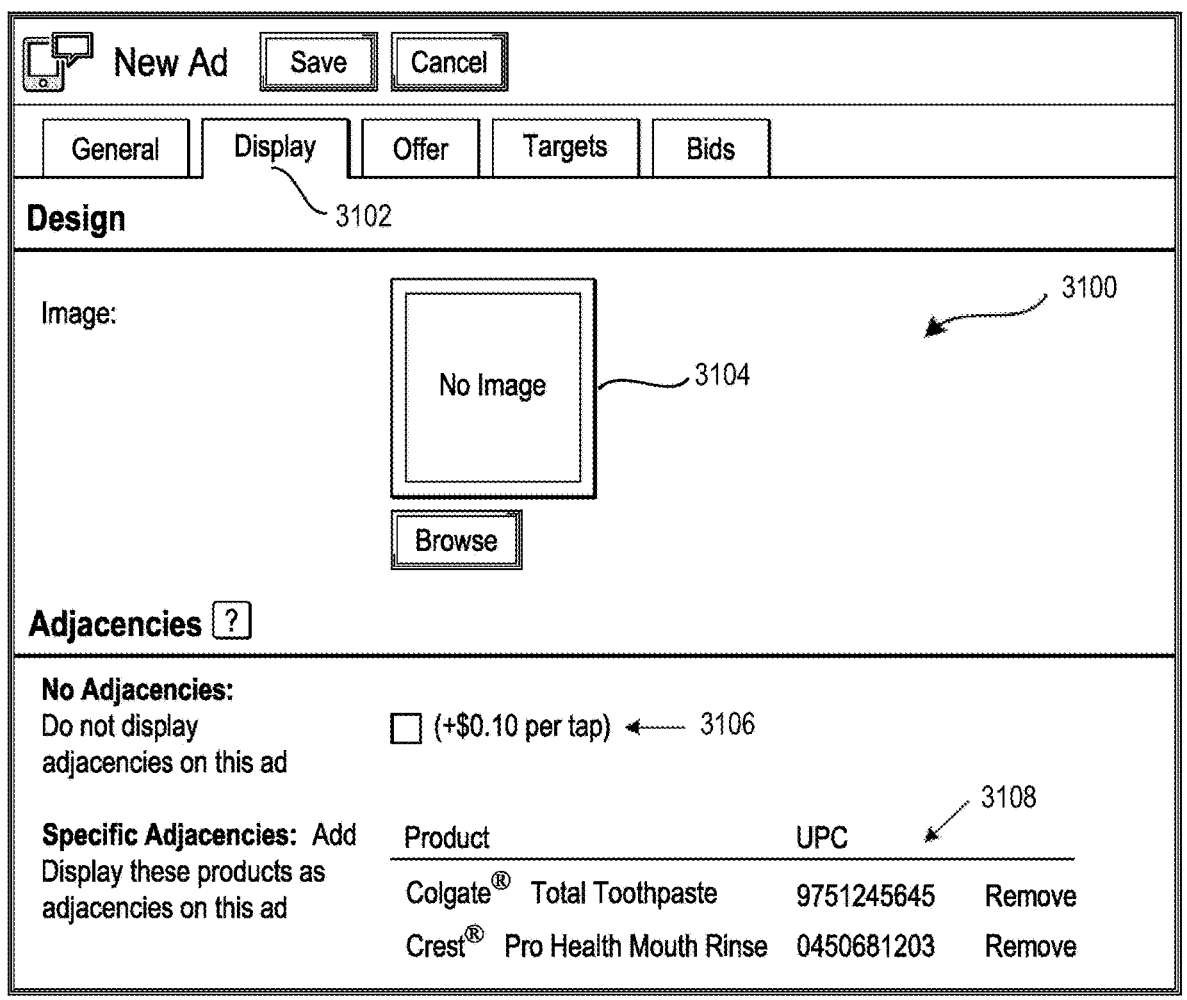
Figure 32:
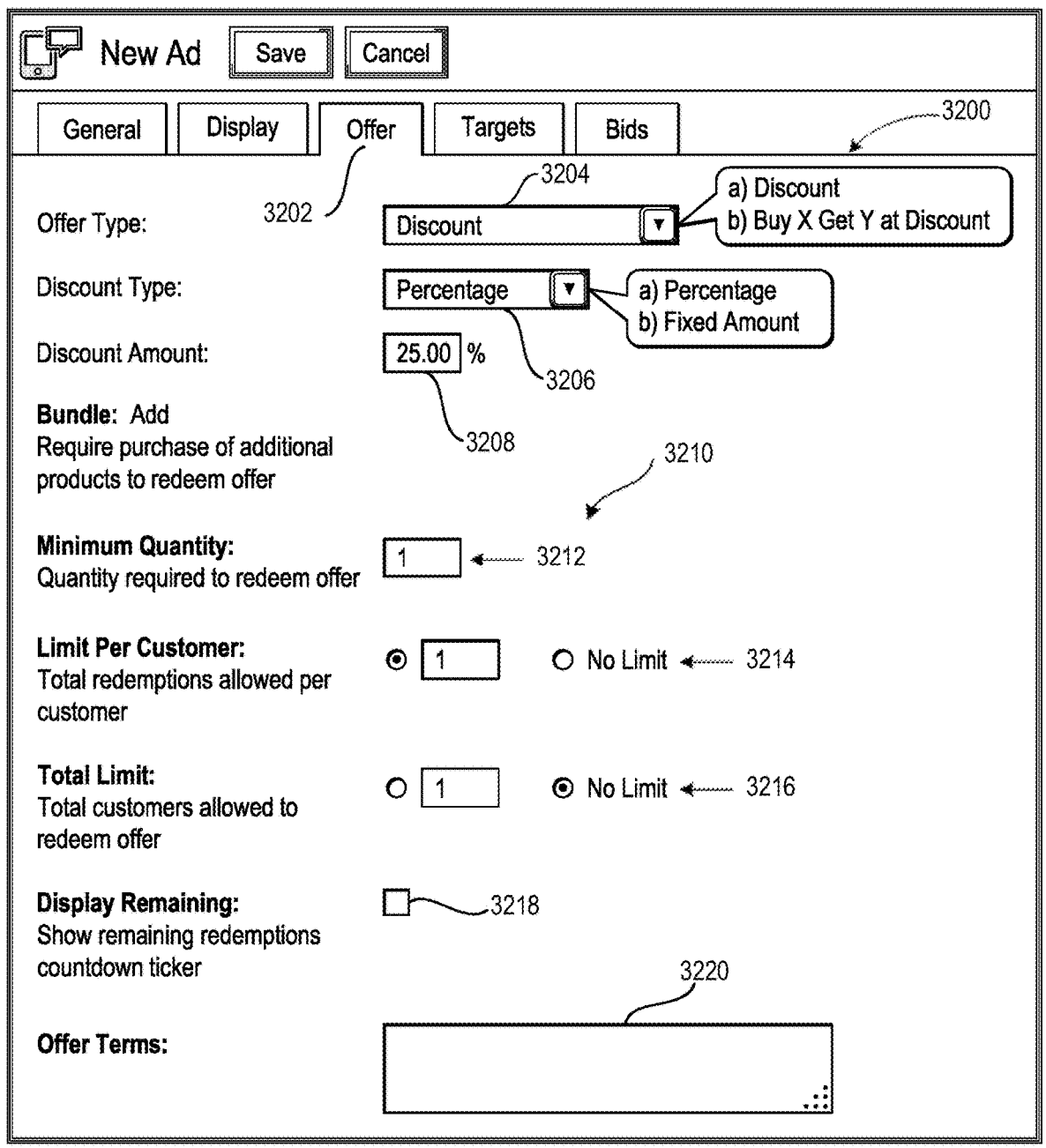
Figure 33:
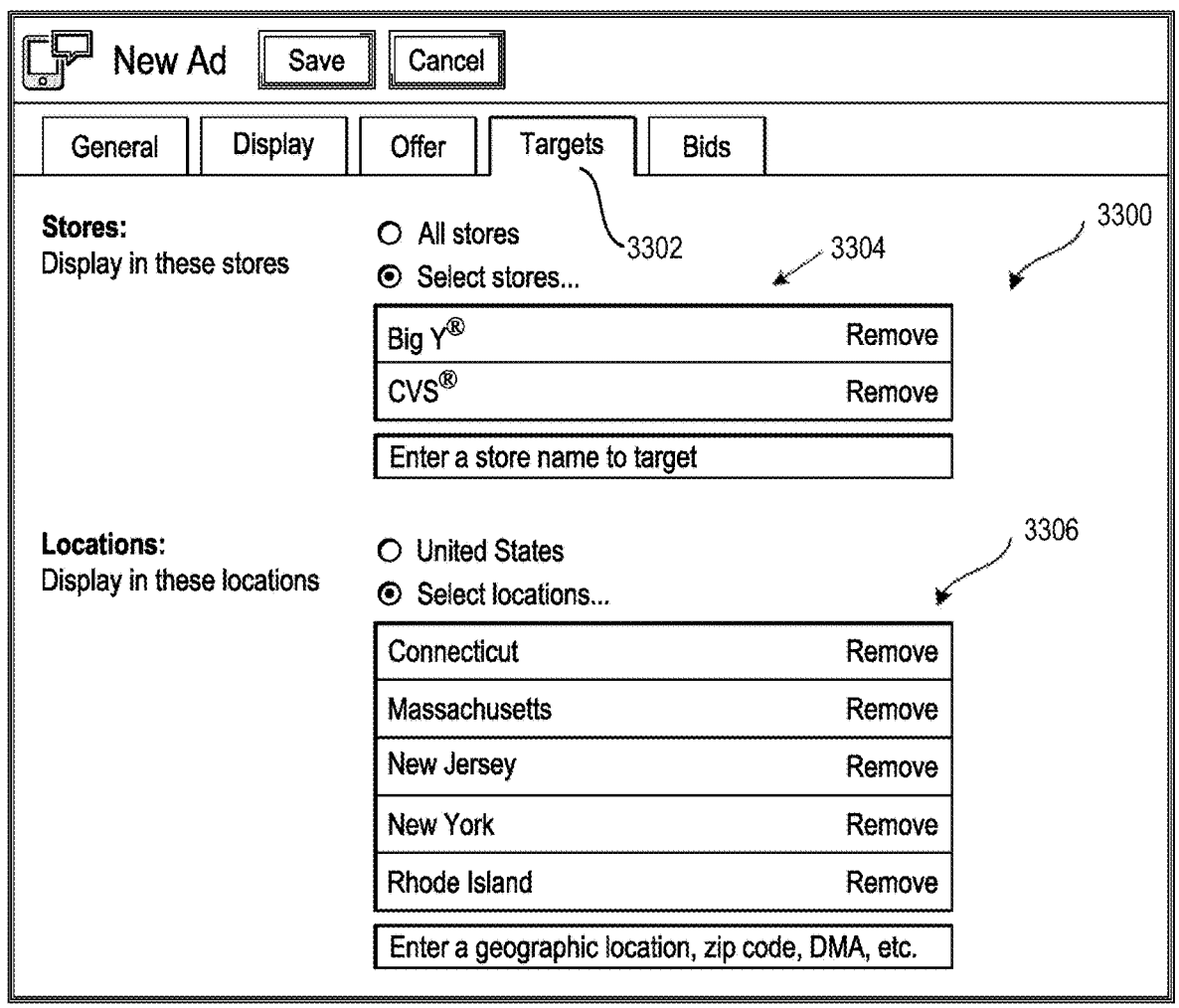
Figure 34:
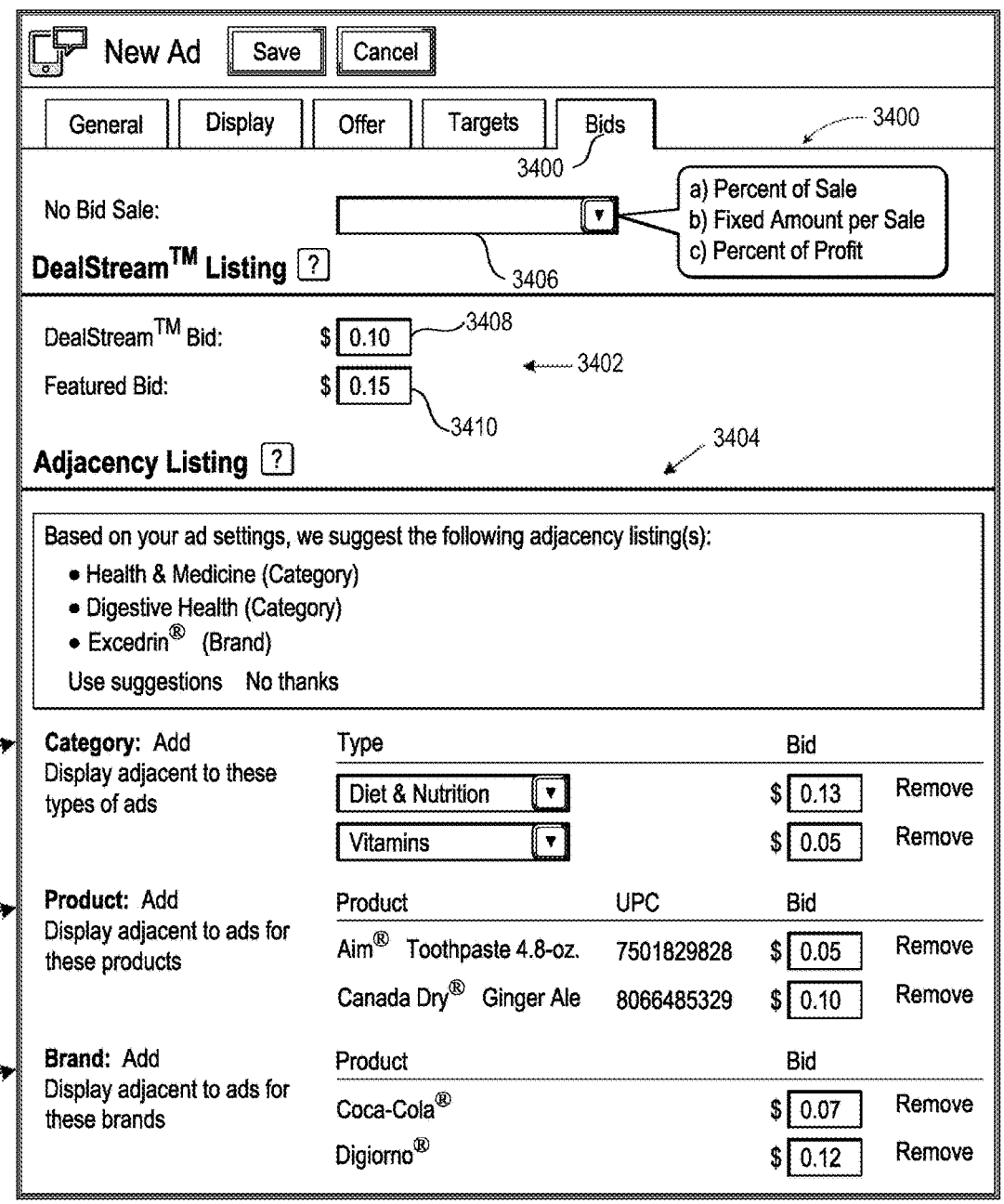

With regard to FIGS. 28-34, screenshots of illustrative user interface pages 2800-3400 are shown that enable advertisers to initiate new ad campaigns (FIG. 28), search for products that are available through the system to limit the amount of time needed to initiate an ad campaign (FIG. 29), upload data of a product (FIG. 30), submit and design ad content (FIG. 31), submit product deal offers and bids for (i) list views, (ii) product ad views, and (iii) ad adjacency views (FIGS. 32 and 34 (includes no bid deals)), submit targets of locations (e.g., retail locations or areas of advertisement distribution) (FIG. 33), and so forth, are shown. Through use of this user interface, an advertiser looking to place their promotion advertisement in physical retail environments through use of the multi-player aggregate auction platform as provided herein may be performed.

Figure 28:

As shown in FIG. 28, a user may create a new ad campaign, where a campaign name 2802, notes 2804, and status 2806 (e.g., enabled or disabled) may be entered. In addition, a budget section 2808 may enable a user to establish a default bid or budget on a per-day or other time period may be submitted. The default bid may be used by the auction system in the event that the user simply wants to use a default or automatic submission of new ads of the campaign into the auction system. In addition, a default deal, such as a percentage, fixed amount, or other parameter, may be utilized. The deal may be in the form of a coupon, discount, promotional offer, or otherwise. It should be understood that other bid and deal submission parameters and user interface elements may be utilized in enabling the advertiser to provide for budgeted bid and deal submissions (e.g., combinational deals, brand deals, etc.). A schedule section 2810 may enable a user to establish a start and end-date for the ad campaign.

Figure 29:
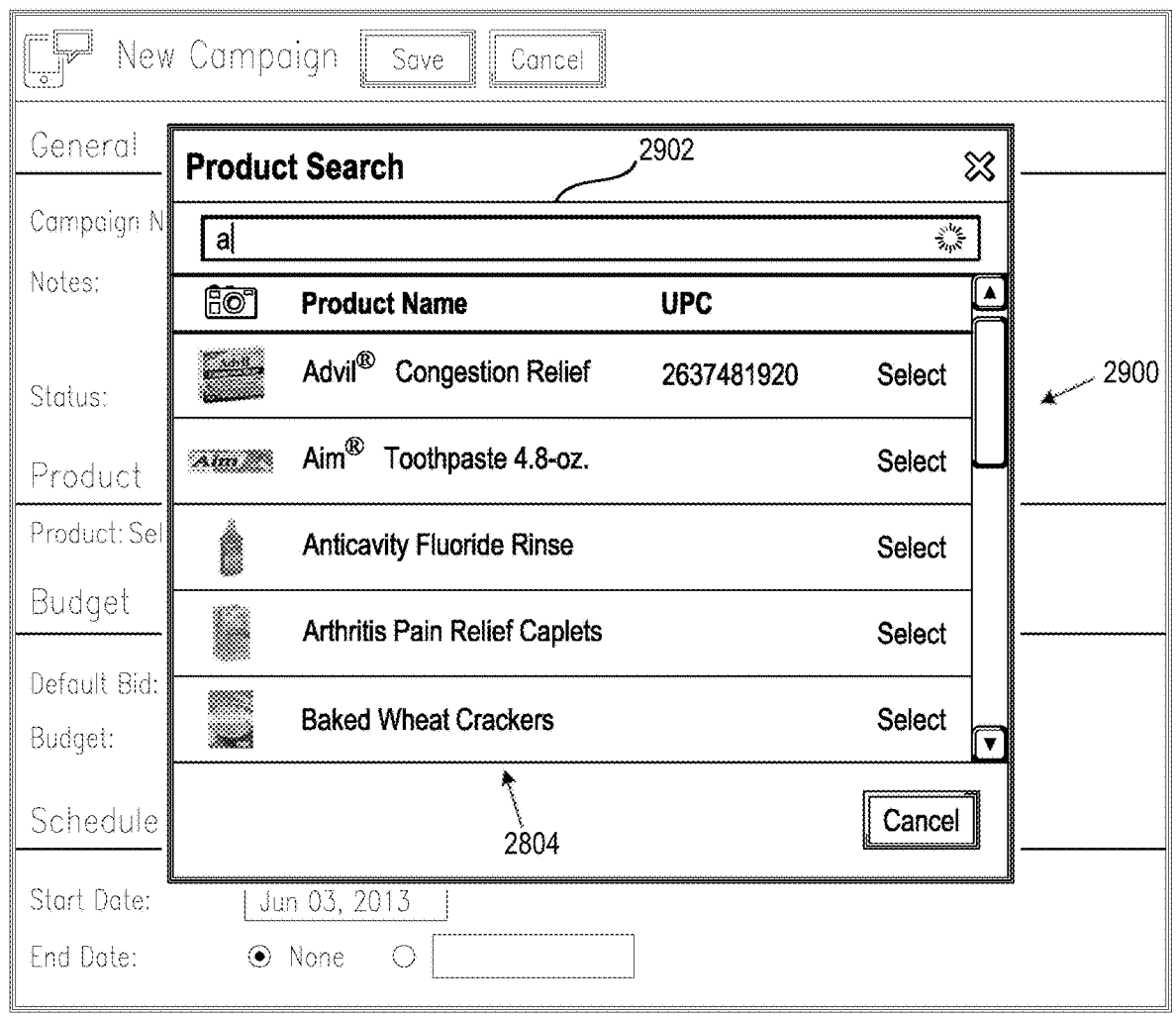

With regard to FIG. 29, a screenshot of an illustrative user interface 2900 that enables a user to enter a search string into a text entry field 2902 to search for a product is shown. A list 2804 of products available for selection for an advertiser may be displayed to assist the advertiser in completing an advertisement submission.

With regard to FIG. 30, a screen shot of a user interface 3000 that enables the user to select a campaign 3002 in which an advertisement is to be included is shown. The user may select a product 3004, ad name 3006, and ad type 3008. The ad type 3008 may be an ad that is to be listed in auction-ranked ads with deals that are being offered in a retail environment. The auction-ranked ad list may be presented to a shopper in response to the shopper "tapping into" a physical tag at an entryway of a retail environment, department in the retail environment, aisle in the retail environment, on a mobile app, or any other generalized category that provides an auction-ranked list of deals of products associated with the physical tag at a known location in the known retail environment. The auction-ranked ad list may also be available on the Internet, ecommerce, or other publisher sites. "DealStream" is a brand name of such an auction-ranked ad listing. An alternative auction-ranked ad listing may include a product view that is delivered to a shopper in response to "tapping into" a physical tag (or otherwise) associated with a particular product or in response to a shopper selecting an ad displayed in the auction-ranked ad listing. A user may submit a headline 3010 of an advertisement and copy or description 3012 that may be included in the advertisement. A "new product intro" selection element 3014 may be used to indicate that the product is a new product so that the product may be listed in a "New Product" category on the ad distribution network content section that is delivered to a mobile device of a shopper. A status 3016 of the ad may be enabled or disabled, thereby allowing for an ad to be easily turned on and off.

In one embodiment, the advertiser of the primary ad may establish rules that limit the adjacency ads that may be positioned in association with the primary advertisement.

The rules may include approved (or restricted) product types, product brands, product prices, or any other approvals or restrictions, as may be offered by the ad network distribution provider. For example, it is highly likely that major brands will restrict directly competing brands from being displayed in adjacency ads with one another. Consider, for example, Coca-Cola® and Pepsi®, Prada® and Coach®, or expensive and inexpensive brands. Other examples of brands and brand types are certainly conceivable, and such acceptance and restriction tools may be established in the user interface 3000 or a separate user interface for use by the advertiser or its agent.

With regard to FIG. 31, a screen shot of an illustrative user interface 3100 associated with a "Display" tab 3102 that provides for an advertiser to upload an image to be displayed in an image field 3104 into the ad distribution system and to select whether or not to allow adjacency advertisements with a product view advertisement is shown. If the user elects to not allow adjacency ads, then the user may pay an additive fee 3106 on a per-view or per-tap basis. In one embodiment, the user (advertiser or promoter) may select particular product advertisements 3108 as adjacency ads with the advertisement being submitted, which will be a primary advertisement on the product page. In an alternative embodiment, the user may select a company, group of companies, category of products, or otherwise as being allowable adjacency ads for the advertisement being submitted. Still yet, the system may enable a user to restrict categories or particular brands or companies, such as a competitor brand (e.g., Coca-Cola® restricting Pepsi® brand products as adjacency ads), from being adjacency ads.

With regard to FIG. 32, a screen shot of an illustrative user interface 3200 associated with an "Offer" tab 3202 that provides for a user to submit an offer for placing a bid and deal into the auction system is shown. An offer type 3204 may allow for the user to select a discount, which may be a coupon or other discount depending on the user (e.g., manufacturer may provide a coupon that complies with coupon laws), "buy X get Y at discount" offer, or any other offer or promotion (e.g., "buy X, receive sweepstakes entry", "buy X, get Y free"). A discount type 3206 may allow for a user to select whether the discount is to be a percentage (e.g., 25% discount) or fixed amount (e.g., $5 discount) and enter the discount 3208. In addition, the advertiser may be provided with a bundle option 3210 that allows for a shopper to purchase a certain number of multiple products, certain number of disparate products in a single purchase, or other bundle prior to receiving the deal being offered. In one embodiment, a minimum quantity 3212 may be submitted for a shopper to purchase prior to receiving the discount. In one embodiment, a particular limit per customer 3214 may be entered to limit the number of deals a shopper can receive for purchasing a particular product 3216. Still yet, a total number of customers who may receive the deal may be submitted (not shown). Alternatively, a certain total spend may be submitted, where the total spend may be limited within a single retail environment, across multiple retail environments within a common retailer (e.g., Grocery Chain Store A), or across multiple retail environments within disparate retailers (e.g., Grocery Chain A, Pharmacy Chain A). Other limitations may additionally and/or alternatively be provided for a user to limit the ad to be distributed and/or deal to be given (e.g., time limit, date limit, number of deals, etc.). In one embodiment, a "display remaining" number of redemptions may be presented to shoppers in response to a user selecting a selection element 3218, where the number of redemptions may be performed based on a limit of deals to be given on a product (e.g., 25 deals for a product). An offer terms text entry field 3220 may enable a user to submit particular offer terms for the deal on the product. It should be understood that in addition to the various offer parameters provided for in the user interface 3200 that programmatic advertising parameters may also be made available to an advertiser, where such programmatic advertising may include a certain audience size desired in total or in certain designated market areas "DMAs" and, optionally, with certain demographics or historical purchase patterns with respect to a particular product.

With regard to FIG. 33, a screen shot of an illustrative user interface 3300 associated with a "Targets" tab 3302 that enables a user to select particular retail environments (e.g., retail chain stores) 3306 and locations (e.g., country, state, city, town, address, zip code, etc.) is shown. In addition to the different retail environments and locations, the specific micro-locations (not shown) within the retail environments at which physical tags are to be positioned and with which the advertisement is to be associated may be selected. For example, if a physical tag is to be positioned (e.g., department within a retailer).

With regard to FIG. 34, a screen shot of an illustrative user interface 3400 associated with a "Bids" tab that enables an advertiser to submit bids, including both deal listing 3402 and adjacency listings 3404 is shown. In this bid submission page 3400, a "No Bid Sale" option 3406 may allow for an advertiser to not pay for a bid on a CPM or other performance basis, but rather bid on a (1) percentage of sale, (2) fixed amount per sale of the product, or (3) percent of profit of the product. That is, by selecting the "No Bid Sale" option, the advertiser/marketer is willing to share revenue in one form or another with the ad distribution network provider. Such a sharing arrangement may incentivize the ad distribution network provider to assist with promotion or financial participation through the ad distribution system. Alternatively, the advertiser may desire to offer the product for list and adjacency ranking based solely on the deal rating without paying the ad distribution network an audience delivery fee.

The advertiser may submit bids for two different advertising models, the auction-ranked listing model and adjacency listing model, as previously described (see, for example, FIGS. 3B and 4A). As shown, the user may submit a bid 3408 and/or featured bid 3410 amount for the auction-ranked list model (e.g., $0.10 for a bid and $0.15 for a featured bid (e.g., "sticky ad")), where the bid amount may be an amount that the advertiser is willing to pay on a per-impression basis (i.e., each time an ad is presented in the ranked list or other format). In one embodiment, the system may provide for an "above-the-fold" bid and for a "below-the-fold" bid (not shown). In the adjacency listing 3404, the user may select a category 3412, product brand, or otherwise (e.g., manufacturer) and include a bid for each of those different category types, product types 3414, brand types 3416, etc. Although shown as being limited to two types, more than two types may be available for each of the different categories, products, brands, etc.

Figure 42A:
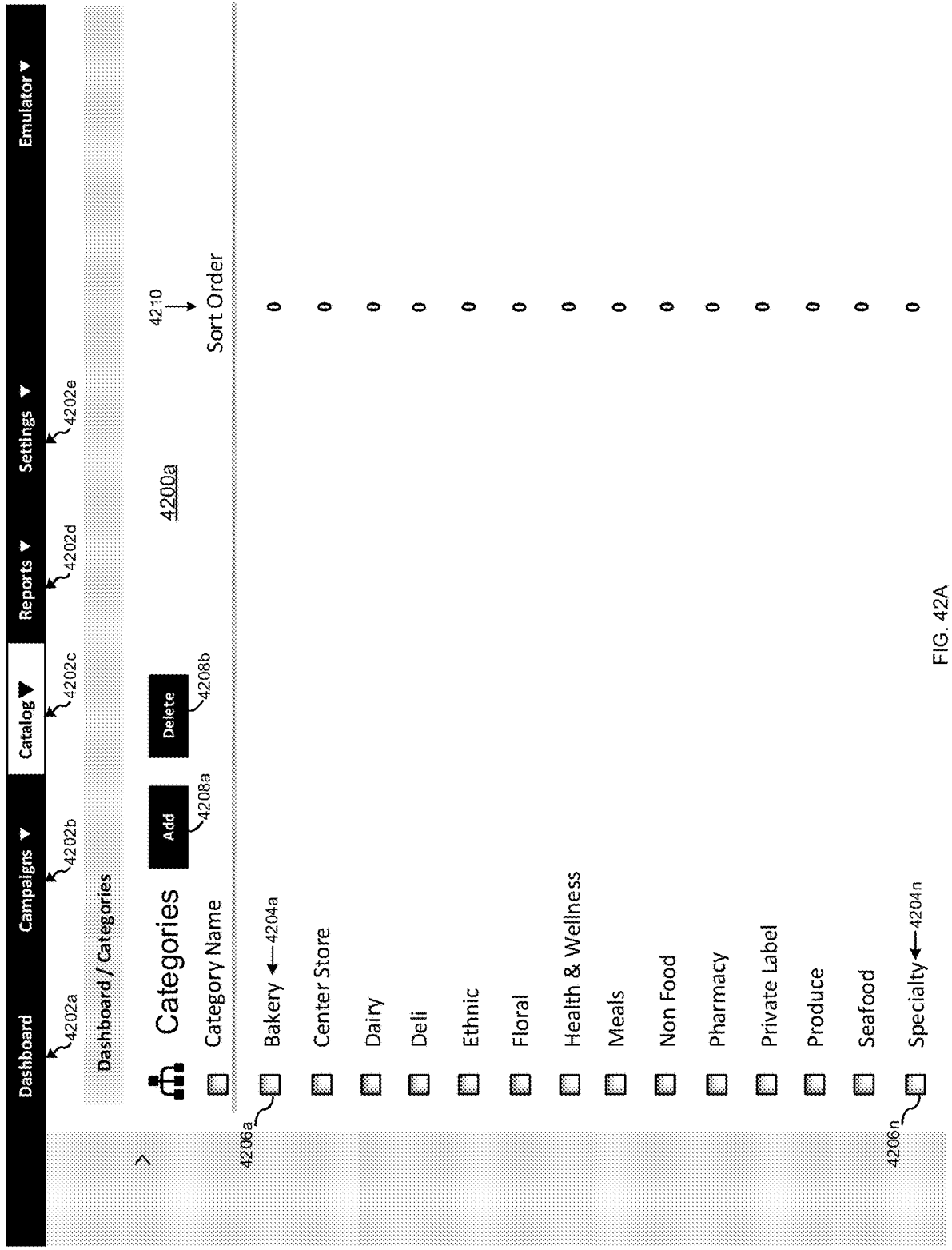
FIG. 42A is a screenshot of an illustrative user interface that may be utilized by a retailer for configuring user interfaces along with content to be displayed thereon of shopper mobile devices (or computers if operating via a conventional website)

With regard to FIG. 42A, a screenshot of an illustrative user interface 4200a that may be utilized by a retailer for configuring user interfaces along with content to be displayed thereon of shopper mobile devices (or computers if operating via a conventional website) is shown. The user interface 4200a is shown to include tabs 4202a-4202n (collectively 4202). Additionally, a set of category names 4204a-4020n (collectively 4204) is shown. The categories may be an extensive list of potential categories within a type of retail outlet, such as a grocery store. As shown, the categories 4204 may include "Bakery," "Center Store," "Dairy," "Deli," "Ethnic," and so forth. It should be understood that if the retail environment were a clothing store, then the categories would be those of clothing stores. Associated with each of the category names 4204, selection elements 4206a-4206n (collectively 4206) may be available for a user on the retail outlet to select. In addition to configuring categories available for a user of a mobile device within the retail outlet to select to view product ads within the retail store arranging the respective categories, marketers of the products (or the retailer or the ad distribution network) may associate products with the respective categories. The user interface 4200a may also include an "add" soft-button 4208a and "delete" soft-button 4208b for adding and deleting categories, respectively. The list of categories 4204 may be in alphabetical order or rearranged in any other order, where the rearrangements may improve the user experience of shoppers and enable the retailer to establish an order of categories that is more profitable, more efficient, or provide any other improved experience or efficiency for the shopper and/or retailer and/or third parties.

Figure 42B:
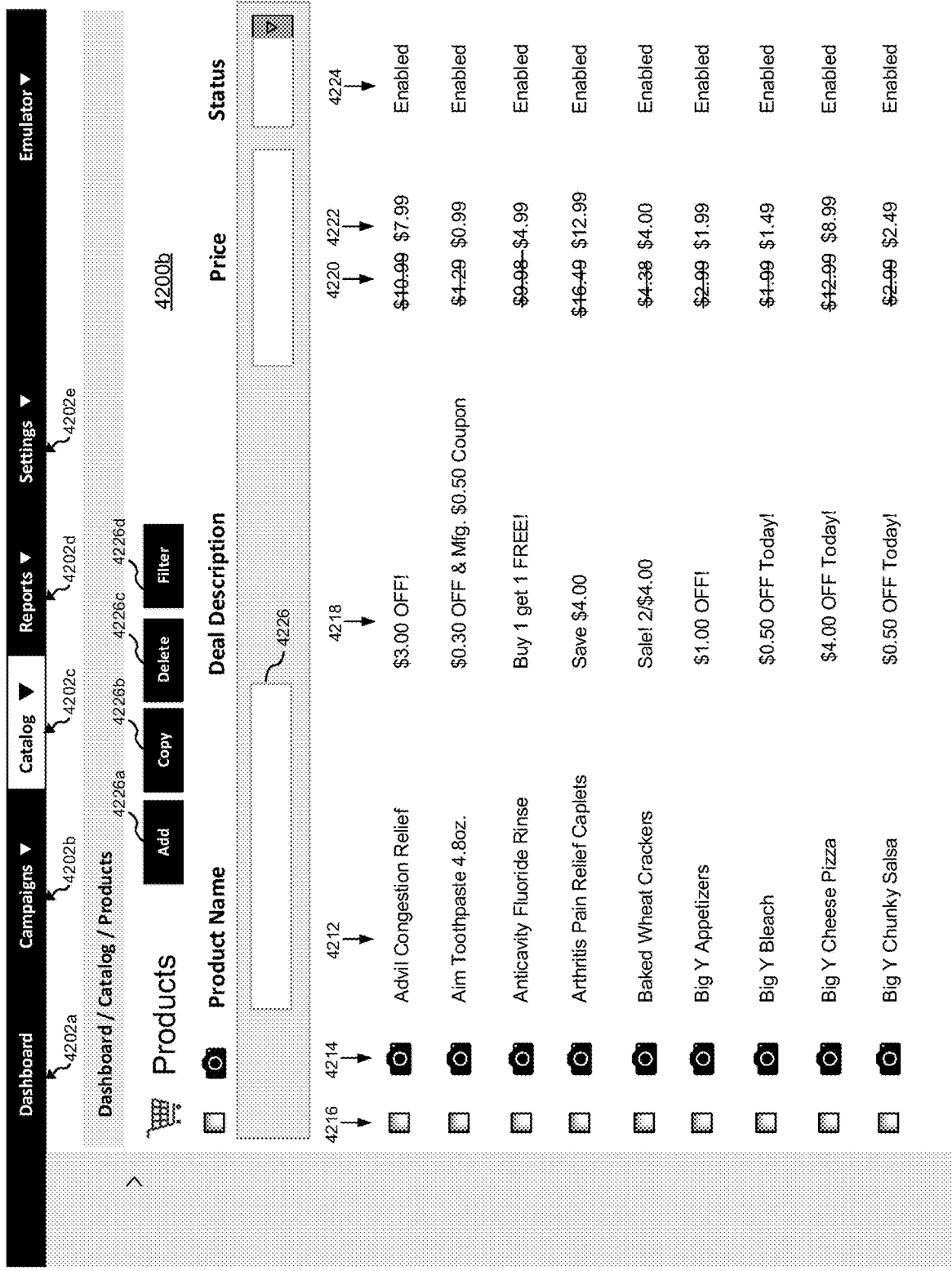
FIG. 42B is a screenshot that includes a list of products that are available or potentially available in the retail store.

With regard to FIG. 42B, a screenshot of a user interface 4200b that includes a list of products that are available or potentially available in the retail store is shown. In one embodiment, the ad distribution network provider may auto-populate the products listing by reading in a spreadsheet or any other document (electronic, paper, or otherwise), and create a list of products available for use by the retailer. As shown, a list of product names 4212 may be alphabetical and have product images 4214 associated with the respective product names and product descriptions 4212. In one embodiment, the product images 4214 may be read or imported from a data repository that stores product images that is commercially or non-commercially available. A set of selectable data elements 4216 may be available for a retailer to select so as to define which products are available to be purchased within the retailer. The retailer may auto-populate its products inventory by reading in a spreadsheet or any other document (electronic, paper, or otherwise), and create a list of products and images available for use by the retailer.

Associated with each of the product names 4212 may be deal descriptions 4218 that show current deals being offered by the retailer. The deal descriptions 4218 are illustrative, and it should be understood that the deal descriptions may include variables that are established once a deal auction selects the winning bids. Alternatively, the deals may be preset by the retailer for use as default ads for inclusion in lists and/or product views as adjacency ads in the event that not enough ads are available or if the retailer is provided with ad spot(s). Retail and discount prices 4220 and 4222 may also be shown (assuming these prices are not being dynamically generated for submission in a real-time auction. A status of each of the ads may have a parameter 4224 that may be set to enabled or disabled to activate or deactivate the associated ads. In an alternative embodiment, the ads may be configured to be dynamically bid, and rather than having a specific discount (or other deal) value, a range, such as $0.50-$2.00, may be established, thereby allowing for the ad to be submitted into an RTB auction. A number of control user elements, including "Add," "Copy," "Delete," and "Filter" soft-buttons 4226a-4226d may be used to add, copy, delete, and filter products.

Figure 42C:
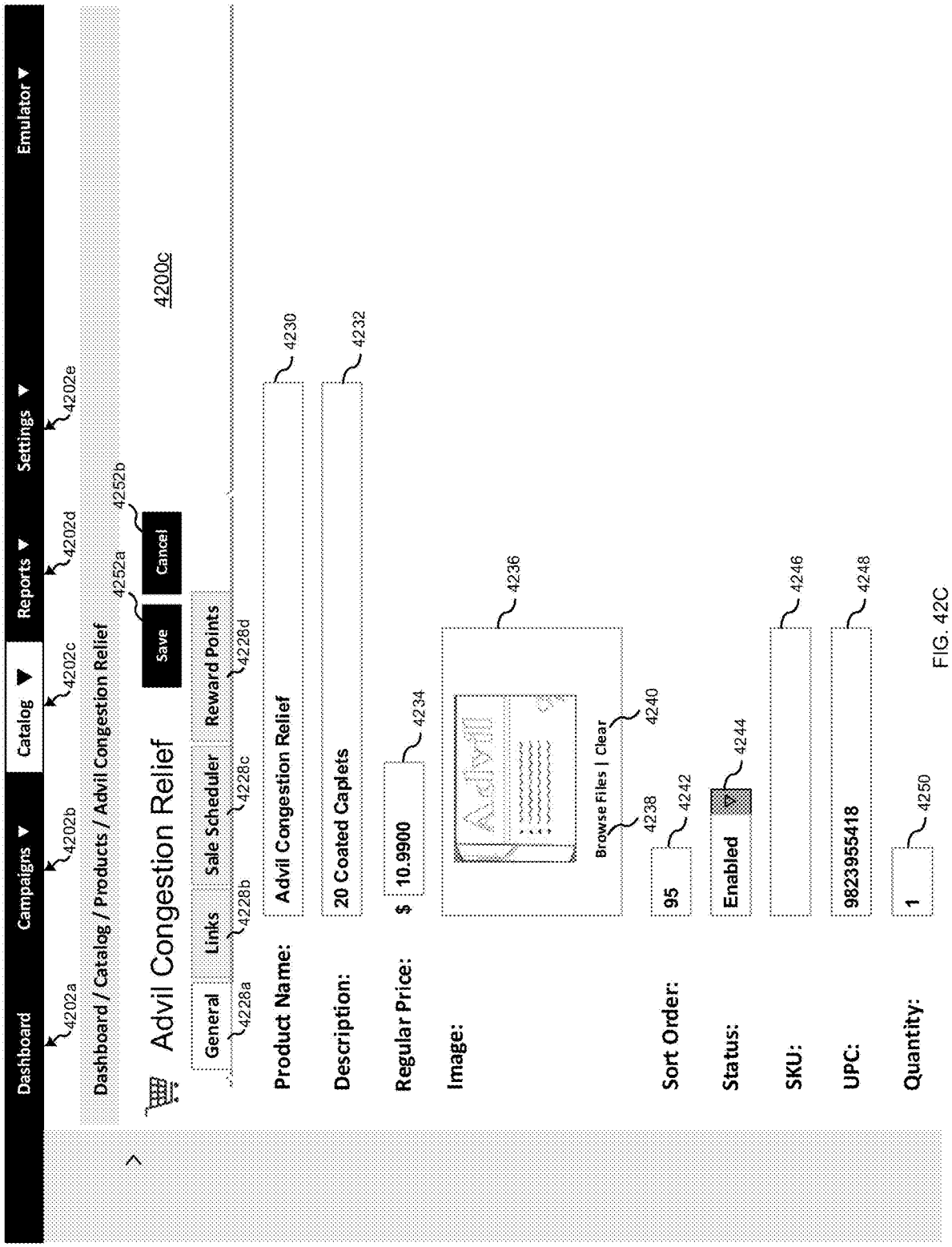
FIG. 42C is a screenshot of an illustrative user interface for a retailer or ad distribution network provider to establish product information of a product available for sale within a retail store and/or chain.

With regard to FIG. 42C, a screenshot of an illustrative user interface 4200c for a retailer or ad distribution network provider to establish product information of a product available for sale within a retail store and/or chain is shown. The user interface 4022c may include a number of tabs 4228a-4228d, including a "General" tab, "Links" tab, "Sale Scheduler" tab, and "Reward Points" tab, respectively. It should be understood that additional and/or alternative tabs may be provided for managing a product, as well.

The user interface 4200c may include a product name field 4230, description field 4232, regular (retail) price field 4234, product image 4236, "Browse Files" soft-button 4238, "Clear" soft-button 4240, sort order field 4242, status selector element 4244, SKU number field 4246, UPC field 4248, and quantity field 4250. These various fields and selectors may assist a retailer in establishing baseline information about a product available in the retail store and useable in managing and conducting an auction with a manufacturer of the product or other manufacturers who want to bid for adjacency product ads, establishing a user interface for shoppers, and managing data associated with shopper purchases via a POS or otherwise. Upon completion of entering the baseline product information, the user may select to save or cancel saving the information using soft-buttons 4252a or 4252b, respectively.

Figure 42D:
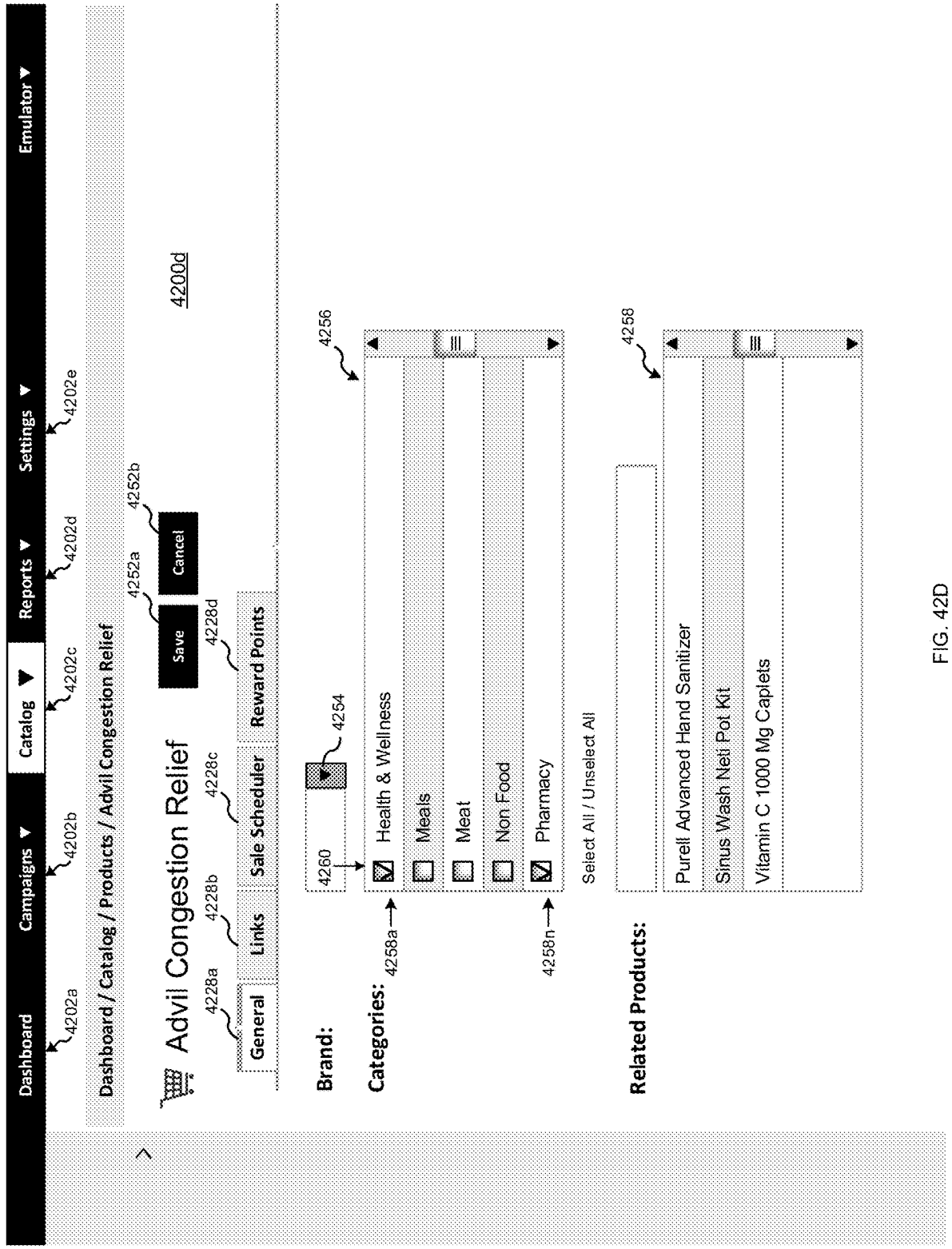
FIG. 42D is a screenshot of an illustrative user interface that enables a user to establish links of a brand.

With regard to FIG. 42D, a screenshot of an illustrative user interface 4200d that enables a user to establish links of a brand is shown. The user may select the "Links" tab 4228b to access the user interface 4200d. A "Brand" selection element 4254 may enable the user to select a particular brand and categories available in a categories list 4256 with which to associate a product, in this case Advil® Congestion Relief. The categories list 4256 may include a list of categories 4258a-4258n that are established in user interface 4200a of FIG. 42A. As shown, Advil Congestion Relief® is associated with Health & Wellness and Pharmacy categories by a user selecting associated selection elements 4260. In one embodiment, the user interface 4200d may include a related products listing 4258, where the user may select related products with which the user may desire to submit (with or without a bid in the case of retailer) to be associated in an auction for a product view advertisement. Creating the links may simplify the auction bid submission process. It should be understood that an advertiser may simply select category(ies) for adjacency ad bids. The user interface 4200d may be established for the use of the retailer, marketer, ad distribution network, ad agency, distributor, or otherwise.

Figure 42E:
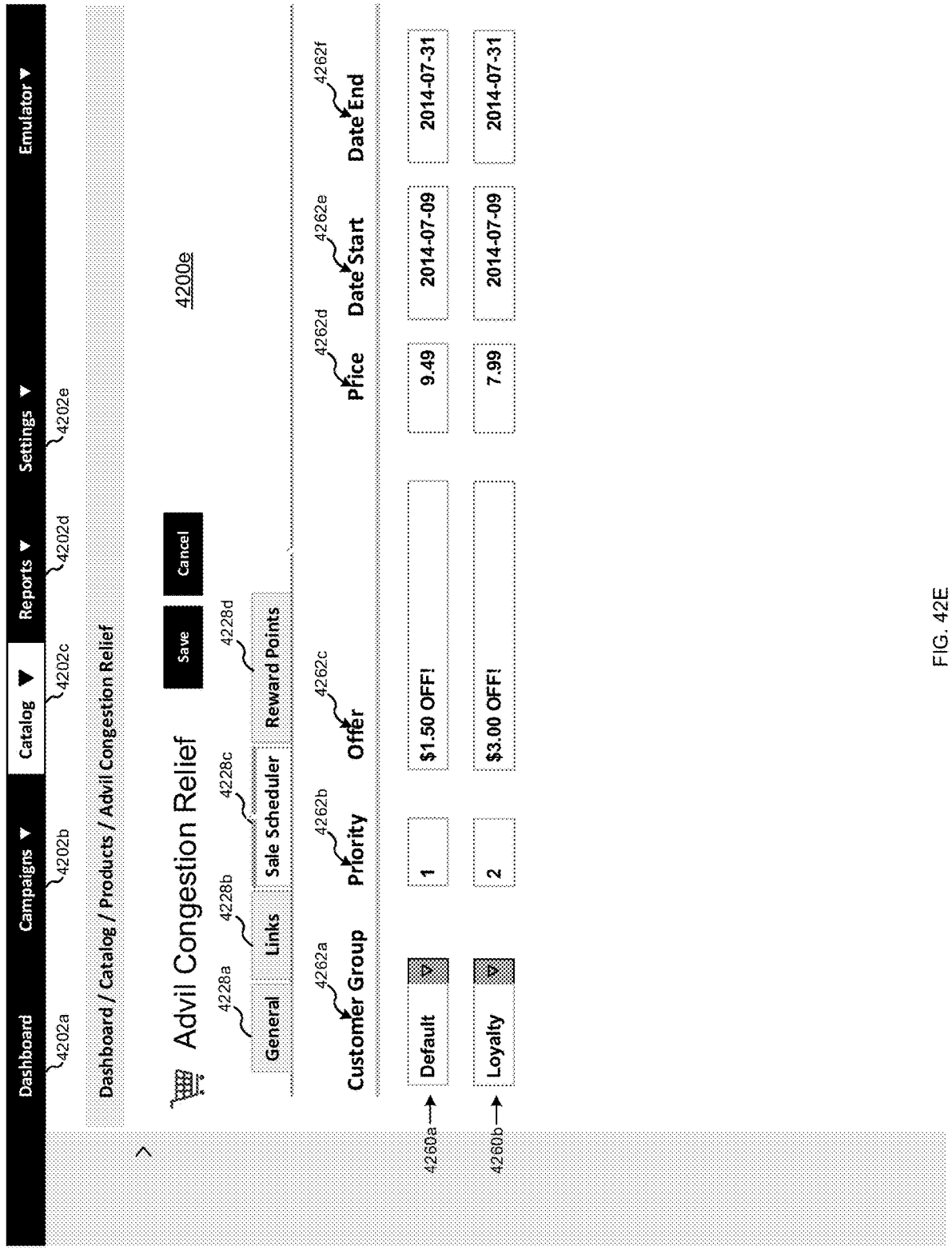
FIG. 42E is a screenshot of an illustrative user interface that operates as a sale schedule.

With regard to FIG. 42E, a screenshot of an illustrative user interface 4200e that operates as a sale (auction bidding) scheduler 4228c is shown. The sale scheduler 4228c enables, as shown, allows for two different types of sales 4260a and 4260b to be provided to different customer groups 262a, including a default customer group and a loyalty member customer group. It should be understood that alternative and/or additional customer groups 4262a may be established to provide different discounts or sales offers. Also available for a retailer to establish for the product are priority 4262b, discount offer 4262c, sale price 4262d, auction start date 4262e, and auction end date 4262f. Start and end times (not shown) may also be included if sales are to last for shorter durations of time. This user interface 4200e operates in a conventional manner, but may be applied to a multi-party additive auction so as to initiate or add to other bid submissions into the auction, as further described herein. In an alternative embodiment, a price range for an auction bid may be established such that the retailer may engage in a competitive auction by starting at the low end of the price range and bid upward to try and win an auction (or future auctions if only a single bid may be submitted to each auction and the retailer wants to try and win future auctions using programmatic bidding).

Figure 42F:
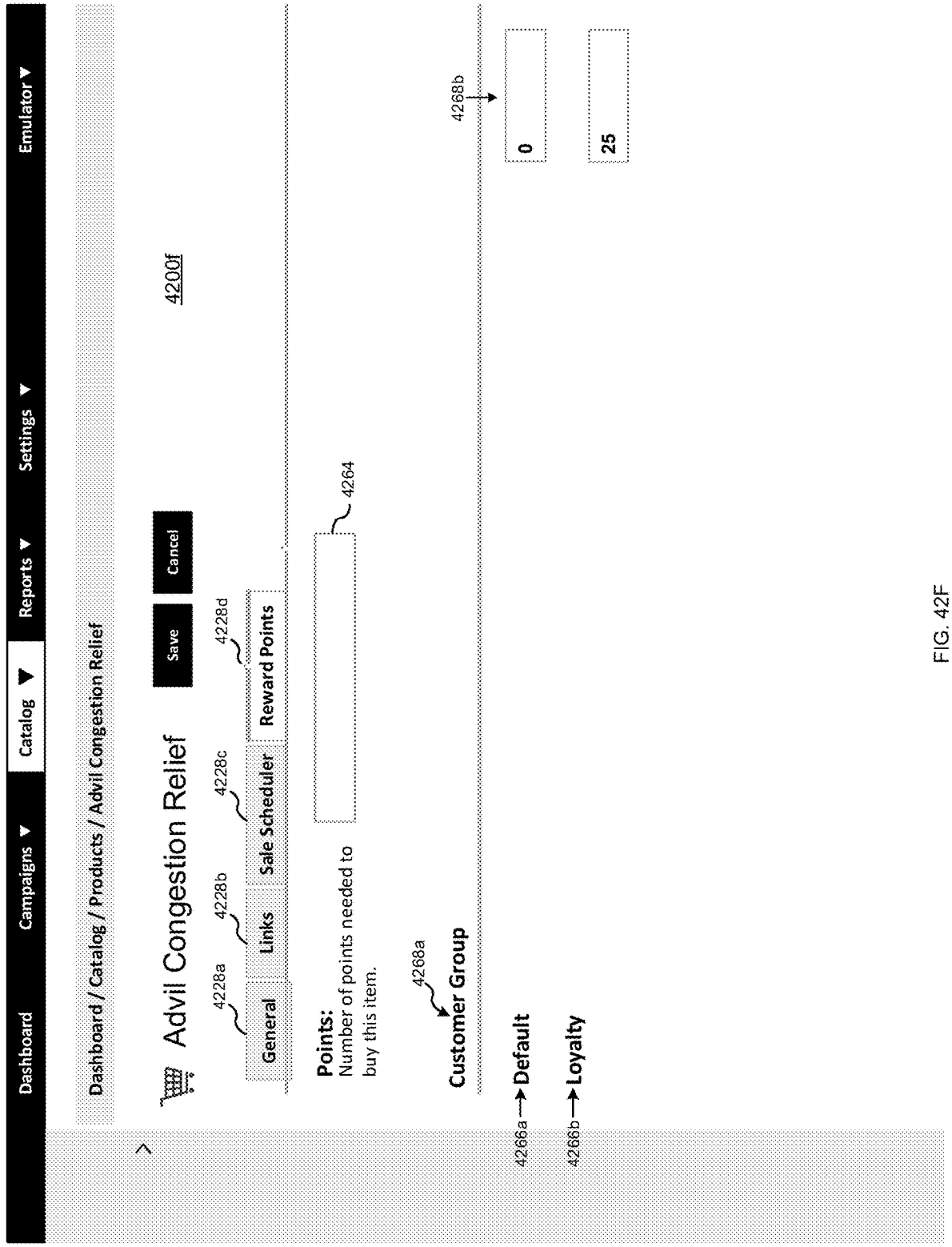
FIG. 42F is a screenshot of an illustrative user interface that operates to manage rewards points.

With regard to FIG. 42F, a screenshot of an illustrative user interface 4200*f* that operates to manage rewards points 4228*d* is shown. The retailer may establish a number of points in a text entry field 4264 to establish a number of points that a shopper may use to purchase the item using rewards points. The rewards points may be collected by the shopper by using his or her loyalty card and purchasing a certain amount, certain products, or number of products to generate points. As shown, the retailer may establish parameters 4266*a* and 4266*b* for different customer groups 4268*a* along with a number of points 4268*b* that the shopper will receive for purchasing the product, in this case 0 points by a non-loyalty card customer and 25 points for a loyalty card customer. In one embodiment, rather than having to set the numbers for each product sold at the retail store, a global setting may be established for all products.

The deal distribution system may provide for a variety of different strategies for marketers to distribute deals (e.g., coupons, discounts, incentives, etc.) to shoppers. For example, the system may be configured to determine customer history related to a product, product category, or product type, such as whether a shopper who "taps-in" or initiates a customer interaction with the ad network, has purchased a certain product in the past and how long in the past to determine whether the shopper is an existing consumer of a particular product (e.g., Cheerios®). If the consumer is an existing customer, then a coupon that is offered by a marketer to that shopper may be less than a coupon offered to a shopper who is not determined to be an existing customer of the product. This conditional coupon evaluation and real-time valuation may be considered a dynamic coupon and may be automated by the deal distribution system in response to a marketer requesting such a dynamic coupon. As another example, the system may track certain purchases by shoppers, such as feminine products. The system may recognize that a shopper is likely a female and purchases certain feminine products on a periodic basis (e.g., once per three months). Hence, rather than displaying another advertisement to the shopper for feminine products within the next three months, advertisements for feminine products may be withheld or weighted lower to be displayed to the shopper, thereby providing better audience targeting for the advertiser. In other words, the advertiser's message can be directed at shoppers with a higher chance of purchasing feminine products at the time of the advertisement, which reinforces the platform efficiency to advertisers and shoppers. It should be understood that a wide variety of timed, audience targeted messaging can be made based on a shopper's tap-in history at a particular retailer or similar retail environment (e.g., different grocery store), such as the purchasing of pet food, and first, second, and third party audience data as previously described. Such programmatic advertising may provide a highly efficient advertising and promotional marketplace that currently cannot be achieved due to most promotion spend being in the form of paper, such as paper coupons.

Other types of dynamic deals may be generated. In one embodiment, a dynamic coupon in which a marketer wants to test a range of coupon offerings may be generated. In such a case, the system may be configured to generate coupons over a given range and provide for different values of discounts (e.g., between $0.50 and $4.00 spaced by $0.25). A number of different coupons may be automatically generated and distributed to common shoppers (e.g., shoppers of the same sex, same demographics, same purchasing histories, etc., as may be learned by the system using an artificial learning system, as understood in the art), thereby allowing for the marketer to determine a specific price point that influences shoppers of certain types (e.g., common demographics and purchasing histories), for example, to purchase their product. In another embodiment, a dynamic coupon in which the advertiser desires to offer shoppers a variable discount on a selection of goods from a larger range of its product offerings may be generated. For example, choose any 3 of 10 items advertised and receive $5.00 off entire basket of goods at checkout, or choose any 5 items and receive $7.00 off. In another embodiment, in addition to receiving a certain lump-sum discount, additional discounts, such as $0.20 off per item, or offers (e.g., gas reward points, air travel points, electricity rewards, or other business partner relationship rewards, such as credit card rewards, may be given). That is, multi-level rewards that are not necessarily instantly redeemable at the checkout counter or at the retailer may be offered as a result of making certain purchases and using certain deals when making those purchases of products. In such a case, the system may be configured to generate the varying coupon discount amounts based on shoppers' selections, thereby allowing the marketer to generate an infinite number of deals affecting a total shopping basket discount without having to interact with the retailer to accomplish its marketing goals. By having a dynamic deal (e.g., one that may be varied in discount from any or all of the players on a substantially real-time basis (e.g., responsive to a customer type)), a variety of different options may be given to marketers, retailers, ad agencies, etc. The system may also generate dynamic combination deals.

In accordance with the principles of the present invention, the system may provide for a multi-player auction system in which multiple players (e.g., marketer, retailer, and ad distribution network provider) have the ability to provide bid submissions on the same product may participate in the auction. As an example, a first bidding player may be a manufacturer and/or distributor of luxury handbags that may submit a bid to influence both opening page results list and adjacency ranking of an ad for the handbags in order to be higher than other bidded product offers. As previously described, simply submitting a performance bid (e.g., bid for a pay-per-view or pay-per-display) may be insufficient to cause the ad to be placed on a main page of the auction-ranked list showing product deal offers in a retail environment. The manufacturer may also submit a deal inclusive of a coupon, discount, and/or incentive to further help influence the ranking of the ad. The coupon may be a $50 off coupon, for example. For a multi-player or aggregate auction, a second bidding player may be a retailer of the handbags. The retailer, in an effort to help attract customers, may submit a deal, such as a discount, for the handbags that will be added to the deal submitted by the manufacturer. A third bidding player may be an ad delivery system manager that desires to further help the ad for the handbags to be positioned high in the ranked list of ads for distribution at the retailer may submit a deal for the handbags. There may be a wide variety of reasons for any of these three and/or other parties to submit deals for a product. In one embodiment, a combination of the first, second, and third deals submitted to the aggregate auction may be processed along with the bid submission by the manufacturer and be compared to auction bid submissions for other products competing to be displayed high on the ranked list of the main page. In an alternative embodiment, the bid submissions (i.e., inclusive of bids and/or deals) by the three parties may be independently compared to bid submissions of other products attempting to be positioned on the auction-ranked list.

Because multiple parties or "players" may jointly participate in the aggregate or additive auction process for the same product, the principles of the present invention may provide for parallel or multi-stage bid submissions to be performed. For example, in a multi-stage bid submission process, the manufacturer may submit a bid and deal for a product, then the retailer may submit a deal for the product, and then the ad delivery network provider may submit a deal. By staging the bid submission process, the ad delivery network provider may ultimately be able to have better control of a final deal that is being submitted into the automated auction process that utilizes both bids, which are used to compensate the ad delivery network provider, and deals, which benefit the customer. The ad delivery network provider may submit deals for a product for a variety of reasons, such as to show the manufacturer how well the ad delivery system can work to move products in retail stores as a result of giving deals to shoppers. In the alternative, an agreed upon sale price of a product may be set and the manufacturer and network provider may share in the revenue of the product (e.g., revenue or profit split 50%/50% between the product manufacturer and ad distribution network provider from sales of the product in the retail environment).

By the manufacturer being able to update its deals real-time periodically (e.g., hourly) or non-periodically (e.g., based on sales or lack of sales threshold), the manufacturer may be able to better influence product purchase and trial rates. Alternatively, an automated, programmatic advertising solution may be provided that enables a buying program to create and adjust bids and/or bundle deals to produce a certain audience size, as further described hereinafter. Shoppers may be highly influenced when a certain number or percentage of "winners" are provided by the system. "Winners" may be defined in a variety of different ways, but generally means that shoppers were delivered a deal that is above a certain value, such as 70% discount. Other higher (e.g., 100%) or lower (e.g., 25%) discount or deal values may be used to indicate that a shopper is a winner or not. By producing a certain number or level of winners, shoppers' system usage rates may be influenced using game theory mathematics to vary winnings and, therefore, increase audience delivery predictability of the system. Shoppers may be more willing to participate in the system on a more routine basis (e.g., 90% of shopping trips) and for longer periods of time (e.g., years). In producing winners, the multi-stage aggregate auction system can be utilized by any or all of the parties that are able to submit deals for a product. By using the multi-stage aggregate auction process, the secondary players (e.g., retailer and ad delivery network provider) may, in one embodiment, collaboratively see the deal(s) being submitted prior to their deal offers so that the secondary players may know whether or how much additional deal offering may be submitted to help make an ad for the product a "winner" (i.e., have a deal above a certain value). Alternatively, the auction process may be a blind aggregate auction process such that none of the parties submitting bids and/or deals for a product know what the other parties are submitting. In another alternative embodiment, bidding parties may be inclusive of various departments within a particular retailer, i.e., in a grocery environment both hotdog and paper plate merchants collaboratively bid to increase the results-list ranking of a bidded mustard or relish product with their additional goods as a package deal as well increase the likelihood of hotdogs and paper plates being seen in the product adjacency view list.

Such an aggregate bidding process for a single product of a manufacturer provides for a highly dynamic aggregate auction system in that any of the bidding parties may influence a final deal for a product being provided to shoppers. Again, each of the parties may have their own reasons to try and influence deals for a product. And, because each deal is both aggregated and independently assessed against the submitting party(ies), there is little or no financial detriment to the other parties. Of course, not all of the parties may have the same deal submission capabilities (e.g., only the manufacturer may offer a manufacturers incentive).

In one embodiment, the system may be configured to enable the ad delivery network manager to partner with a manufacturer in an alternative fee generation manner. For example, the manufacturer may enter into an arrangement, such as a consignment arrangement, in which the manufacturer is given a percentage of a product sale for new customers of a particular product or brand, for example, that can be verified through use of a mobile ID and POS data or online sale. Alternative success results basis may be utilized. In one embodiment, the manufacturer may elect to give the ad delivery network manager a percentage (e.g., 10%) of sales to shoppers who use a deal provided by the ad delivery network if a certain volume of sales is reached (e.g., 10,000 units across all retailers in which the product may be purchased), as evidenced by usage of a deal offered by the manufacturer and/or ad delivery network manager. Alternatively, the percentage may flow back from the ad delivery network to marketers. Manufacturers may also find it to be easier to share a percentage of gross sales to use the expertise of the ad delivery network manager to obtain a certain audience level and quality. By offering such an alternative compensation structure, the ad delivery network manager may be willing to provide additional services or financial support to the manufacturer. A user interface for bid submissions may provide for the manufacturer to "partner" with the ad delivery network manager through use of graphical user interface features, such as check-boxes, and sharing arrangements that may be accepted or declined by the ad delivery network manager.

The principles of the present invention further provide for an automated system that apportions advertising dollars for an advertiser to be automatically apportioned between a bid and deal offer for submission into an auction for ad placement for the advertiser. As a result of the automated apportionment and submission into the auction, various advertisement offers can be generated by the system to generate the advertiser's required audience delivery (e.g., a relatively predictable percentage of main page displays, adjacency displays, and so on are obtained to deliver an expected audience that is measurable). In some cases, the system may apportion more money towards deals to have a higher chance of being displayed "above the fold" or "below the fold" on the results-listing of a main page, and less money in a bid for being listed. The apportionment of the ad money may be performed in a variety of ways that cause a certain pay-for-performance or cost-per-action CPA audience delivery to be generated over a certain period of time based on auction-ranked advertisement listings and adjacencies, and placement within those listings and adjacencies.

Because of the dynamic nature of the auction process, two shoppers who shop together may receive different advertisements and, hence, different deals. As an example, a husband and wife may receive different offers due to one being male and the other being female. So, when the husband and wife tap into a retail store, each will receive a ranked ad listing showing the best deals being offered in the store, but the ads are tailored to each based on advertiser audience delivery priorities, demographics, buying history, and so on. Because multiple people may shop together, the POS may be configured to allow for multiple tap-outs and inclusion of deals collected by each of the people shopping together by scanning each of the aggregate deal indicia and processing the deals against the products that are being purchased. The POS may be configured to use a higher, lower, or average of a deal provided to the people in the event that the dynamic deals for the same item are different for each of the people.

Figure 35:
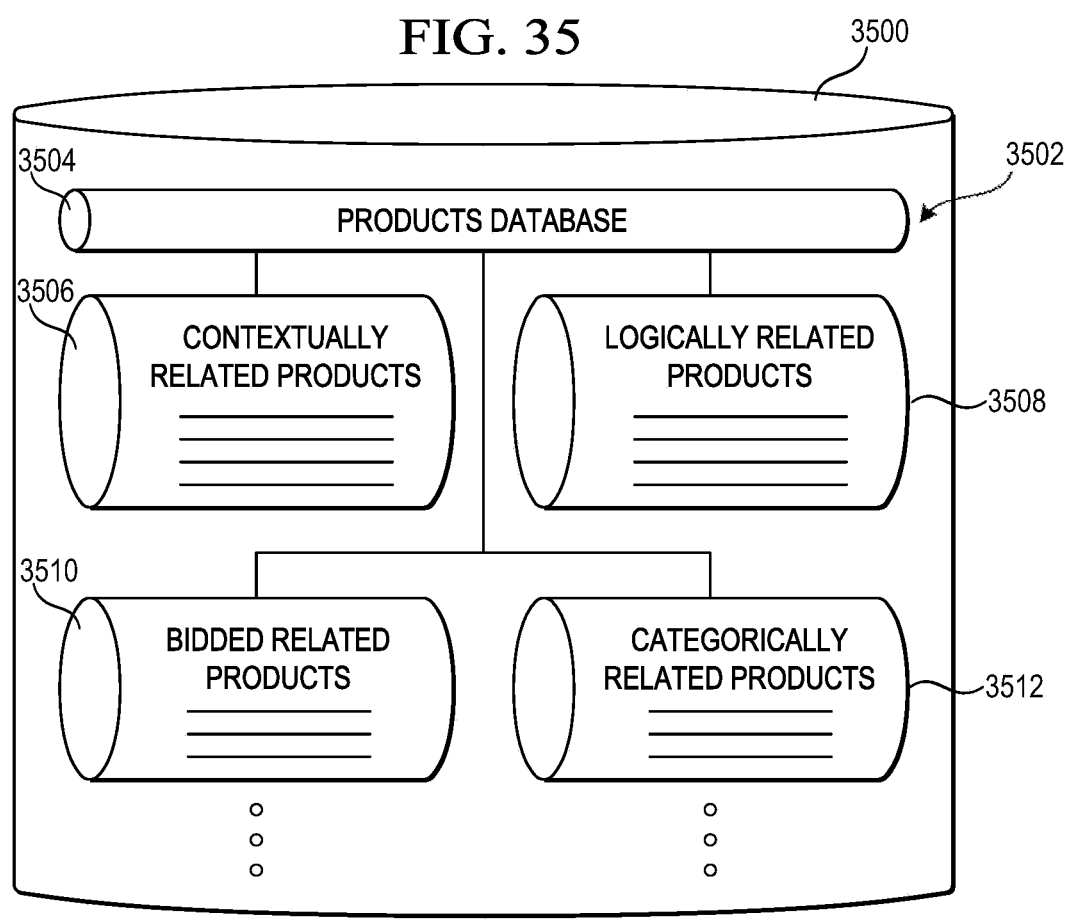
FIG. 35 is an illustration of an illustrative storage unit configured to store a number of different data repositories or databases.

With regard to FIG. 35, an illustration of a storage unit 3500 configured to store a number of different data repositories or databases 3502 is shown. In one embodiment, the databases are data collections or tables within a single database organized according to the relational model, as understood in the art. A "stores" database (not shown) may store information associated with the retail locations available on the network. A "products" database 3504 may store information associated with products that are available for sale within the retail locations on the network. The products database 3504 may include a table of contextually related products 3506, logically related products 3508, bidded related products 3510, categorically related products 3512, and so on. The products database 3504 may also have information associating the products with various categories, brands, and retail locations. A "brands" database may store information associated with the brands of products stored in the products database. A "categories" database may store information associated with the categories of products stored in the products database. An "ads" database may store information associated with advertisements to be advertised in accordance with the principles of the present invention. It should be understood that the "ads" database may be considered local ads and that more dynamic advertising via the auction platform may be delivered from ad networks that are fulfilling ad space of shoppers with auction-ranked ads. The ads database may have information associating advertisements with products, categories, brands and retail locations. The ads database may also have information for auctions associated with advertisements or advertisements' relationships defined by the ads database. Each database or data store within a database may allow various relationships to be established to assist advertisers in advertising their products either as primary or adjacency advertisements. Other databases associated with the various menu items, as previously described with regard to FIG. 5, may also be included. The following table is illustrative of various database relationships that can be configured within the storage unit.

shopping trip is shown. The "My Personal Mall" interactive display provides a listing of retail stores or other retail environments 3602 at which the shopper has shopped or of which the user has added to a "My Personal Mall" interactive display. In a pre-shopping setting or even during a shopping trip, the shopper may be able to access his or her "My Personal Mall" interactive display to view the listing of the retail stores 3602 along with locations 3604 and number of deals 3606 currently available at the respective retail stores. The shopper may be able to select a retail store and view a listing of deals (e.g., coupons, discounts, incentives, sweepstakes, and other offerings) at the selected retail store. The listing of the selected retail store may be the same as what a shopper would see if he or she were to "tap-in" at an entryway of the selected retail store, such as that shown in FIG. 3C. Alternatively, because the deals provided by an entryway "tap-in" may have time limitations or be intentionally limited to actual in-store shoppers, the principles of the present invention may provide an alternative set of deals to the shopper when accessing the retail store (when not shopping in-store) deals via the personal mall. In some cases, the deals being offered may be better due to any of the bidders adding additional discounts to try and motivate the potential shopper to visit a particular retail outlet. Alternatively, to motivate the potential shopper to use the system when at the retail store, the deals may be less attractive when the shopper is not in a retail store. It may be that the system simply provides the exact same deals so as to avoid "forum shopping." By providing the shopper with the ability to view and store deals prior to shopping, the potential shopper may be more likely to take advantage of the system, shop at a particular retailer, and purchase goods of advertisers because of viewing those deals. A "rain check" feature may also be made available for products that are sold out or coming soon.

The user interface 3600 may be available via the traditional Internet via a computer or via a mobile device of the shopper. In either case, the ads that are viewed may be stored and made available to the shopper for a certain period of time or until the user next "taps into" an entryway tag at one of the retail stores for which the shopper has selected discounts. In one embodiment, the system may be configured to provide a "hold" for the deals for a certain period of time, such as three days. In another embodiment, the deals may be configured to expire as they are set-up for in-store shoppers who "tap-in" at the retail store. When the shopper "taps-in" at the entryway of a retail store that the shopper has pre-saved deals from his or her "My Personal Mall," the system may recognize the shopper via a mobile ID or other identifier of the mobile device or shopper, for example, and

TABLE I

| Offer | Product | Brand | Category | Location | Store | Adjacency |
|---|---|---|---|---|---|---|
| Buy 1 Get 1 Free | Colgate ® Toothpaste | Colgate ® | Personal Care, Oral Care, Toothpaste 8 oz. | USA | CVS ®, Target ®, Rite Aid ® | Personal Care, Oral Care, Crest ® |
| 40% Off | Hanes ® Crew Neck T-Shirt - 6 Pack | Hanes ® | Clothing, Men's Clothing, Men's Underwear, T-Shirts | NY, NJ, CT | Macy's ®, JCPenny ®, Kohls ® | Jockey ®, Fruit of the Loom ®, Men's Underwear |
| $1.00 Off | Gillette ® Hydrating Body Wash | Gillette ® | Personal Care, Bodywash & Soap 6 oz. | USA | All | Bodywash & Soap, Irish Spring ® |

Figure 36:
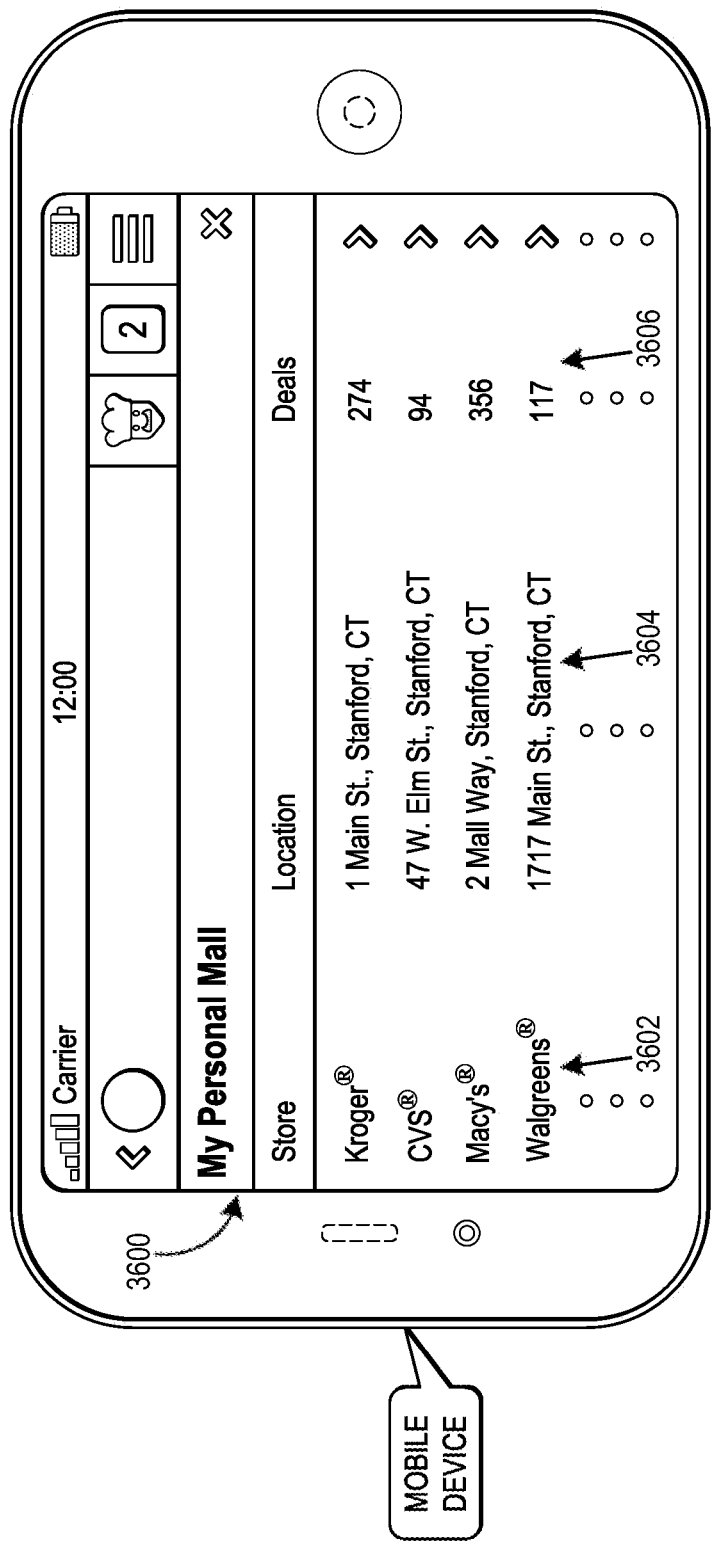
FIG. 36 is a screen shot of an illustrative "My Personal Mall" user interface available for use by a shopper when not in a store that enables the shopper to pre-plan a shopping trip.

With regard to FIG. 36, a screen shot of an illustrative user interface 3600 with a "My Personal Mall" interactive display available for use by a shopper when in either an online or an offline mode that enables the shopper to pre-plan and view remotely using a computer or on an app (likely one in which the user has to log-in) on a mobile device prior to a shopping trip download those deals in the user's "deal basket" so that the shopper does not have to re-select the deals. The shopper, of course, may add additional deals while shopping to the pre-selected deals. Moreover, the system may post different deals to a main page list than were presented to the shopper prior to "tapping in" in response to the shopper tapping into an entryway tag causing the system to re-bid the audience delivery auction enabling other advertisers seeking to reach a particular audience in a particular retail location, that have not already been selected by the user (shopper), to be viewable. The re-bidding provides for a more efficient ad delivery platform as there may be no reason to show the same deal to a shopper who has already pre-selected that deal from the advertiser. The system may also be configured to not present competing products associated with deals pre-selected by a shopper. Alternatively, other advertisers may desire to show their ads to shoppers who have pre-selected deals and offer higher discounts for product trial or otherwise encourage the shopper to purchase a competing product of which the shopper has provided an indication of interest to purchase a certain type of product during the shopping trip.

Figure 37:
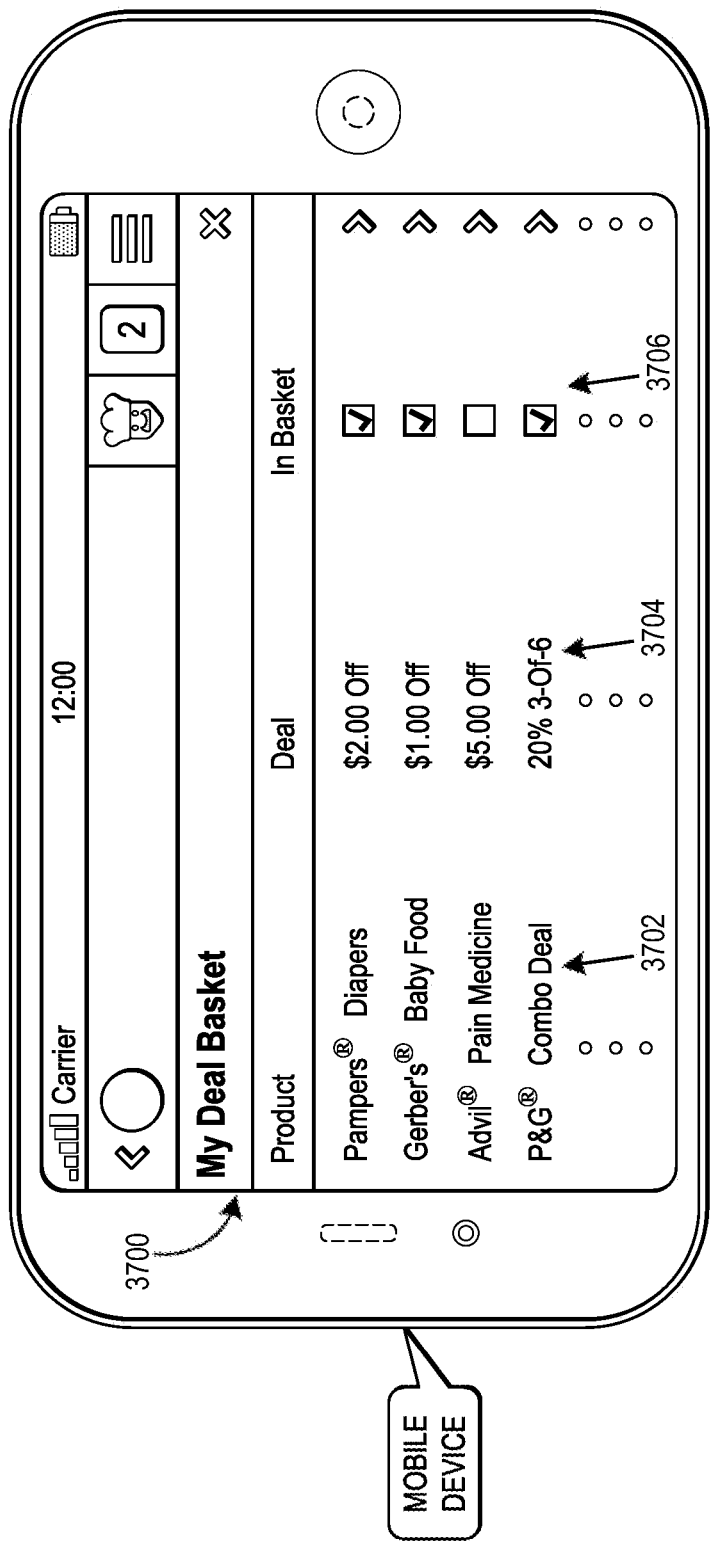
FIG. 37 is a screen shot of an illustrative user interface showing "My Deal Basket" inclusive of a listing of product ads and deals that the shopper has saved and, presumably, desires to purchase products associated with the deals during a shopping trip.

With regard to FIG. 37, a screen shot of an illustrative user interface 3700 showing a "My Deal Basket" interactive display inclusive of a listing of products 3702 and deals 3704 that the shopper has saved and, presumably, desires to purchase products associated with the deals during a shopping trip is shown. The listing of products 3702 may be ordered based on date and time that the shopper selected the deals 3704, alphabetically ordered, ordered from highest value to lowest value deal, or otherwise. This listing is a consolidated listing that may enable a shopper to easily determine whether or not he or she forgot to purchase a product for which a deal was selected. In one embodiment, a selection tool 3706, such as a check-box, may enable the shopper to indicate which of the products the shopper has placed into a shopping basket. In one embodiment, a "reminder" menu item, optionally as part of the "My Deal Basket" view, may list items for which a shopper has not purchased recently, but is predicted to be needed soon based on historical product purchase trends, or products not purchased in recent trips for which deals were selected. A "remove" feature (not shown) may enable a shopper to remove reminders or deals that were saved.

Figure 38:
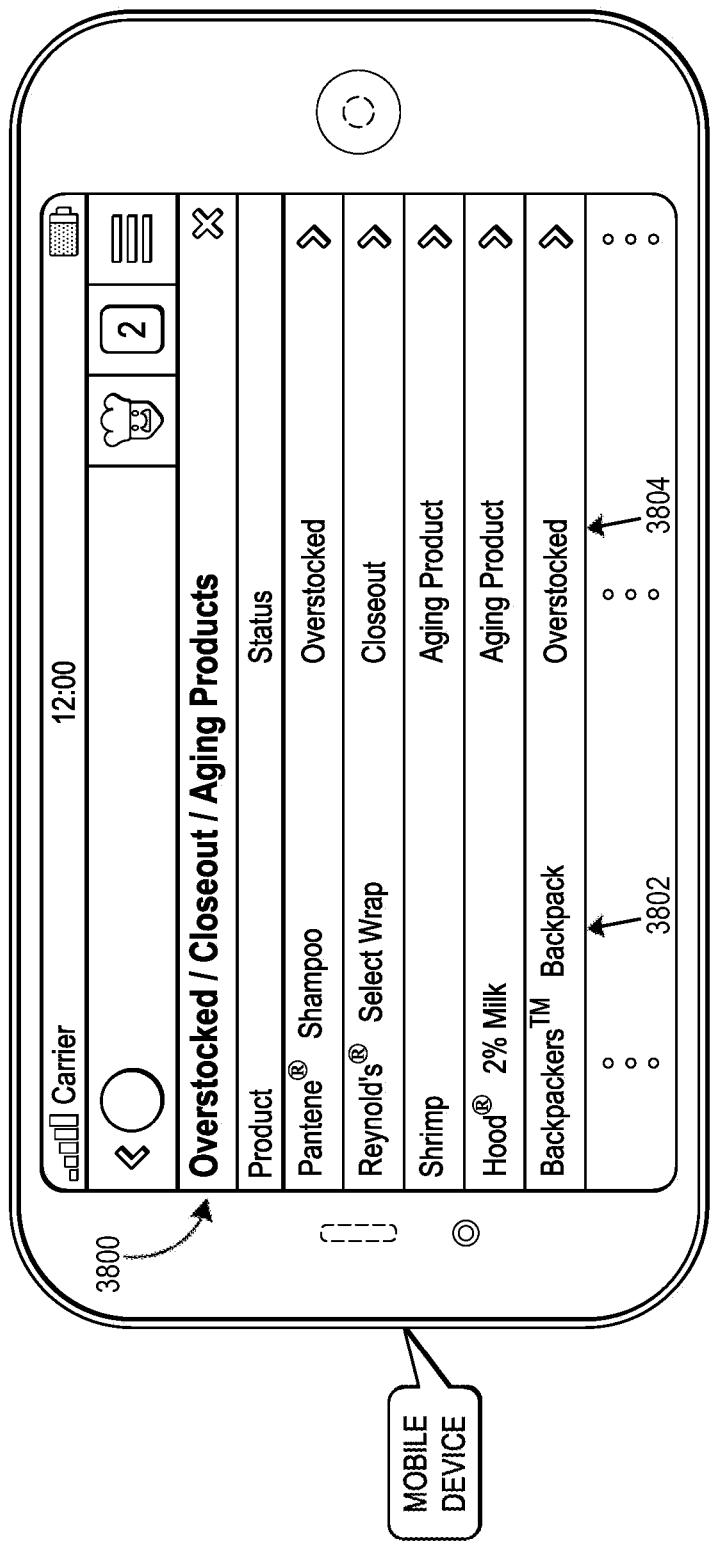
FIG. 38 is a screen shot of an illustrative listing of product advertisements of products that a retailer or advertiser has determined to be specifically categorized as being overstocked, closing out, or aging.

With regard to FIG. 38, a screen shot of an illustrative user interface 3800 inclusive of a listing of products that a retailer has determined to be specifically categorized as being overstocked, closing out, or aging. As shown, a product 3802 and status 3804 of the product is shown. In one embodiment, rather than showing the deal on the auction-ranked list of FIG. 38, because the deal is likely going to be a deal of greater value than otherwise available for non-specifically categorized products, the deal may viewed on a separate product page similar to that shown in FIG. 4B. Alternatively, the deals may be displayed on both the main auction-ranked list and the separate product page. Because the specifically categorized products are being offered under closeout-like conditions additional incentives may be offered for the products 3802 above and beyond any traditional deals, coupons, discounts, or other incentives being offered by the retailer, advertiser or manufacturer. A product page (see FIG. 4B) that is shown in response to a shopper selecting an item on the overstocked/closeout/aging products list may provide adjacency product ads. Manufacturers of those product may also want to advertise related products in association with those being offered in this manner.

In addition to advertisers offering deals, the principles of the present invention provide for an advertiser offering sweepstakes. The sweepstakes may be performed in conjunction with the discount, where the POS of the retailer notifies the shopper of the sweepstakes and results thereof. Alternatively, the sweepstakes may be an instant sweepstakes that, when the shopper performs product view, the results of the instant sweepstakes may be presented to the shopper. For example, the sweepstakes may be for $1,000, 000. In response to a lucky shopper selecting to view product information in a product view, the product view may state, "CONGRATULATIONS! YOU JUST WON OUR $1,000,000 SWEEPSTAKES!" Alternative sweepstakes concepts may be utilized in accordance with the principles of the present invention. The sweepstakes may also be sweepstakes entries in which the shopper may be requested to submit information, such as name, address, telephone number, etc. to register for the sweepstakes with or without purchase of a product. Sweepstakes submissions may cause an ad to be highly ranked as a scale factor may help in the bid submission value into the auction because of the intrinsic value to shoppers and excitement created by a sweepstakes.

In one embodiment, the principles of the present invention may be configured to support gift certificates and use thereof. The gift certificates may be purchased via the system and allow shoppers to selectively use the gift certificates, in whole or in part, when making purchases. In one embodiment, a gift certificate may be purchased via a user interface on a mobile device. Alternatively, a gift certificate may be purchased from a retailer in the same or similar manner as purchasing a gift certificate for other retailers, restaurants, etc. To use a gift certificate, in whole or in part, the menu may include a "Use Gift Certificate" listing (not shown) that, when selected, shows a listing of all available gift certificates that are available for use at checkout. As with the coupons, discounts, incentives, etc., a gift certificate may also be included in an aggregate deal indicia.

In one embodiment, all gift certificates associated with a shopper may be loaded into the system, and a gift certificate "dashboard" that lists all gift certificates and associated balances may be downloaded to a mobile device of the shopper in response to "tapping into" a retail environment. To load the gift certificates, the shopper may capture an image of a barcode or other indicia on the gift certificates, and the system may read the image to create data, such as name of retailer and amount of money, of the gift certificates for storage in a data repository. The gift certificate "dashboard" may be a selectable item in the menu of FIG. 5, and data of the gift certificates may be read and downloaded to a mobile device of the shopper via a URI or mobile app in response to the shopper "tapping into" a retail environment.

In addition to gift certificates, reward money, which is generally a percentage (e.g., 1%) of money spent by a shopper at a retailer, as an incentive for shoppers to shop at the retailer may be applied to a credit line that is associated with a retailer by a computing system of the ad delivery network provider. In one embodiment, as a shopper "taps-in" at an entryway of a retail store, the system, in identifying the shopper via his or her mobile device, may access and download a credit balance, including shopper reward money associated with the retail store for that shopper. The shopper, in "tapping out" and/or checking out at a POS (e.g., cash register), for example, may apply none, some, or all of the reward money for payment of products being purchased during the shopping trip.

With regard to FIG. 39, a screen shot of an illustrative dashboard 3900 that may be used by any of an advertiser, retailer, and/or ad distribution network provider is shown. The dashboard 3900 may include a variety of information, including an overview (e.g., redemptions on a periodic basis, such as daily) 3902, number of store locations, number of products, number of sales, number campaigns, number of ads, etc. In addition, a recent coupon redemptions listing 3904 may be shown, where the coupon redemptions listing may include a store, coupon ID, date and time, amount, and action. Audience delivery statistics 3906, such as number of redemptions, number of taps, number of views, number of front page listings, number of adjacency listings, number of adjacency selections, number of recipe listings, and so forth. The statistics 3906 may be presented in any format, such as a chart format, as shown. A news and information section 3908 inclusive of various information may also be displayed. It should be understood that a wide variety of information may be provided in accordance with the principles of the present invention.

Because the system may be integrated with point-of-sales of retailers, including through use of a module or other software program (e.g., app) operating on the POS or back-room server, the principles of the present invention may provide for real-time, substantial real-time, up-to-the-minute, or other longer timeframe by which a user of the dashboard may be able to view deal usage (e.g., audience delivery and coupon usage) on an advanced timeframe schedule, even if disbursements and/or invoices for the deals are performed at a later date.

With regard to FIG. 40, an illustrative report 4000 showing a variety of different audience delivery information provided by the ad distribution network is shown. The report 4000 is a table, and is inclusive of advertisement performance 4002, such as number of "taps" or selections of an advertisement, number of impressions, TTR, average cost per tap, average position on a list, and so forth. Any level of detail may be included in the report, including for an auction-ranked listing and for an adjacency listing. In one embodiment, the report may include a number of taps that correspond with an actual purchase and use of the deal in making the purchase, a number of taps that correspond with a non-purchase of a product from that shopping trip, and so forth.

By using bids and product deal offers as part of an auction ranking system, shoppers may benefit because the best discount deals being offered to the shoppers may be ranked higher than advertisements that merely have higher bids by advertisers. Rather than follow traditional auction means relative to bid price and ranking, the principles of the present invention provide a means for advertisers to use place-based mobile media to promote enhanced deals to shoppers engaged in real-time shopping in a physical location, generate improved prominence for their products, greater levels of audience delivery, and higher efficiency for promotional spend for marketers. This form of place-based mobile media is not static as is conventional place-based media that is positioned at a location for a certain period of time, such as a week or a month, or paper coupons, but rather is dynamic in that the media (e.g., advertisements) may be changed "on the fly," optionally, by audience demography (e.g., different for males and females and other relevant targeting information), and/or event triggered (e.g., in response to a shopper having pre-selected deals remotely from the retail store as provided by the "My Personal Mall" aspect of the system), by advertisers based on its deals, by retailers based on its deals, by ad delivery network manager based on its deals, and so on.

Shopper audiences using such an opt-in system or "pull" media system may be able to efficiently view all product offers in a retail environment, thereby providing greater savings and capture the saving without unnecessary mobile device friction and interaction. In one embodiment, an advertiser may not bid anything for pay-per-view or pay-per-action, for example, of an ad, but provide a significantly enhanced product discount that causes the system to attribute a higher results-list ranking than certain bidded advertisements. For example, a product that is being given away free as a promotional activity with a low bid value may be positioned on the results-list higher than a product that has a 20% off discount and a bid value that is higher than other similar products, including the product that is being given away for free. Such a giveaway, however, may be offset in its ranking value if views of the ad and/or purchases of the product in the ad are low, as previously described. Such combination of benefits as described herein will likely resolve most if not all complications associated with the usage (adoption) of mobile device shopping and NFC-based advertising communications for place-based mobile media. It should be understood that a wide variety of algorithms that include audience demography and purchase history, product discounts and other product offerings being made by advertisers of products may be utilized in accordance with the principles of the present invention.

Moreover, while the principles of the present invention provide for a "pull" media delivery system since advertisers value such deliveries higher than "push" systems. The principles of the present invention may also include the use of a "push" delivery system. One example of a "push" delivery system may include the use of radio frequency systems, such as RFID, WiFi®, Bluetooth®, beacons or other localized RF system that recognizes a mobile device and initiates communications to the mobile device that has entered a retail environment. Such a "push" delivery system may use a traditional app or a web-app on a mobile device that is launched by the shopper prior to advertisements and/or other content to be delivered to the mobile device. Geographic positioning systems, such as a global positioning system and/or triangulation system, may alternatively be used to identify that a shopper is within or local to a retail environment (traditionally known as geo-fencing) and, in response, communicate content to the shopper inclusive of deals within the retail environment, as provided herein.

In general, the principles of the present invention provide for use of a single player or multi-player, aggregate auction system to rank product advertisements for positioning on a main page inclusive of a results-list of product advertisements, in the form of deal offers or otherwise, and/or on a product listing page, which includes adjacency advertisements, as provided herein. An audience delivery bid submission may take the form of bidding for a particular audience demography, a particular location at a retail environment (e.g., entryway, department, aisle, associated with a particular product, etc.) by a single player (e.g., manufacturer) on a pay-per-view or cost-per-action basis. The bid submission may also include submission of a deal offer (e.g., coupon, discount on a brand or product, etc.) that is used in the auction for ranking a product advertisement by a single player. In another embodiment, the auction may allow for multiple players to participate in an auction for a single product by submitting an audience delivery bid and/or deal. In addition, a retailer bidder may want additional benefits for providing its facilities and audience to the advertisement distribution network provider, the retailer may be entitled to a certain level of positioning of its own promotional or product advertisements. As an example, the retailer may be afforded two list positions of a main page listing along with one of the three adjacency positions for each advertised product view. Alternative embodiments for providing benefits to a retailer may be utilized in accordance with the principles of the present invention.

The principles of the present invention further may incorporate a "casino-style" gaming aspect. In one illustrative example, a physical tag associated with a product, brand, food or other product category, or otherwise may include a URI that functions as a game of chance or skill, such as roulette, spin wheel, slot machine, dice, bowling, darts, trivia questions, or other possible games that are fun for shoppers and offer the shopper a range of deals, such as between 0% and 100% discounts. Other games, such as a treasure hunt or scavenger hunt, where a shopper is given a clue and has to find and "tap" a near field communications NFC tag or image a barcode associated with another product or brand of a manufacturer, for example, may be provided. Such games may be ranked highly due to being an "interesting offer" factor and/or high deal potential that causes a deal submission to be created.

There are a number of other bidding and auction principles that may be incorporated into the aggregate auction system described herein. For example, a generalized second bid principles (e.g., incremental bidding of a nominal amount, such as $0.01, more than a next highest bid) may be incorporated into the principles of the present invention.

Figure 43:
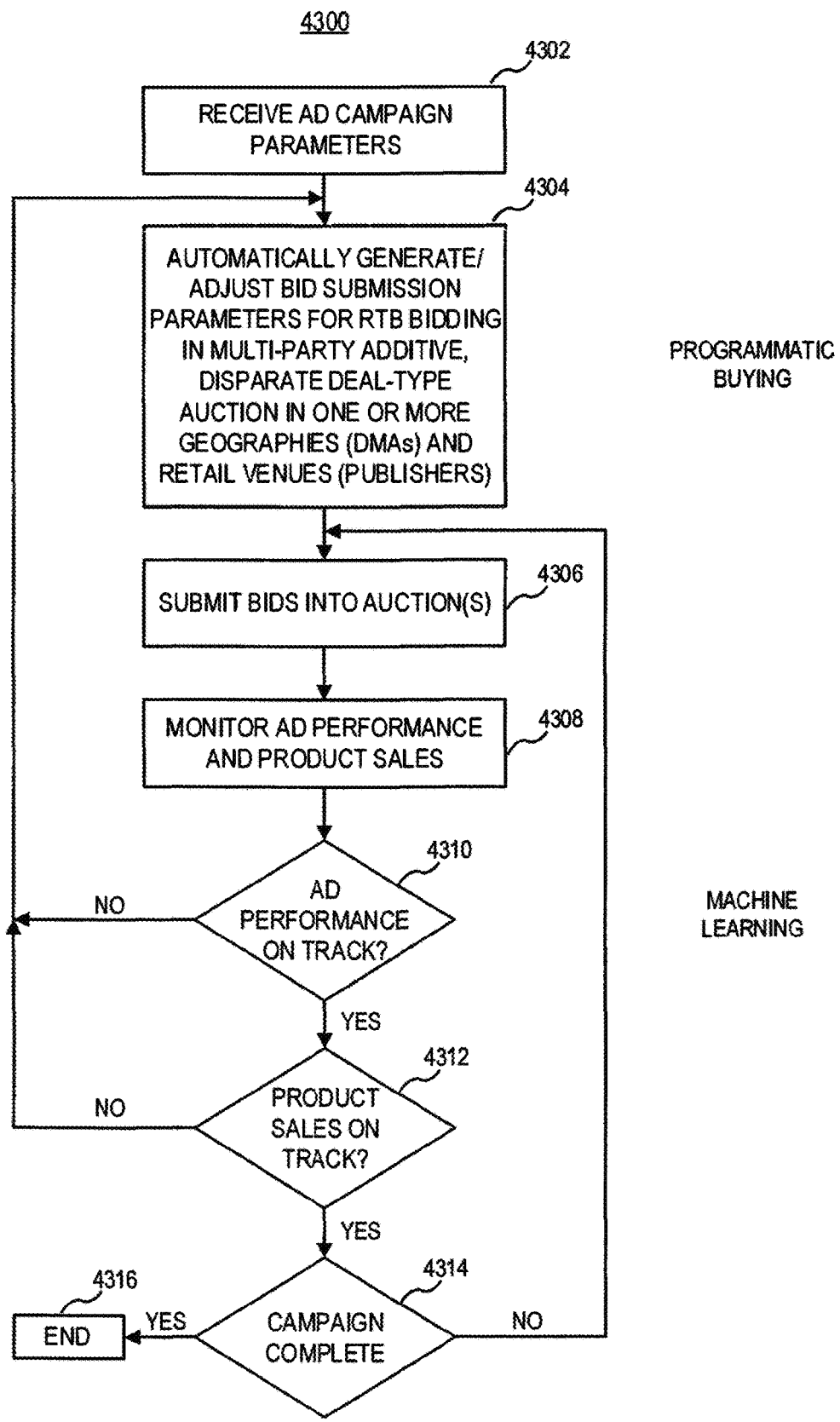
FIG. 43 is a flow diagram of an illustrative process for performing a programmatic ad campaign within a retail environment.

With regard to FIG. 43, a flow diagram of an illustrative process 4300 for performing a programmatic ad campaign within a retail environment is shown. The process 4300 may start at step 4302 at which ad campaign parameters may be received from a marketer or agent. The ad campaign parameters may include ad performance metrics, such as number of ads to be displayed, during the ad campaign, product sales metrics, such as number product trials or products to be sold during the ad campaign, increase in sales volume during the ad campaign, and any other advertising (including promotion) metric, as understood in the art. Such advertising metrics may include number of ads to be distributed in a zip code or designated market area during the ad campaign, number of ads to be selected or viewed in product views during the ad campaign, number of product deals transacted or product trials accepted during the ad campaign, and so forth. At step 4304, bid submission parameters for real-time bidding in a multi-party additive, disparate deal-type auction in one or more geographies (DMAs) in retail venues (publishers) may be automatically generated and adjusted. The disparate deal-types may include any deal-types for use in retail (or online), as previously described herein (e.g., percent discount, buy 1 get 1 free, etc.). The bid submission parameters may be based on retail location in which the advertisement is being distributed, demographics of audience members to which the ads are being distributed, and any other bid submission parameters as previously described. At step 4306, bids may be submitted into auctions, which may include auction-ranked lists (FIG. 3A).

At step 4308, as the process 4300 is configured to perform programmatic and utilize machine learning, the process 4300 may monitor ad performance and product sales. The ad performance may include any desired ad performance metrics, including number of times an ad bid submission wins to cause the ad to be distributed to particular auction-ranked lists, adjacencies, or anywhere else in a mobile platform user interface, as presented herein. Additionally, a number of product sales or trials may be tracked by collecting points-of-sale information from retailers along with any other information that may be available for tracking and correlating advertising and sales within retail (or online) environments. At step 4310, a determination as to whether ad performance is on track during the ad campaign may be made. If not, then the process returns to step 4304, where an adjustment to bid submission parameters may be made. If the performance is determined to be on track at step 4310, then the process continues to step 4312, where a determination is made as to whether product trials or sales are on track. If not, then the process returns to step 4304, where one of more bid submission parameters may be automatically adjusted. If, however, the product sales are determined to be on track at step 4312, then the process continues at step 4314, where a determination is made as to whether the ad campaign is complete. If the ad campaign is not determined to be complete at step 4314, then the process returns to step 4306, where bids are continued to be submitted into one or more auctions. Alternatively, if the ad campaign is determined to be completed due to expiring or reaching the desired ad campaign parameters as received at step 4302, then the process may end at step 4316.

In process 4300, machine learning may be utilized to determine how effective particular bid submission parameters perform with respect to shopper audiences, times, events, auction-ranked lists, adjacencies, and/or any other geographic, demographic, retailer, retailer type, etc. The shopper audiences may be categorized into demographics, such as women, women with children, women with children and dogs, and so forth. From these categorizations, different deal types and deal values may be analyzed so as to determine what the most effective and efficient deals to present to each category of demographics to reach certain ad campaign goals may be determined. For example, if a certain demographic is responsive to a certain type of ad with a certain type of deal and deal value, then machine learning may utilize the programmatic buying system to increase ad campaign performance and/or product sales, certain types of deal types and deal values should be presented to those certain demographics. Of course, to slow down ad campaign performance, different deal types and/or lesser deal values may be distributed to those audience demographics. And, because the principles of the present invention provides for an auction that can evaluate disparate deal types, the programmatic buying processes may change deal types and deal values in a dynamic manner by changing bid submissions into auctions to meet add campaign targets. It should be understood that machine learning in combination with the system's programmatic buying as described will enable users (advertisers, marketers and retailers) to establish simple audience delivery parameters and expected return of investment ROI parameters that when inserted into the auction process will permit the system to automate the planning, buying and delivery of retail audiences sufficient to meet each product promotion's desired economic parameters.

The principles of the present invention provide for improving technical efficiencies by:

providing retail services (e.g., increase speed and efficiency for point-of-sale processing of shoppers due to deals being aggregated and the POS no longer needs to scan conventional paper coupons);

transferring value from marketers, retailers, or other bid submission participants to shoppers, reducing paper coupons, improving efficiency for processing and displaying deals due to being auction-ranked as opposed to random coupon listings, increasing utilization by shoppers due to the bid submissions being value indexed;

making utilization "frictionless" for shoppers selecting deals;

elimination of focus groups due to machine learning promotions;

Reduces carbon emissions related to paper coupon distribution by advertisers and secondary retailer distribution to clearing entities.

faster reimbursement to retailers from marketers and other players who offer discounts to shoppers; and many other efficiencies on the consumer, marketer, retailer, distributor, and other market and auction participants.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   determining, by a first server, a retail store in which products are available for a user to purchase in response to a user interacting with a user interface of a mobile device;
   generating, by a second server, a plurality of real-time bidded aggregate deal offers having respective aggregated deal values available to the user for products located within the retail store, at least one of the real-time bidded aggregate deal offers being aggregated from a first real-time bidded deal offer having a first deal value to be applied to the cost of a product from a first bidder and from a second real-time bidded deal offer having a second deal value to be applied to the cost of the product from a second bidder, the first real-time bidded deal offer from the first bidder and second real-time bidded deal offer from the second bidder being consolidated into one real-time bidded deal offer to form an individual real-time bidded aggregated deal offer having an aggregated deal value to be applied to the cost of the product;
   executing, by the second server in response to the user interacting with the user interface of the mobile device, a real-time auction that receives the aggregated deal values as bids for the real-time auction to generate a ranked list of real-time bidded aggregate deal offers as a function of the respective aggregated deal values for the products located within the retail store submitted to the real-time auction;
   communicating, by the first server to the mobile device of the user via a communications network, the ranked list of real-time bidded aggregate deal offers inclusive of selectable real-time bidded aggregate deal offers of the products being sold at the retail store for the user to select; responsive to the user selecting a real-time bidded aggregate deal offer of a product from the ranked list of real-time bidded aggregate deal offers being displayed on the mobile device to view the selected real-time bidded aggregate deal offer, automatically storing, by the mobile device in non-transitory memory, the viewed real-time bidded aggregate deal offer of the product to be applied to a cost of the product; responsive to a check out request at the mobile device, generating, by the mobile device, data inclusive of the selected real-time bidded aggregate deal offer; and applying, by a third server, the selected real-time bidded aggregate deal offer to reduce the cost of the product to which the selected real-time bidded aggregate deal offer is associated.

2. The method according to claim 1,
   wherein generating data includes generating, by the mobile device, an indicia inclusive of the real-time bidded aggregate deal offer.

3. The method according to claim 2,
   wherein generating the indicia, by the mobile device, includes generating the indicia inclusive of multiple real-time bidded aggregate deal offers that were selected by the user to be viewed on the mobile device and stored thereon, wherein each of the multiple real-time bidded aggregate deal offers were automatically saved in response to the user selecting the respective real-time bidded aggregate deal offers to view the aggregate deal value to be applied to the cost of the product.

4. The method according to claim 1, further comprising ranking, by the second server, the real-time bidded aggregate deal offers by using multiple factors, wherein at least one of the factors is non-financial.

5. The method according to claim 4,
   wherein the selectable ranked list includes highest value real-time bidded aggregate deal offers listed higher than real-time bidded aggregate deal offers of lower value, and is scrollable such that additional real-time bidded aggregate deal offers that are not initially displayed are able to be viewable when the selectable list is scrolled by the user, and further comprising storing, by the mobile device, real-time bidded deal offers in the list responsive to becoming viewable on the mobile device.

6. The method according to claim 1, further comprising, responsive to the user selecting the real-time bidded aggregate deal offer from the selectable ranked list, displaying, by the mobile device, the selected real-time bidded aggregate deal offer inclusive of additional information of the product.

7. The method according to claim 6, further comprising:
   executing, by the second server, a second real-time auction for second real-time aggregate deal offers submitted to the second real-time auction to be displayed adjacent to the selected real-time bidded aggregate deal offer being associated with and displayed to produce a second ranked list from the second real-time aggregate deal offers; and
   wherein displaying, by the mobile device, the selected real-time bidded aggregate deal offer further includes displaying a plurality of associated and selectable real-time bidded aggregate deal offers inclusive of one or more highest ranked real-time bidded deal offers of other products from the second ranked list produced by the second real-time auction.

8. The method according to claim 6, further comprising automatically storing, by the mobile device, a real-time bidded aggregate deal offer of any of the selectable real-time bidded aggregate deal offers selected by the user to view.

9. The method according to claim 1,
   wherein generating the data by the mobile device includes: generating a QR code for the POS to read; and displaying the QR code on the mobile device for the POS to read.

10. The method according to claim 9, further comprising:
    determining, by the mobile device, that too many real-time bidded aggregate deal offers to be applied to a single QR code have been stored; in response to determining that too many real-time bidded aggregate deal offers have been stored, generating, by the mobile device, a plurality of QR codes to accommodate all of the real-time bidded aggregate deal offers; and displaying the plurality of QR codes on the mobile device for the POS to read.

11. The method according to claim 10, wherein displaying the plurality of QR codes on the mobile device includes simultaneously displaying the plurality of QR codes on the mobile device for the POS to read.

12. The method according to claim 1, further comprising computing the aggregated deal value of each of the first real-time bidded offer and the second real-time bidded offer as a function of one or more variable scale factors that are unknown to the first and second bidders.

* * * * *